United States Patent
Oyama et al.

(10) Patent No.: US 10,960,768 B2
(45) Date of Patent: *Mar. 30, 2021

(54) VEHICLE POWER SUPPLY SYSTEM

(71) Applicant: Honda Motor Co.,Ltd., Tokyo (JP)

(72) Inventors: Kazuya Oyama, Saitama (JP); Yuto Otsuki, Saitama (JP); Hirokazu Oguma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 16/368,883

(22) Filed: Mar. 29, 2019

(65) Prior Publication Data

US 2019/0299788 A1  Oct. 3, 2019

(30) Foreign Application Priority Data

Mar. 30, 2018  (JP) .............................. JP2018-069976

(51) Int. Cl.
| | |
|---|---|
| *H02P 5/74* | (2006.01) |
| *B60L 7/16* | (2006.01) |
| *B60L 7/14* | (2006.01) |
| *B60L 58/12* | (2019.01) |
| *B60L 53/20* | (2019.01) |
| *B60L 50/51* | (2019.01) |

(52) U.S. Cl.
CPC .................. *B60L 7/14* (2013.01); *B60L 7/16* (2013.01); *B60L 53/20* (2019.02); *B60L 58/12* (2019.02); *H02P 5/74* (2013.01); *B60L 50/51* (2019.02); *B60L 2210/40* (2013.01)

(58) Field of Classification Search
CPC .. B60L 7/14; B60L 58/12; B60L 53/20; B60L 2210/40; B60L 501/51; B60L 7/16; H02P 5/74

See application file for complete search history.

(56) References Cited

U.S. PATENT DOCUMENTS 8,195,348 B2 *  6/2012  Mizutani .................. B60K 1/02
                                                                    701/22
10,160,441 B2 *  12/2018  Kamachi ............... B60W 20/40
(Continued)

FOREIGN PATENT DOCUMENTS

JP          2014143842          8/2014

*Primary Examiner* — Dinh T Le
(74) *Attorney, Agent, or Firm* — JCIPRNET

(57) ABSTRACT

A vehicle power supply system includes a first power line to which a first inverter and a first battery are connected, a second power line to which a second inverter and a second battery are connected, a voltage converter, a charging and discharging control device that operates the inverters and the voltage converter, and a second regenerable electric power acquisition unit that acquires second regenerable electric power. The charging and discharging control device charges the second battery with second regenerative electric power that is power supplied from the second inverter to the second power line during regenerative deceleration, and supplies second surplus regenerative electric power to the first power line in a case where the second regenerative electric power is larger than the second regenerable electric power, wherein the second surplus regenerative electric power is obtained by excluding the second regenerable electric power from the second regenerative electric power.

20 Claims, 27 Drawing Sheets

(56) References Cited

U.S. PATENT DOCUMENTS

| | | | |
|---|---|---|---|
| 2009/0088914 A1* | 4/2009 | Mizutani | B60W 10/06 701/22 |
| 2019/0299796 A1* | 10/2019 | Oyama | B60L 50/66 |
| 2019/0299798 A1* | 10/2019 | Oyama | B60L 58/18 |
| 2019/0299804 A1* | 10/2019 | Oyama | B60L 1/00 |
| 2019/0299806 A1* | 10/2019 | Oyama | B60L 50/66 |
| 2019/0299807 A1* | 10/2019 | Oyama | B60L 7/14 |
| 2019/0299808 A1* | 10/2019 | Oyama | B60L 50/66 |

* cited by examiner

VEHICLE POWER SUPPLY SYSTEM

CROSS-REFERENCE TO RELATED APPLICATION

This application claims the priority benefit of Japan Application No. 2018-069976, filed on Mar. 30, 2018. The entirety of the above-mentioned patent application is hereby incorporated by reference herein and made a part of this specification.

BACKGROUND

Technical Field

The disclosure relates to a vehicle power supply system. More specifically, the disclosure relates to a vehicle power supply system including at least two power storage devices and a motor generator.

Description of Related Art

In recent years, the development of electromotive transport instruments including an electric motor as a motive power generation source or electromotive vehicles such as a hybrid vehicle including an electric motor and an internal-combustion engine as a motive power generation source has been actively performed. In such electromotive vehicles, an electric condenser such as a battery or a capacitor is also mounted in order to supply electrical energy to an electric motor. In addition, in recent years, a plurality of electric condensers having different characteristics which are mounted in an electromotive vehicle have also been developed.

Patent Document 1 (Japanese Patent Laid-Open No. 2014-143842) discloses a vehicle power supply system including a low-voltage battery, a high-voltage battery, and a converter that converts a voltage. In the vehicle power supply system disclosed in Patent Document 1, the low-voltage battery is connected to a drive motor through the converter, and the high-voltage battery is connected to the drive motor so as to be in parallel with the converter.

Incidentally, in recent years, an electromotive vehicle in which each drive motor is connected to a front wheel and a rear wheel, the front wheel drive motor and the rear wheel drive motor are driven with power discharged from the two kinds of batteries, and all-wheel drive traveling is possible has also been developed.

In such an electromotive vehicle in which all-wheel drive traveling is possible, since regenerative electric power is generated in both the front wheel drive motor and the rear wheel drive motor during regenerative deceleration, each battery can be charged with regenerative electric power supplied from each drive motor. However, in the past, specific ways to supply the regenerative electric power generated in these two drive motors to the two kinds of batteries so that power efficiency in the entire vehicle can be improved have not been examined sufficiently.

SUMMARY

According to an aspect of the disclosure, there is provided a vehicle power supply system including: a first motor generator connected to a first wheel of a vehicle; a second motor generator connected to a second wheel; a first circuit to which a first power converter that transfers power to and from the first motor generator and a first power storage device are connected; a second circuit to which a second power converter that transfers power to and from the second motor generator and a second power storage device are connected; a voltage converter that converts a voltage between the first circuit and the second circuit; a charging and discharging control device that controls charging and discharging of the first and second power storage devices by operating the first and second power converters and the voltage converter; and a second regenerable electric power acquisition unit that acquires second regenerable electric power that is an upper limit for regenerative electric power supplied to the second power storage device during regenerative deceleration in which regenerative electric power is generated by the first and second motor generators, wherein the charging and discharging control device charges the second power storage device with second regenerative electric power that is power supplied from the second power converter to the second circuit during the regenerative deceleration, and supplies second surplus regenerative electric power to the first circuit through the voltage converter in a case where the second regenerative electric power is larger than the second regenerable electric power, wherein the second surplus regenerative electric power is obtained by excluding the second regenerable electric power from the second regenerative electric power.

DESCRIPTION OF THE EMBODIMENTS

Figure 1:
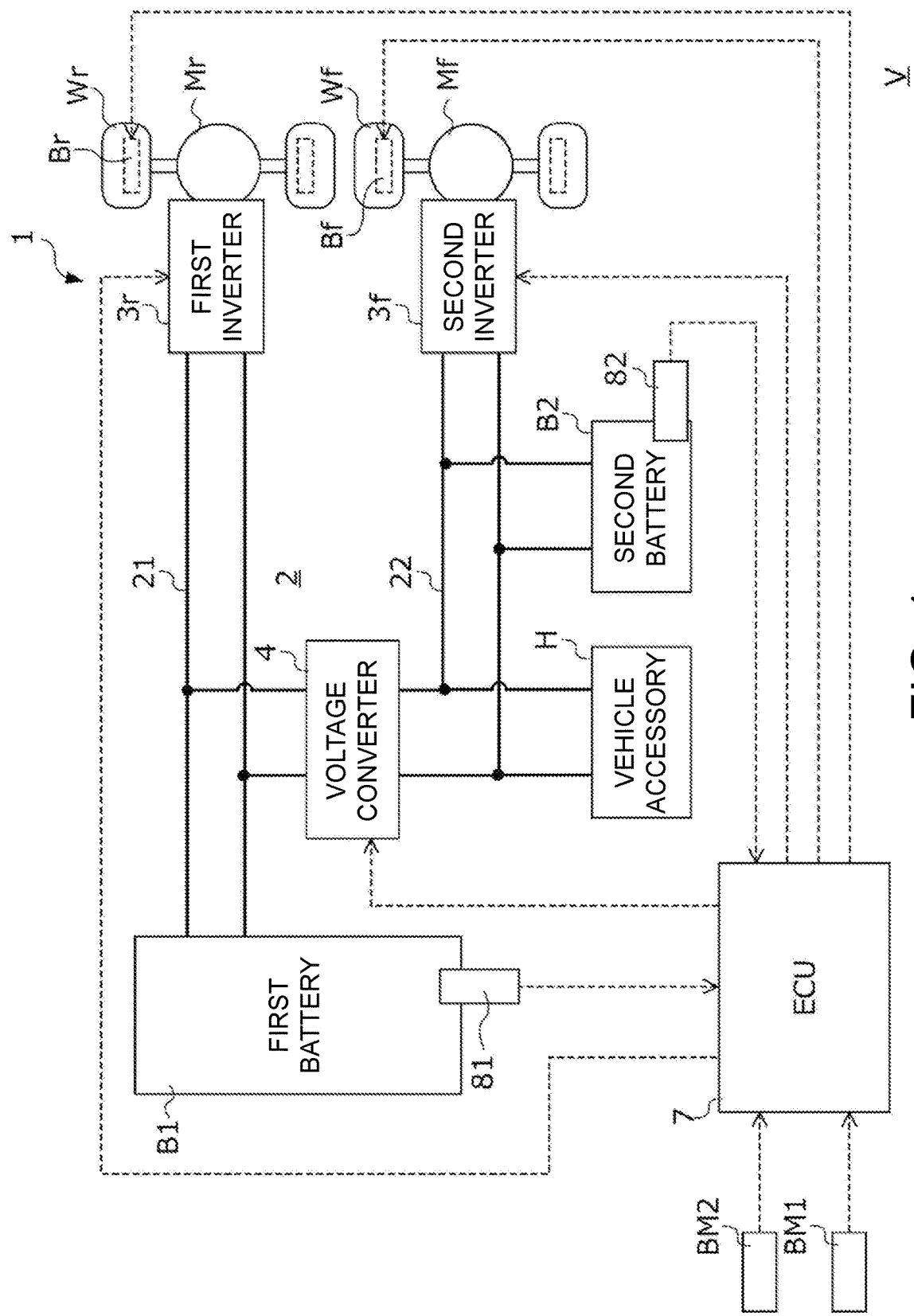
FIG. 1 is a diagram illustrating a configuration of an electromotive vehicle in which a power supply system according to an embodiment of the disclosure is mounted.

The disclosure provides a vehicle power supply system including at least two power storage devices and a motor generator which makes it possible to recover regenerative electric power generated in the motor generator with high power efficiency.

According to an aspect of the disclosure, there is provided a vehicle power supply system including: a first motor generator connected to a first wheel of a vehicle; a second motor generator connected to a second wheel; a first circuit to which a first power converter that transfers power to and from the first motor generator and a first power storage device are connected; a second circuit to which a second power converter that transfers power to and from the second motor generator and a second power storage device are connected; a voltage converter that converts a voltage between the first circuit and the second circuit; a charging and discharging control device that controls charging and discharging of the first and second power storage devices by operating the first and second power converters and the voltage converter; and a second regenerable electric power acquisition unit that acquires second regenerable electric power that is an upper limit for regenerative electric power supplied to the second power storage device during regenerative deceleration in which regenerative electric power is generated by the first and second motor generators, wherein the charging and discharging control device charges the second power storage device with second regenerative electric power that is power supplied from the second power converter to the second circuit during the regenerative deceleration, and supplies second surplus regenerative electric power to the first circuit through the voltage converter in a case where the second regenerative electric power is larger than the second regenerable electric power, wherein the second surplus regenerative electric power is obtained by excluding the second regenerable electric power from the second regenerative electric power.

According to one or some exemplary embodiments of the disclosure, a vehicle accessory that is an electrical load may be connected to the second circuit, and the charging and discharging control device may charge the second power storage device and drive the vehicle accessory with the second regenerative electric power, and set the second surplus regenerative electric power by excluding the second regenerable electric power and power required in the vehicle accessory from the second regenerative electric power.

According to one or some exemplary embodiments of the disclosure, the first power storage device may be lower in output weight density and higher in energy weight density than the second power storage device.

According to one or some exemplary embodiments of the disclosure, the first wheel may be a rear wheel and the second wheel is a front wheel, and during the regenerative deceleration, the charging and discharging control device may operate the first and second power converters so that the second regenerative electric power become larger than first regenerative electric power that is power supplied from the first power converter to the first circuit during the regenerative deceleration.

According to one or some exemplary embodiments of the disclosure, the vehicle power supply system may further include: a second power storage parameter acquisition unit that acquires a value of a second power storage parameter increasing in accordance with an amount of power storage of the second power storage device; and a second regeneration permission upper limit setting unit that sets a second regeneration permission upper limit that is a threshold for the second power storage parameter, and in a case where the value of the second power storage parameter is larger than the second regeneration permission upper limit during the regenerative deceleration, the charging and discharging control device may prohibit the second power storage device from being charged, and may supply at least a portion of the second regenerative electric power to the first power storage device through the voltage converter and the first circuit.

According to one or some exemplary embodiments of the disclosure, the vehicle power supply system may further include: a second power storage parameter acquisition unit that acquires a value of a second power storage parameter increasing in accordance with an amount of power storage of the second power storage device; and a second regeneration permission upper limit setting unit that sets a second regeneration permission upper limit that is a threshold for the second power storage parameter, the charging and discharging control device may prohibit the second power storage device from being charged in a case where the value of the second power storage parameter is larger than the second regeneration permission upper limit during the regenerative deceleration, and that the second regeneration permission upper limit setting unit may change the second regeneration permission upper limit on the basis of a state of the first power storage device.

According to one or some exemplary embodiments of the disclosure, the second regeneration permission upper limit setting unit may change the second regeneration permission upper limit on the basis of a state of the first power storage device.

According to one or some exemplary embodiments of the disclosure, the vehicle power supply system may further include: a first power storage parameter acquisition unit that acquires a value of a first power storage parameter increasing in accordance with an amount of power storage of the first power storage device; and a first regeneration permission upper limit setting unit that sets a first regeneration permission upper limit that is a threshold for the first power storage parameter, in a case where the value of the first power storage parameter is larger than the first regeneration permission upper limit, the second regeneration permission upper limit setting unit may make the second regeneration permission upper limit larger than in a case where the value of the first power storage parameter is equal to or less than the first regeneration permission upper limit, and the charging and discharging control device may prohibit the first power storage device from being charged in a case where the value of the first power storage parameter is larger than the first regeneration permission upper limit during the regenerative deceleration.

According to one or some exemplary embodiments of the disclosure, the second regeneration permission upper limit setting unit may set the second regeneration permission upper limit as a value of any of a predetermined first threshold and a second threshold larger than the first threshold, and the second regeneration permission upper limit setting unit may set the second regeneration permission upper limit as the first threshold in a case where the value of the second power storage parameter is equal to or less than the first threshold during the regenerative deceleration, and set the second regeneration permission upper limit as a value of any of the first threshold and the second threshold on the basis of the state of the first power storage device in a case where the value of the second power storage parameter is larger than the first threshold and equal to or less than the second threshold.

According to one or some exemplary embodiments of the disclosure, the vehicle power supply system may further include a first regenerable electric power acquisition unit that acquires first regenerable electric power that is an upper limit for regenerative electric power supplied to the first power storage device during the regenerative deceleration, and the second regeneration permission upper limit setting unit may set the second regeneration permission upper limit as the second threshold in a case where the value of the second power storage parameter is larger than the first threshold and equal to or less than the second threshold during the regenerative deceleration, and required regenerative electric power is larger than the first regenerable electric power.

The vehicle power supply system includes the first circuit to which the first power converter and the first power storage device are connected, the second circuit to which the second power converter and the second power storage device are connected, the voltage converter that convert a voltage between the first circuit and the second circuit, and the charging and discharging control device that controls charging and discharging of the first and second power storage devices by operating the first and second power converters and the voltage converter. In such a circuit configuration, in a case where power is transferred between the first circuit and the second circuit through the voltage converter, a loss according to the magnitude of passage power of the voltage converter occurs. Consequently, the charging and discharging control device charges the second power storage device with the second regenerative electric power supplied from the second power converter to the second circuit during regenerative deceleration, and supplies the second surplus regenerative electric power in which the second regenerable electric power is excluded from the second regenerative electric power to the first circuit through the voltage converter in a case where this second regenerative electric power is larger than the second regenerable electric power of the second power storage device. That is, in the vehicle power supply system, the second regenerative electric power supplied from the second power converter to the second circuit is used in charging of the second power storage device as much as possible. In a case where an excess portion that is not able to be consumed occurs in charging of the second power storage device, this excess portion is supplied to the first circuit through the voltage converter. In addition, the second surplus regenerative electric power supplied to the first circuit can be used in, for example, charging of the first power storage device. As described above, according to the vehicle power supply system, since power that passes through the voltage converter during regenerative deceleration can be reduced as much as possible, it is possible to recover regenerative electric power supplied from the first and second power converters with high power efficiency.

In the vehicle power supply system, the vehicle accessory is connected to the second circuit. Thereby, the vehicle accessory can be driven with second regenerative electric power supplied from the second power converter to the second circuit during regenerative deceleration. In addition, in the vehicle power supply system, power in which the second regenerable electric power and required power in the vehicle accessory are excluded from the second regenerative electric power is defined as the second surplus regenerative electric power, and this second surplus regenerative electric power is supplied to the first circuit through the voltage converter. Therefore, according to the vehicle power supply system, since the second surplus regenerative electric power (that is, passage power of the voltage converter) can be further reduced by an amount required in the vehicle accessory, it is possible to further improve power efficiency.

In the vehicle power supply system as described above, the second regenerative electric power supplied to the second circuit during regenerative deceleration is supplied to the second power storage device as much as possible. Therefore, in the vehicle power supply system, it can be said that the second power storage device is more likely to maintain the amount of power storage within a predetermined target range than the first power storage device. On the other hand, in the vehicle power supply system, the first power storage device that is used is lower in output weight density and is higher in energy weight density than the second power storage device. That is, the first power storage device excellent in energy weight density is a capacity-type power storage device that is primarily intended for a high capacity, and the second power storage device excellent in output weight density is an output-type power storage device that is primarily intended for a high output. The second power storage device that is such an output type is often used so as to compensate for a shortage of this first power storage device in a case where power requested from a driver is not able to be covered by the first power storage device alone. For this reason, the amount of power storage of the second power storage device may be maintained within a predetermined target range in order to meet a driver's request at all times. Therefore, in the vehicle power supply system, the second power storage device is formed to have an output type, and thus the amount of power storage of the second power storage device can be maintained within a target range so as to meet a driver's request.

In the vehicle power supply system, the first wheel is defined as a rear wheel, and the second wheel is defined as a front wheel. In addition, the charging and discharging control device operates the first and second power converters so that the second regenerative electric power becomes larger than the first regenerative electric power during regenerative deceleration, that is, a larger regenerative braking torque is imparted to the second wheel that is a front wheel than to the first wheel that is a rear wheel. Thereby, it is possible to stably brake a vehicle. In addition, since it is possible to increase regenerative electric power supplied to the second power storage device during regenerative deceleration by making the second regenerative electric power larger than the first regenerative electric power in this manner, the amount of power storage of the second power storage device can be likely to be maintained within a target range as described above.

In a case where the value of the second power storage parameter is equal to or less than the second regeneration permission upper limit during regenerative deceleration, the charging and discharging control device charges the second power storage device with the second regenerative electric power. In addition, in a case where the value of the second power storage parameter is larger than the second regeneration permission upper limit during regenerative deceleration, the second power storage device is prohibited from being charged, and at least a portion of the second regenerative electric power is supplied to the first power storage device through the voltage converter and the first circuit. According to the vehicle power supply system as described above, since power that passes through the voltage converter during regenerative deceleration can be reduced as much as possible, it is possible to recover regenerative electric power supplied from the first and second power converters with high power efficiency.

In the vehicle power supply system, the second regeneration permission upper limit is set with respect to the second power storage parameter of the second power storage device, and the second power storage device is prohibit from being charged in a case where the value of the second power storage parameter is larger than the second regeneration permission upper limit during regenerative deceleration. Thereby, it is possible to prevent the second power storage device from deteriorating due to overcharging. Incidentally, in a case where the state of the first power storage device is a state in which the supply of regenerative electric power to this first power storage device is prohibited or limited, an amount that is not able to be recovered by the first power storage device in regenerative electric power is required to be recovered by the second power storage device. Consequently, in the vehicle power supply system, the second regeneration permission upper limit is set on the basis of the state of the first power storage device. Thereby, since charging of the second power storage device can be prohibited or permitted in accordance with the state of the first power storage device, it is possible to recover regenerative electric power generated in the first and second motor generators with high power efficiency while preventing the second power storage device from being overcharged.

According to the vehicle power supply system, the same effect as that of the above is exhibited.

In the vehicle power supply system, in a case where the value of the second power storage parameter is equal to or less than the first threshold during regenerative deceleration, the second regeneration permission upper limit is set as this first threshold, and in a case where the value of the second power storage parameter is larger than the first threshold and is equal to or less than the second threshold, the second regeneration permission upper limit is set as a value of any of the first threshold and the second threshold on the basis of the state of the first power storage device. Thereby, it is possible to prevent an increase in a range in which the second power storage device is permitted to be charged at an unnecessary timing.

In the vehicle power supply system, in a case where the value of the second power storage parameter is larger than the first threshold and equal to or less than the second threshold during regenerative deceleration, and the required regenerative electric power is larger than the first regenerable electric power (that is, in a case where all the required regenerative electric power is not able to be recovered by the first power storage device alone), the second regeneration permission upper limit is set as the second threshold. Thereby, since the second power storage device is permitted to be charged, an excess portion that is not able to be recovered by the first power storage device can be recovered by the second power storage device. Thus, according to the vehicle power supply system, it is possible to recover regenerative electric power generated in the first and second motor generators with high power efficiency.

In the vehicle power supply system, the vehicle accessory is connected to the second circuit, and this vehicle accessory is driven with the second regenerative electric power supplied from the second power converter to the second circuit during regenerative deceleration. In addition, in the vehicle power supply system, in a case where the value of the second power storage parameter is larger than the first threshold and equal to or less than the second threshold during regenerative deceleration, and the required regenerative electric power is larger than the sum of the first regenerable electric power and power required in the vehicle accessory (that is, in a case where all the required regenerative electric power is not able to be recovered by the first power storage device and the vehicle accessory), the second regeneration permission upper limit is set as the second threshold. Thereby, since the second power storage device is permitted to be charged, an excess portion that is not able to be recovered by the first power storage device and the vehicle accessory can be recovered by the second power storage device. Thus, according to the vehicle power supply system, it is possible to recover regenerative electric power generated in the first and second motor generators with high power efficiency.

Hereinafter, an embodiment of the disclosure will be described with reference to the accompanying drawings.

FIG. 1 is a diagram illustrating a configuration of an electromotive vehicle V (hereinafter, simply referred to as a "vehicle") in which a power supply system 1 according to the present embodiment is mounted.

The vehicle V includes a first wheel Wr, a second wheel Wf, a first drive motor Mr serving as a first motor generator connected to the first wheel Wr, a second drive motor Mf serving as a second motor generator connected to the second wheel Wf, the power supply system 1 that transfers power to and from these drive motors Mr and Mf, a first mechanical braking device Br provided in the first wheel Wr, a second mechanical braking device Bf provided in the second wheel Wf, and an electronic control unit 7 (hereinafter abbreviated as "ECU") that controls the power supply system 1, the drive motors Mr and Mf, and the mechanical braking devices Br and Bf.

The first wheel Wr is constituted by two wheels, that is, a left wheel and a right wheel. The second wheel Wf is constituted by two wheels, that is, a left wheel and a right wheel. Hereinafter, a case in which the first wheel Wr is defined as a rear wheel provided on the rear side of the vehicle V in its traveling direction, and the second wheel Wf is defined as a front wheel provided on the front side of the vehicle V in its traveling direction will be described, but the disclosure is not limited thereto. For example, the first wheel Wr may be defined as a front wheel, and the second wheel Wf may be defined as a rear wheel.

Under the control of the power supply system 1 performed by the ECU 7, the vehicle V can travel in either drive mode of an all-wheel drive mode (hereinafter, also referred to as an "AWD mode") and a two-wheel drive mode (hereinafter, also referred to as a "2WD mode"). The term "AWD mode" refers to a drive mode in which traveling is performed using both the first wheel Wr and the second wheel Wf as driving wheels, and the term "2WD mode" refers to a drive mode in which traveling is performed using the first wheel Wr as a driving wheel and using the second wheel Wf as a driven wheel. As will be described below, the vehicle V basically travels in an AWD mode, and travels in a 2WD mode when predetermined conditions are established.

A power saving driving request button BM1 and a sports traveling request button BM2 which can be operated by a driver are connected to the ECU 7. In a case where the power saving driving request button BM1 is pressed by a driver, the ECU 7 suppresses the consumption of power in the power supply system 1 by causing the vehicle V to travel with the drive mode preferentially set to a 2WD mode. In addition, in a case where the sports traveling request button BM2 is pressed by a driver, the ECU 7 causes the vehicle V to travel with the drive mode preferentially set to an AWD mode. Meanwhile, as will be described later in detail, in a case where a driving state is a high-output traveling state, power stored in a second battery B2 to be described later is frequently used. Consequently, in a case where the sports traveling request button BM2 is pressed, the ECU 7 causes the vehicle V to travel in a recovery mode for quickly recovering the amount of power storage of the second battery B2 so as to continuously respond to a high-output traveling request by a driver.

The first drive motor Mr and the second drive motor Mf mainly generate motive power for causing the vehicle V to travel. The output shafts of the respective drive motors Mr and Mf are connected to the wheels Wr and Wf through a motive power transfer mechanism which is not shown. Torques generated in the drive motors Mr and Mf by supplying three-phase alternating-current power from the power supply system 1 to the drive motors Mr and Mf are transferred to the wheels Wr and Wf through the motive power transfer mechanism which is not shown, to rotate the wheels Wr and Wf and cause the vehicle V to travel. In addition, the drive motors Mr and Mf generate regenerative electric power by acting as generators during deceleration of the vehicle V, and impart a regenerative braking torque according to the magnitude of this regenerative electric power to the wheels Wr and Wf. The regenerative electric power generated by the drive motors Mr and Mf is used to charge a first battery B1 and the second battery B2 to be described later which are included in the power supply system 1.

The first mechanical braking device Br and the second mechanical braking device Bf are constituted by a disc braking system that imparts mechanical braking torques based on friction to the first wheel Wr and the second wheel Wf. The ECU 7 sets targets for braking torques which are imparted from the mechanical braking devices Br and Bf to the wheels Wr and Wf by performing a cooperative control process of causing regenerative braking torques imparted from the drive motors Mr and Mf to the wheels Wr and Wf and mechanical braking torques imparted from the mechanical braking devices Br and Bf to the wheels Wr and Wf to cooperate with each other. The mechanical braking devices Bf and Br impart the mechanical braking torques according to the targets determined by this cooperative control process to the wheels Wr and Wf, and decelerate the vehicle V.

The power supply system 1 includes the first battery B1 serving as a first power storage device, the second battery B2 serving as a second power storage device, a vehicle accessory H serving as an electrical load that consumes power, and a power circuit 2 that connects these batteries B1 and B2 and the drive motors Mr and Mf.

The first battery B1 is a secondary battery in which both discharging in which chemical energy is converted into electrical energy and charging in which electrical energy is converted into chemical energy are possible. Hereinafter, a case in which a so-called lithium-ion storage battery that performs charging and discharging by lithium ions moving between electrodes is used as this first battery B1 will be described, but the disclosure is not limited thereto.

The first battery B1 is provided with a first battery sensor unit 81 in order to estimate the internal state of the first battery B1. The first battery sensor unit 81 is constituted by a plurality of sensors that detect physical quantities required for acquiring the charging rate, a temperature or the like of the first battery B1 in the ECU 7 and transmit signals according to detection values to the ECU 7. More specifically, the first battery sensor unit 81 is constituted by a voltage sensor that detects the terminal voltage of the first battery B1, a current sensor that detects a current flowing through the first battery B1, a temperature sensor that detects the temperature of the first battery B1, and the like.

The ECU 7 calculates a first power storage parameter increasing in accordance with the amount of power storage of the first battery B1, more specifically, a charging rate at which the amount of power storage of the first battery B1 is expressed in a percentage, on the basis of a known algorithm using detection values transmitted from the first battery sensor unit 81. Hereinafter, the charging rate of the first battery B1 calculated in the ECU 7 using signals transmitted from the first battery sensor unit 81 is referred to as a first state of charge (SOC).

The second battery B2 is a secondary battery in which both discharging in which chemical energy is converted into electrical energy and charging in which electrical energy is converted into chemical energy are possible. Hereinafter, a case in which a so-called lithium-ion storage battery that performs charging and discharging by lithium ions moving between electrodes is used as this second battery B2 will be described, but the disclosure is not limited thereto. As the second battery B2, for example, a capacitor may be used.

The second battery B2 is provided with a second battery sensor unit 82 in order to estimate the internal state of the second battery B2. The second battery sensor unit 82 is constituted by a plurality of sensors that detect physical quantities required for acquiring the charging rate, a temperature or the like of the second battery B2 in the ECU 7 and transmit signals according to detection values to the ECU 7. More specifically, the second battery sensor unit 82 is constituted by a voltage sensor that detects the terminal voltage of the second battery B2, a current sensor that detects a current flowing through the second battery B2, a temperature sensor that detects the temperature of the second battery B2, and the like.

The ECU 7 calculates a second power storage parameter increasing in accordance with the amount of power storage of the second battery B2, more specifically, a charging rate at which the amount of power storage of the second battery B2 is expressed in a percentage, on the basis of a known algorithm using detection values transmitted from the second battery sensor unit 82. Hereinafter, the charging rate of the second battery B2 calculated in the ECU 7 using signals transmitted from the second battery sensor unit 82 is referred to as a second SOC.

Here, the characteristics of the first battery B1 and the characteristics of the second battery B2 will be compared with each other.

First, the full charging state voltage of the first battery B1 is higher than the full charging state voltage of the second battery B2. Therefore, during traveling of the vehicle V, the voltage of a first power line 21 to be described later to which the first battery B1 is directly connected is higher than the voltage of a second power line 22 to which the second battery B2 is directly connected.

The first battery B1 is lower in output weight density and is higher in energy weight density than the second battery B2. In addition, the first battery B1 has a larger capacity than the second battery B2. That is, the first battery B1 has more excellent energy weight density than the second battery B2. In addition, the second battery B2 has more excellent output weight density than the first battery B1. Meanwhile, the energy weight density is the amount of power per unit weight [Wh/kg], and the output weight density is power per unit weight [W/kg]. Therefore, the first battery B1 that has excellent energy weight density is a capacity-type power storage device that is primarily intended for a high capacity, and the second battery B2 that has excellent output weight density is an output-type power storage device that is primarily intended for a high output. Therefore, in the power supply system 1, the first battery B1 is used as a main power supply, and the second battery B2 is used as a sub power supply that makes up for the first battery B1 that is the main power supply.

Figure 2:
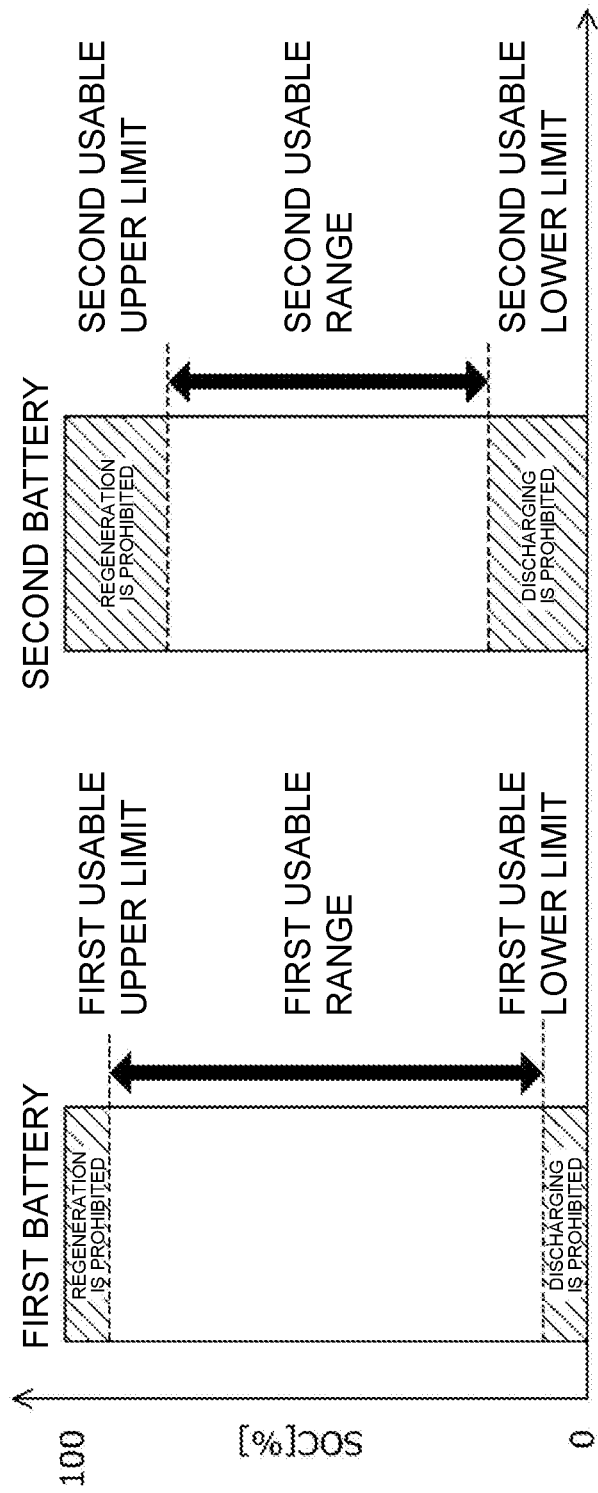
FIG. 2 is a diagram illustrating ranges of use of a first battery and a second battery.

FIG. 2 is a diagram illustrating ranges of use of the first battery B1 and the second battery B2. The left side of FIG. 2 represents a range of use of the first SOC of the first battery B1, and the right side thereof represents a range of use of the second SOC of the second battery B2.

In order to prevent the first battery B1 and the second battery B2 from deteriorating due to overcharging, in the first SOC[%] and the second SOC[%], a first usable upper limit and a second usable upper limit are both set at positions slightly lower than 100%. That is, in a case where the first SOC becomes higher than the first usable upper limit, there may be a concern of the first battery B1 deteriorating. In addition, in a case where the second SOC becomes higher than the second usable upper limit, there may be a concern of the second battery B2 deteriorating. For this reason, regenerative electric power is prohibited from being supplied to the first battery B1 in a case where the first SOC is higher than the first usable upper limit, and the regenerative electric power is prohibited from being supplied to the second battery B2 in a case where the second SOC is higher than the second usable upper limit.

In addition, in a case where the amount of power storage of a battery decreases excessively, its voltage also lowers excessively, and thus necessary power may not be able to be supplied. For this reason, in the first SOC and the second SOC, a first usable lower limit and a second usable lower limit are both set at positions slightly higher than 0%. That is, in a case where the first SOC is set to be equal to or less than the first usable lower limit, there may be a concern of required power not being able to be output from the first battery B1. In addition, in a case where the second SOC is set to be equal to or less than the second usable lower limit, there may be a concern of required power not being able to be output from the second battery B2. For this reason, the first battery B1 is prohibited from being discharged in a case where the first SOC is equal to or less than the first usable lower limit, and the second battery B2 is prohibited from being discharged in a case where the second SOC is equal to or less than the second usable lower limit.

As described above, the usable range of the first battery B1 is between the first usable upper limit and the first usable lower limit, and the usable range of the second battery B2 is between the second usable upper limit and the second usable lower limit.

Referring back to FIG. 1, the power circuit 2 includes a first inverter 3r that transfers power to and from the first drive motor Mr, a first power line 21 serving as a first circuit that connects the DC input and output terminal of this first inverter 3r and the first battery B1, a second inverter 3f that transfers power to and from the second drive motor Mf, a second power line 22 that connects the DC input and output terminal of this second inverter 3f, the second battery B2 and the vehicle accessory H, and a voltage converter 4 that connects the first power line 21 and the second power line 22.

The first inverter 3r and the second inverter 3f are, for example, PWM inverters based on pulse width modulation including a bridge circuit configured to bridge-connect a plurality of switching elements (for example, IGBTs), and have a function of converting direct-current power and alternating-current power. The first inverter 3r is connected to the first power line 21 on its DC input and output side, and is connected to each coil of the U-phase, V-phase, and W-phase of the first drive motor Mr on its AC input and output side. The second inverter 3f is connected to the second power line 22 on its DC input and output side, and is connected to each coil of the U-phase, V-phase, and W-phase of the second drive motor Mf on its AC input and output side. The inverters 3r and 3f drive on/off of a switching element of each phase in accordance with a gate drive signal generated at a predetermined timing from a gate drive circuit (not shown) of the ECU 7, to thereby convert direct-current power in the power lines 21 and 22 into three-phase alternating-current power and supply the converted power to the drive motors Mr and Mf, or to convert three-phase alternating-current power supplied from the drive motors Mr and Mf into direct-current power and supply the converted power to the power lines 21 and 22.

The voltage converter 4 connects the first power line 21 and the second power line 22, and converts a voltage between the first power line 21 and the second power line 22. The voltage converter 4 is a so-called bidirectional DCDC converter which is configured to combine a reactor, a smoothing capacitor, a plurality of switching elements (for example, IGBTs), and the like, and converts a direct-current voltage between the first power line 21 and the second power line 22. The voltage converter 4 drives on/off of the plurality of switching elements in accordance with a gate drive signal generated at a predetermined timing from a gate drive circuit (not shown) of the ECU 7, to thereby convert a voltage between the first power line 21 and the second power line 22.

In the present embodiment, the full charging state voltage of the first battery B1 is higher than the full charging state voltage of the second battery B2. Therefore, basically, the voltage of the first power line 21 is higher than the voltage of the second power line 22. Consequently, in a case where power in the first power line 21 is supplied to the second power line 22, the ECU 7 drives the voltage converter 4, and exhibits a stepping-down function. The term "stepping-down function" refers to a function of stepping down power in the first power line 21 which is a high-voltage side, outputting the stepped-down power to the second power line 22, and causing a current to flow from the first power line 21 side to the second power line 22 side. In addition, in a case where power in the second power line 22 is supplied to the first power line 21, the ECU 7 drives the voltage converter 4, and exhibits a boosting function. The term "boosting function" refers to a function of boosting power in the second power line 22 which is a low-voltage side, outputting the boosted power to the first power line 21, and causing a current to flow from the second power line 22 side to the first power line 21 side.

The vehicle accessory H is constituted by, for example, a battery heater that heats the first battery B1, an air conditioner that regulates the temperature of a vehicle interior (not shown), a DCDC converter that charges an auxiliary battery (not shown), and the like.

The ECU 7 is a microcomputer, and controls charging and discharging of the batteries B1 and B2 and a flow of power in the power lines 21 and 22 and the voltage converter 4 by operating the inverters 3r and 3f, the voltage converter 4, the mechanical braking devices Br and Bf, and the like during traveling of the vehicle V. Hereinafter, a detailed procedure of energy management control performed by the ECU 7 will be described.

Figure 3:
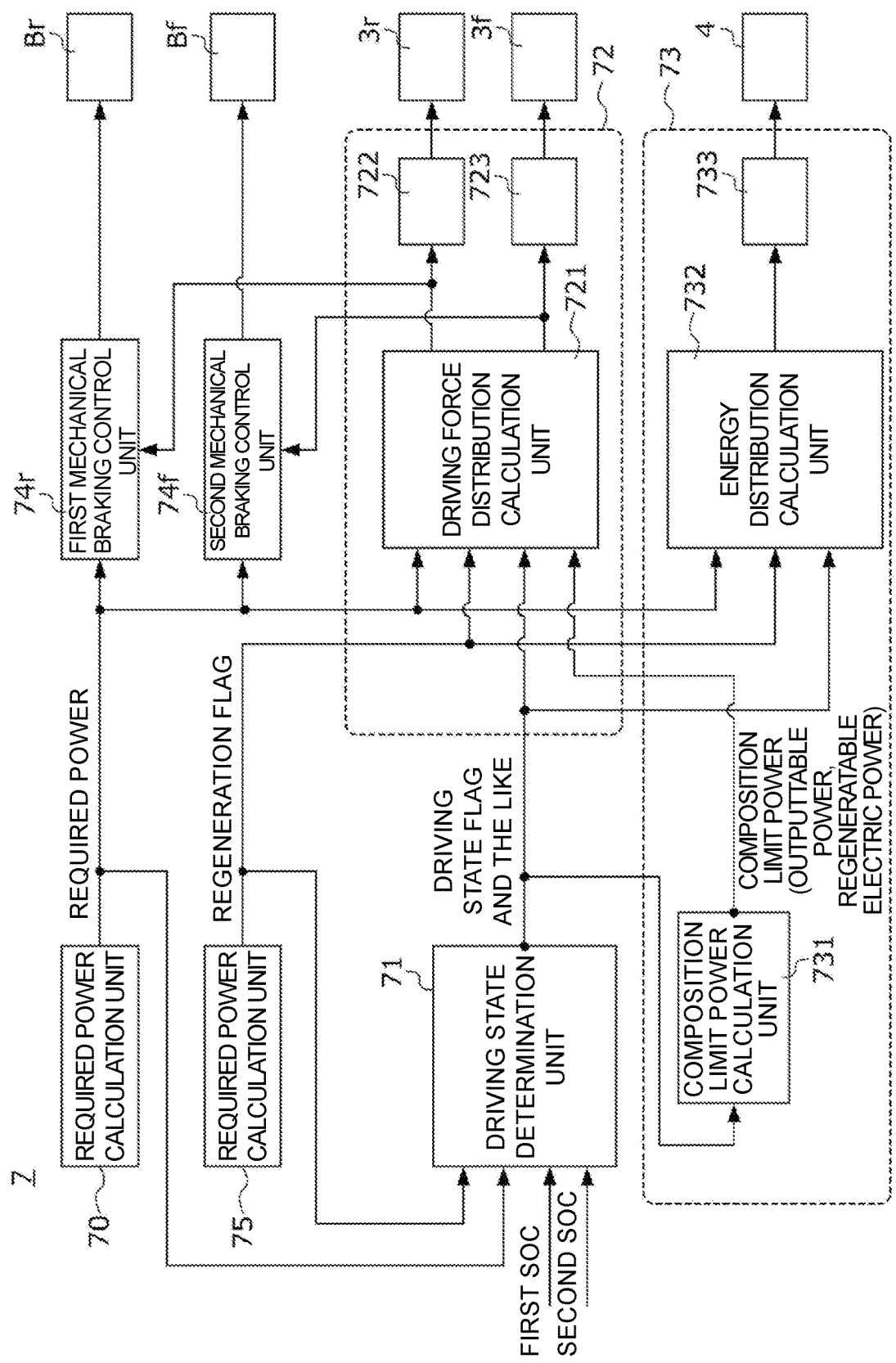
FIG. 3 is a diagram illustrating portions relating to the execution of energy management control among a plurality of control modules configured in an ECU.

FIG. 3 is a diagram illustrating portions relating to the execution of energy management control among a plurality of control modules configured in the ECU 7.

The ECU 7 includes a required power calculation unit 70 that calculates various types of required power, a driving state determination unit 71 that mainly executes a process relating to the determination of the driving state of the vehicle V, an inverter control unit 72 that mainly executes a process relating to torque distribution by the drive motors Mr and Mf using a determination result of the driving state determination unit 71 or the like and controls the first inverter 3r and the second inverter 3f using this process result, a voltage converter control unit 73 that mainly executes a process relating to of the rate of share of charging and discharging of the batteries B1 and B2 using the determination result of the driving state determination unit 71 or the like and controls the voltage converter 4 using this process result, a first mechanical braking control unit 74r and a second mechanical braking control unit 74f that control the mechanical braking devices Br and Bf using a result of the process relating to torque distribution in the inverter control unit 72, and a regeneration determination unit 75.

The required power calculation unit 70 calculates required power which is power that is required in various types of devices mounted in the vehicle V. Examples of the required power calculated in the required power calculation unit 70 include vehicle required power and total required power.

The vehicle required power is power required in devices required for driving the vehicle V, more specifically, the first drive motor Mr and the second drive motor Mf. The required power calculation unit 70 calculates a required driving force of the vehicle V on the basis of a detection value of an accelerator pedal position sensor that detects the position of an accelerator pedal (not shown) and a detection value of a brake pedal position sensor that detects the position of a brake pedal (not shown), and calculates the vehicle required power on the basis of this required driving force. This vehicle required power is set to be positive during power operations of the drive motors Mr and Mf, and is set to be negative during regenerative operations of the drive motors Mr and Mf.

The total required power is power required in the first power line 21 and the second power line 22 of the power supply system 1. The required power calculation unit 70 calculates accessory required power which is required power in the vehicle accessory H, and calculates the total required power by adding this accessory required power to the vehicle required power.

The regeneration determination unit 75 updates the value of a regeneration flag. The regeneration flag is a flag that clarifies a state in which regenerative traveling where regenerative braking torques are imparted from the drive motors Mr and Mf to the wheels Wr and Wf is possible, and can take on a value of "0" or "1." A value of "0" for the regeneration flag indicates a state in which regenerative traveling is not possible, and a value of "1" for the regeneration flag indicates a state in which regenerative traveling is possible. The regeneration determination unit 75 updates the value of the regeneration flag on the basis of the detection value of the accelerator pedal position sensor, the brake pedal position sensor, or the like described above.

The driving state determination unit 71 updates values of various types of flags indicating the driving state of the vehicle V, the usage states of the batteries B1 and B2, or the like, in accordance with procedures to be described later with reference to FIGS. 10 to 23, on the basis of required power calculated in the required power calculation unit 70, a regeneration flag updated in the regeneration determination unit 75, and various inputs such as the first SOC and the second SOC calculated on the basis of the detection signals of the battery sensor units 81 and 82.

Examples of flags of which the values are updated in the driving state determination unit 71 include a driving state flag, a first battery usage flag, a second battery usage flag, a second SOC consumption request flag, an electrical pass execution flag, a voltage converter deactivation request flag, a first battery failure flag, and a second battery failure flag.

The driving state flag is a flag that clarifies the current driving state of the vehicle V, and can take on a value of any of "0," "1," "2," "3," "4," and "5." In the power supply system 1, six driving states, that is, a "normal traveling state," a "high-output traveling state," a "low-output traveling state," a "regenerative traveling state," an "idle state," and a "failure traveling state" are defined as the driving states of the vehicle V. A value of "0" for the driving state flag indicates that the driving state is the normal traveling state. A value of "1" for the driving state flag indicates that the driving state is the high-output traveling state. A value of "2" for the driving state flag indicates that the driving state is the low-output traveling state. A value of "3" for the driving state flag indicates that the driving state is the regenerative traveling state. A value of "4" for the driving state flag indicates that the driving state is the idle state. A value of "5" for the driving state flag indicates that the driving state is the failure traveling state.

The first battery usage flag is a flag that clarifies the usage state of the first battery B1, and can take on a value of any of "0," "1," and "2." A value of "0" for the first battery usage flag indicates that charging and discharge of the first battery B1, that is, both the supply of power to the first battery B1 and the supply of power from the first battery B1 to a load, are permitted. A value of "1" for the first battery usage flag indicates a state in which the first battery B1 is prohibited from being discharged. A value of "2" for the first battery usage flag indicates that the first battery B1 is prohibited from being charged.

The second battery usage flag is a flag that clarifies the usage state of the second battery B2, and can take on a value of any of "0," "1," and "2." A value of "0" for the second battery usage flag indicates that charging and discharge of the second battery B2, that is, both the supply of power to the second battery B2 and the supply of power from the second battery B2 to a load, are permitted. A value of "1" for the second battery usage flag indicates a state in which the second battery B2 is prohibited from being discharged. A value of "2" for the second battery usage flag indicates that the second battery B2 is prohibited from being charged.

The second SOC consumption flag is a flag that clarifies a state in which the second SOC of the second battery B2 is close to the second usable upper limit, that is, a state in which the consumption of the second SOC is required, and can take on a value of any of "0" and "1." A value of "0" for the second SOC consumption flag indicates a state in which the consumption of the second SOC is not required. In addition, a value of "1" for the second SOC consumption flag indicates a state in which the consumption of the second SOC is required.

The electrical pass execution flag is a flag that clarifies a state in which power discharged from the first battery B1 is supplied to the second battery B2 and electrical pass control for charging the second battery B2 is executed, and can take on a value of any of "0," "1," and "2." A value of "0" for the electrical pass execution flag indicates a state in which electrical pass control is not executed. A value of "1" for the electrical pass execution flag indicates a state in which electrical pass control is executed. In addition, a value of "2" for the electrical pass execution flag indicates a state in which the execution of electrical pass control is interrupted (that is, a state in which the execution of electrical pass control is temporarily prohibited).

The voltage converter deactivation request flag is a flag that clarifies a state in which the deactivation of the voltage converter 4 is required in order to reduce a loss occurring in the voltage converter 4, and can take on a value of any of "0" and "1." A value of "0" for the voltage converter deactivation request flag indicates a state in which the deactivation of the voltage converter 4 is not required, and a value of "1" for the voltage converter deactivation request flag indicates a state in which the deactivation of the voltage converter 4 is required.

The first battery failure flag is a flag that clarifies a state in which the first battery B1 is out of order, and can take on a value of any of "0" and "1." A value of "0" for the first battery failure flag indicates that the first battery B1 is normal and is in a usable state. In addition, a value of "1" for the first battery failure flag indicates that the first battery B1 is out of order and is in an unusable state.

The second battery failure flag is a flag that clarifies a state in which the second battery B2 is out of order, and can take on a value of any of "0" and "1." A value of "0" for the second battery failure flag indicates that the second battery B2 is normal and is in a usable state. In addition, a value of "1" for the second battery failure flag indicates that the second battery B2 is out of order and is in an unusable state.

Next, a flow of power realized in each driving state will be described with reference to FIGS. 4A to 9B.

Figure 4A:
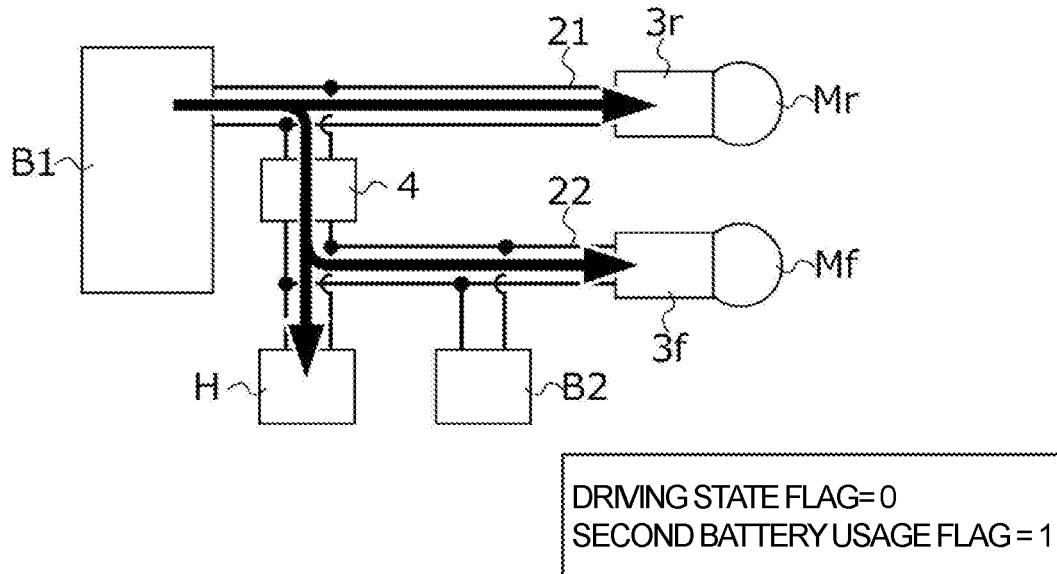
FIG. 4A is a diagram schematically illustrating a flow of power realized in the power supply system when a driving state is a normal traveling state.
Figure 4B:
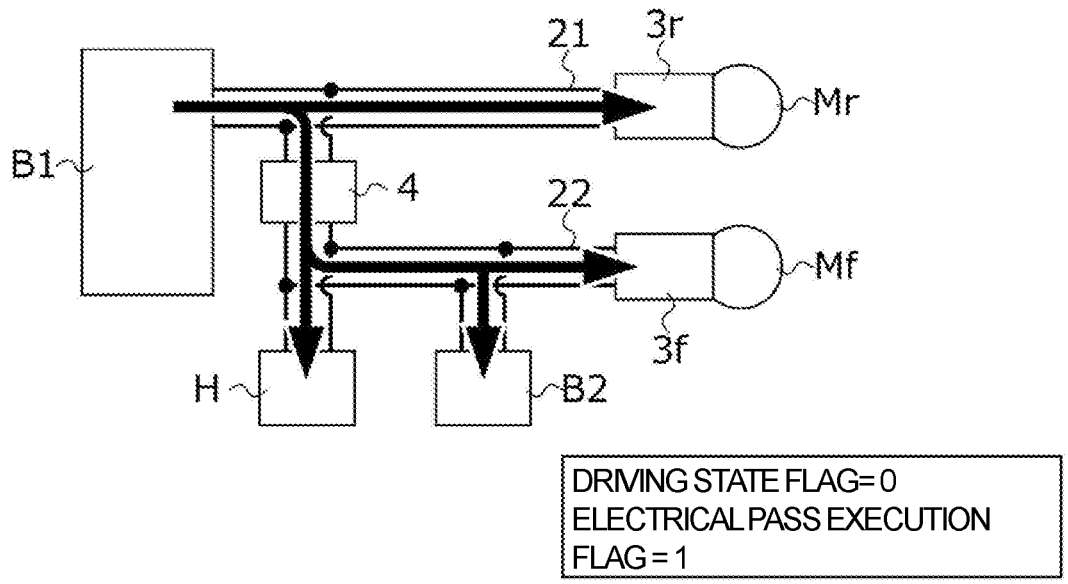
FIG. 4B is a diagram schematically illustrating a flow of power realized in the power supply system when the driving state is a normal traveling state.
Figure 4C:
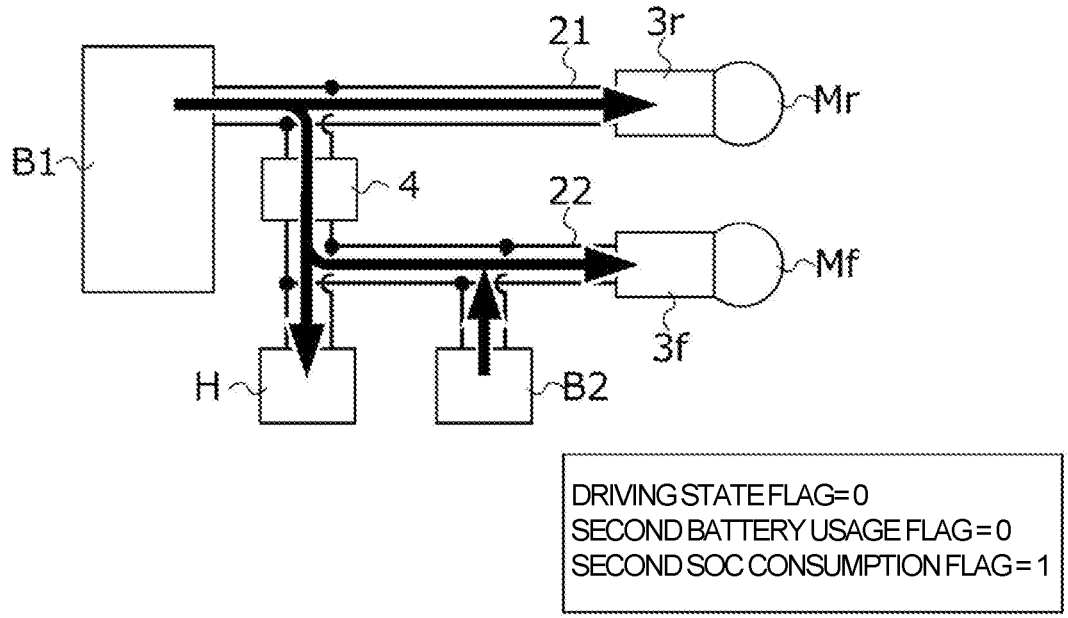
FIG. 4C is a diagram schematically illustrating a flow of power realized in the power supply system when the driving state is a normal traveling state.

FIGS. 4A to 4C are diagrams schematically illustrating flows of power realized in the power supply system 1 when the driving state is the normal traveling state. More specifically, FIG. 4A shows a flow of power realized in a case where the value of the driving state flag is "0" and the value of the second battery usage flag is "1," and FIG. 4B shows a flow of power realized in a case where the value of the driving state flag is "0" and the value of the electrical pass execution flag is "1." FIG. 4C shows a flow of power realized in a case where the value of the driving state flag is "0," the value of the second battery usage flag is "0," and the value of the second SOC consumption flag is "1."

As shown in FIGS. 4A to 4C, in a case where the driving state is the normal traveling state, the power supply system 1 supplies power to both the first drive motor Mr and the second drive motor Mf, and performs traveling using the first wheel Wr and the second wheel Wf as driving wheels. That is, in a case where the driving state is the normal traveling state, the drive mode of the vehicle V is an AWD mode.

As shown in FIG. 4A, in a case where the driving state is the normal traveling state, basically, discharging from the second battery B2 to the second power line 22 is prohibited. Therefore, all power required in the first drive motor Mr, the second drive motor Mf, and the vehicle accessory H is covered by power discharged from the first battery B1. That is, a portion of power that is discharged from the first battery B1 to the first power line 21 is supplied to the second power line 22 through the voltage converter 4, and is consumed in the second drive motor Mf and the vehicle accessory H.

As shown in FIG. 4B, in a case where electrical pass control is executed while the driving state is the normal traveling state, a portion of the power that is discharged from the first battery B1 is supplied to the second battery B2. In this case, all power required in the first drive motor Mr, the second drive motor Mf, the vehicle accessory H, and the second battery B2 is covered by the power that is discharged from the first battery B1.

As shown in FIG. 4C, in a case where the value of the second SOC consumption flag is set to "1" while the driving state is the normal traveling state, power is discharged from the second battery B2 to the second power line 22, and is consumed in the second drive motor Mf and the vehicle accessory H. Thereby, the consumption of the second SOC of the second battery B2 is promoted. Meanwhile, in a case where power is discharged from the second battery B2 to the second power line 22, the burden of the first battery B1 can be reduced to that extent, and thus it is possible to decrease power flowing from the first power line 21 to the second power line 22 through the voltage converter 4 more than in the example of FIG. 4A. Therefore, in a case where the case of FIG. 4C and the case of FIG. 4A are compared with each other, loss in the voltage converter 4 is less in the case of FIG. 4C.

Figure 5:
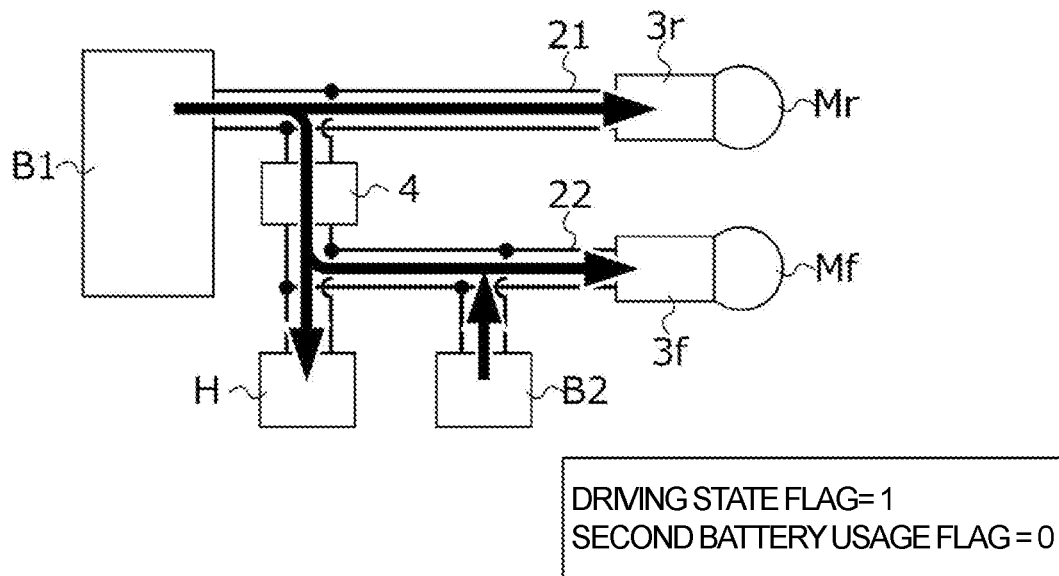
FIG. 5 is a diagram schematically illustrating a flow of power realized in the power supply system when the driving state is a high-output traveling state.

FIG. 5 is a diagram schematically illustrating a flow of power realized in the power supply system 1 when the driving state is the high-output traveling state. More specifically, FIG. 5 shows a flow of power realized in a case where the value of the driving state flag is "1" and the value of the second battery usage flag is "0."

As shown in FIG. 5, in a case where the driving state is the high-output traveling state, the power supply system 1 supplies power to both the first drive motor Mr and the second drive motor Mf, and performs traveling using the first wheel Wr and the second wheel Wf as driving wheels. That is, in a case where the driving state is the high-output traveling state, the drive mode of the vehicle V is an AWD mode.

In the high-output traveling state, the total required power which is power required in the power lines 21 and 22 is larger than in the normal traveling state described with reference to FIGS. 4A to 4C. Thus, as shown in FIG. 5, in a case where the driving state is the high-output traveling state, basically, power is discharged from the second battery B2 to the second power line 22, and is consumed in the second drive motor Mf and the vehicle accessory H. Thereby, a shortage of power which is not covered by the first battery B1 alone in the total required power is compensated for by the second battery B2.

Figure 6A:
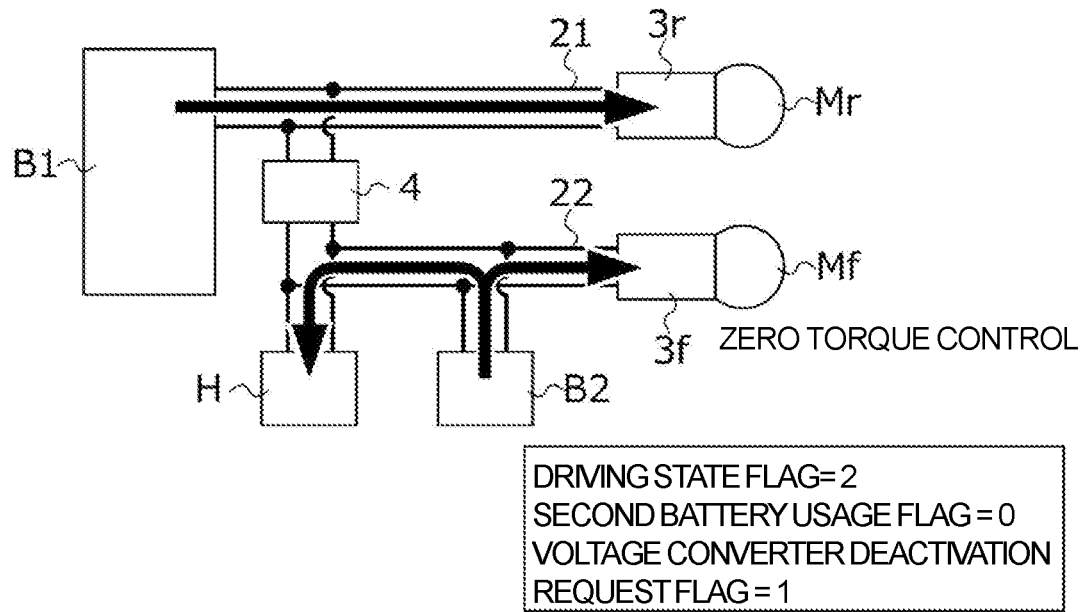
FIG. 6A is a diagram schematically illustrating a flow of power realized in the power supply system when the driving state is a low-output traveling state.
Figure 6B:
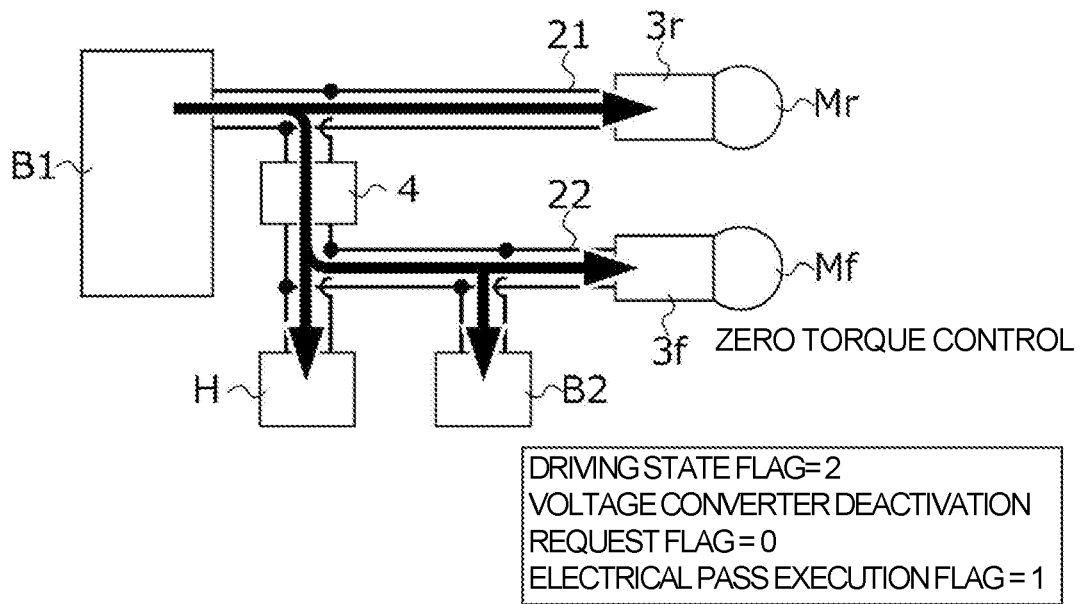
FIG. 6B is a diagram schematically illustrating a flow of power realized in the power supply system when the driving state is a low-output traveling state.

FIGS. 6A and 6B are diagrams schematically illustrating flows of power realized in the power supply system 1 when the driving state is the low-output traveling state. More specifically, FIG. 6A shows a flow of power realized in a case where the value of the driving state flag is "2," the value of the second battery usage flag is "0," and the value of the voltage converter deactivation request flag is "1," and FIG. 6B shows a flow of power realized in a case where the value of the driving state flag is "2," the value of the voltage converter deactivation request flag is "0," and the value of the electrical pass execution flag is "1."

As shown in FIGS. 6A and 6B, in a case where the driving state is the low-output traveling state, the power supply system 1 supplies required power to the first drive motor Mr, performs traveling using the first wheel Wr as a driving wheel, and supplies only power required for performing zero torque control in which the first wheel Wr is followed by the second wheel Wf with a drive torque set to 0 to the second drive motor Mf. That is, in a case where the driving state is the low-output traveling state, the drive mode of the vehicle V is a 2WD mode.

In the low-output traveling state, the power required in the second power line 22 is only power required for maintaining the drive torque of the second drive motor Mf at 0 and power required in the vehicle accessory H, and is less than that in the normal traveling state or the high-output traveling state described above. Therefore, in the low-output traveling state, the power that is required in the second power line 22 can be covered by power discharged from the second battery B2 alone. Consequently, as shown in FIG. 6A, in a case where the driving state is the low-output traveling state, basically, discharging from the second battery B2 to the second power line 22 is permitted, and the power required for performing zero torque control on the second drive motor Mf and the power required in the vehicle accessory H are covered by the second battery B2 alone.

As shown in FIG. 6B, in a case where the second SOC falls below a predetermined threshold while the driving state is the low-output traveling state, discharging from the second battery B2 to the second power line 22 is prohibited, and electrical pass control is further executed as necessary. Thereby, a portion of power that is discharged from the first battery B1 to the first power line 21 is supplied to the second power line 22 side through the voltage converter 4. Thereby, the power required for performing zero torque control on the second drive motor Mf, the power required in the vehicle accessory H, and the power required for charging the second battery B2 are all covered by the power that is discharged from the first battery B1.

Figure 7A:
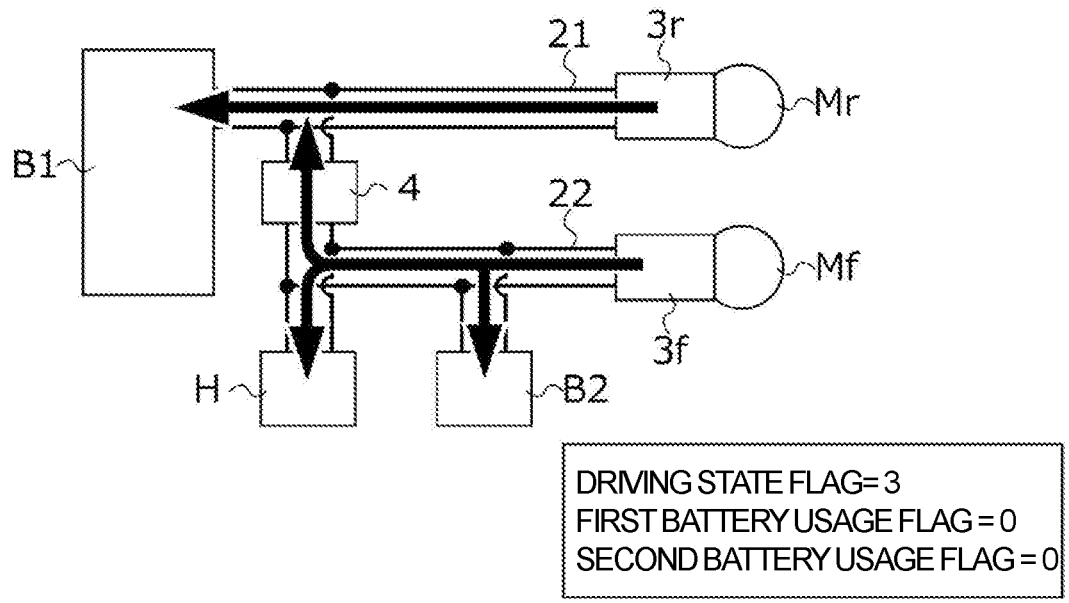
FIG. 7A is a diagram schematically illustrating a flow of power realized in the power supply system when the driving state is a regenerative traveling state.
Figure 7B:
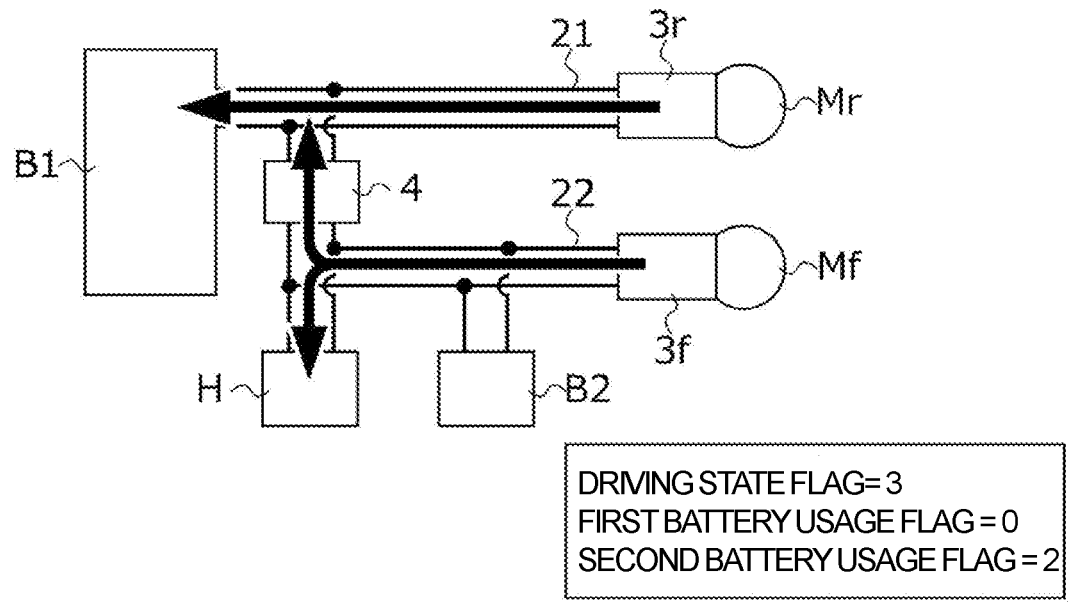
FIG. 7B is a diagram schematically illustrating a flow of power realized in the power supply system when the driving state is a regenerative traveling state.
Figure 7C:
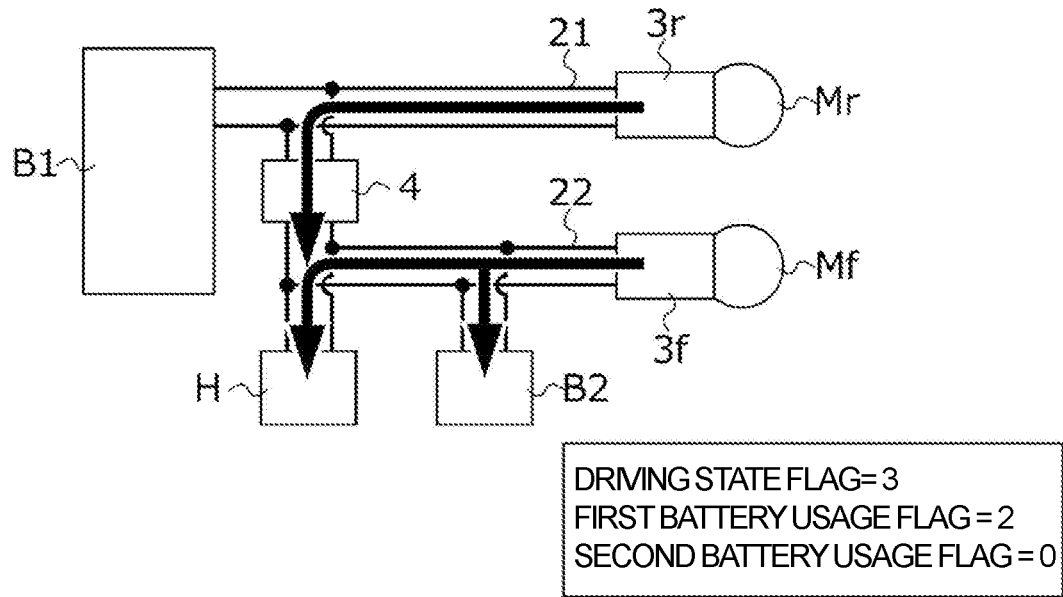
FIG. 7C is a diagram schematically illustrating a flow of power realized in the power supply system when the driving state is a regenerative traveling state.
Figure 7D:
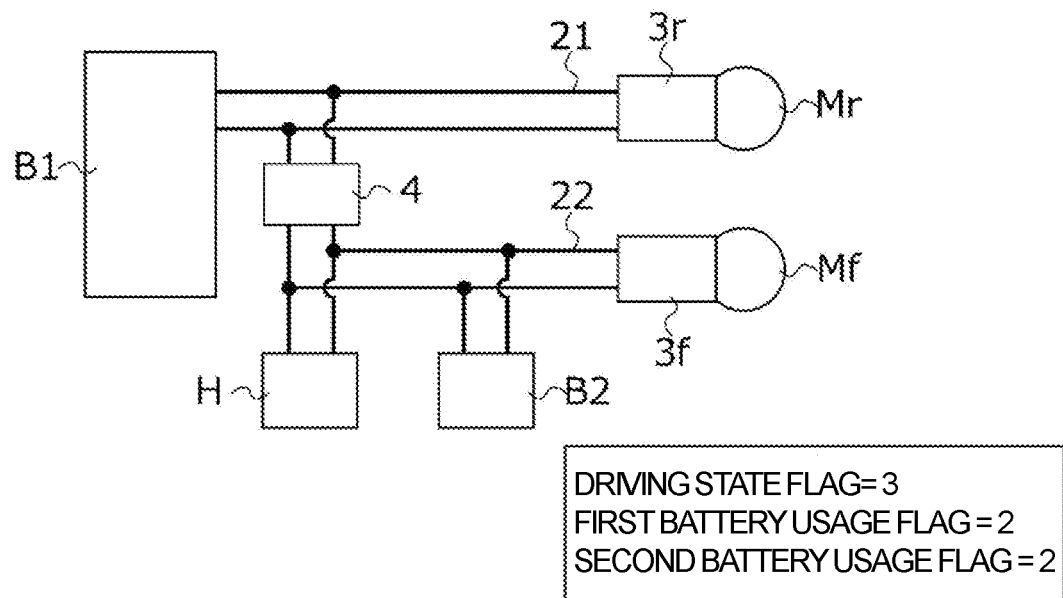
FIG. 7D is a diagram schematically illustrating a flow of power realized in the power supply system when the driving state is a regenerative traveling state.
Figure 7E:
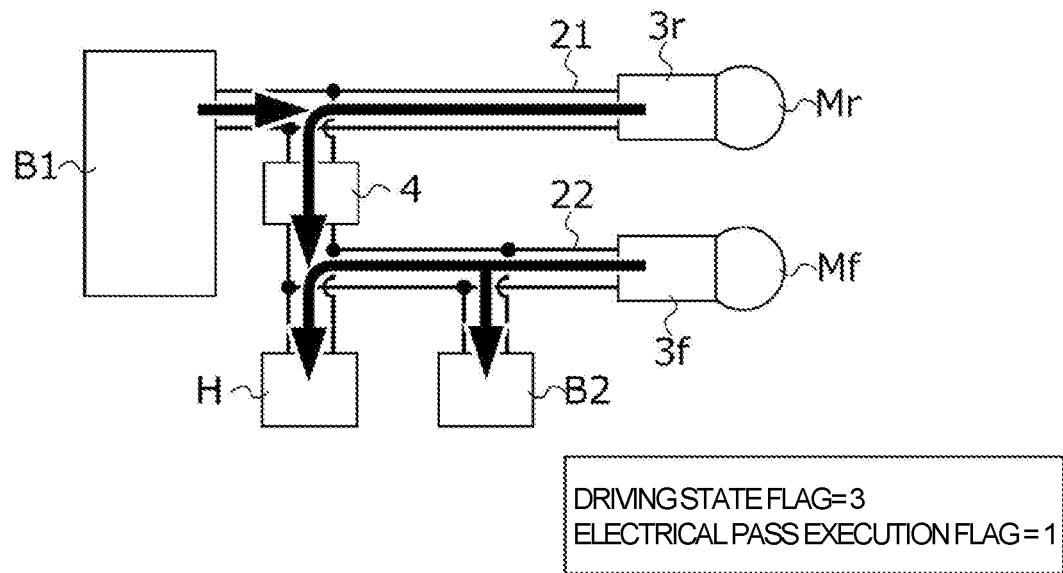
FIG. 7E is a diagram schematically illustrating a flow of power realized in the power supply system when the driving state is a regenerative traveling state.

FIGS. 7A to 7E are diagrams schematically illustrating flows of power realized in the power supply system 1 when the driving state is a regenerative traveling state. More specifically, FIG. 7A shows a flow of power realized in a case where the value of the driving state flag is "3" and both the values of the first battery usage flag and the second battery usage flag are "0," FIG. 7B shows a flow of power realized in a case where the value of the driving state flag is "3," the value of the first battery usage flag is "0," and the value of the second battery usage flag is "2," FIG. 7C shows a flow of power realized in a case where the value of the driving state flag is "3," the value of the first battery usage flag is "2," and the value of the second battery usage flag is "0," FIG. 7D shows a flow of power realized in a case where the value of the driving state flag is "3" and both the values of the first battery usage flag and the second battery usage flag are "2," and FIG. 7E shows a flow of power realized in a case where the value of the driving state flag is "3" and the value of the electrical pass execution flag is "1."

In a case where the driving state is a regenerative traveling state, the drive mode is set as an AWD mode so that as much regenerative electric power as possible can be recovered by the batteries B1 and B2 and that losses in the mechanical braking devices Br and Bf can be reduced. Therefore, in a case where the driving state is a regenerative traveling state, as shown in FIGS. 7A to 7C and 7E, regenerative electric power is generated in the first drive motor Mr and the second drive motor Mf, and is supplied to the first power line 21 and the second power line 22.

As shown in FIG. 7A, in a case where the driving state is a regenerative traveling state and both the values of the first battery usage flag and the second battery usage flag are "0," regenerative electric power that is supplied from the first drive motor Mr to the first power line 21 is consumed in charging of the first battery B1, and regenerative electric power that is supplied from the second drive motor Mf to the second power line 22 is consumed in charging of the second battery B2 and driving of the vehicle accessory H. Meanwhile, as will be described later with reference to FIG. 24, a regenerative braking torque imparted to the second wheel that is a front wheel during regenerative deceleration is larger than a regenerative braking torque imparted to the first wheel that is a rear wheel. Therefore, the regenerative electric power that is supplied from the second drive motor Mf to the second power line 22 is larger than the regenerative electric power that is supplied from the first drive motor Mr to the first power line 21. Therefore, an excess portion that is not able to be consumed in the second battery B2 and the vehicle accessory H in the regenerative electric power supplied to the second power line 22 is supplied to the first battery B1 through the voltage converter 4.

As shown in FIG. 7B, in a case where the driving state is a regenerative traveling state, the value of the first battery usage flag is "0," and the value of the second battery usage flag is "2," the second battery B2 is prohibited from being charged. In addition, a portion that is not able to be consumed in the vehicle accessory H in regenerative electric power in the second power line 22 is supplied to the first power line 21 through the voltage converter 4, and is consumed in charging of the first battery B1. Meanwhile, in a case where the example of FIG. 7B and the example of FIG. 7A are compared with each other, passage power of the voltage converter 4 further increases than that in the example of FIG. 7A to the extent that the second battery B2 is prohibited from being charged in the example of FIG. 7B. For this reason, in the example of FIG. 7B, a loss in the voltage converter 4 is larger than that in the example of FIG. 7A.

As shown in FIG. 7C, in a case where the driving state is a regenerative traveling state, the value of the first battery usage flag is "2," and the value of the second battery usage flag is "0," the first battery B1 is prohibited from being charged. Therefore, the regenerative electric power that is supplied from the first drive motor Mr to the first power line 21 is supplied to the second power line 22 through the voltage converter 4. In addition, the regenerative electric power in the second power line 22 is consumed in charging of the second battery B2 and driving of the vehicle accessory H.

As shown in FIG. 7D, in a case where the driving state is a regenerative traveling state and both values of the first battery usage flag and the second battery usage flag are "2," the first battery B1 and the second battery B2 are prohibited from being charged. In this case, the regenerative electric power that is supplied from the drive motors Mr and Mf to the power lines 21 and 22 is set to be 0. In addition, in a case where the regenerative electric power is set to be 0, the regenerative braking torques that are imparted from the drive motors Mr and Mf to the wheels Wr and Wf are also set to be 0. However, in this case, mechanical braking torques that are imparted from the mechanical braking devices Br and Bf to the wheels Wr and Wf increase, and thereby a deceleration operation as required is realized.

As shown in FIG. 7E, in a case where the driving state is a regenerative traveling state and the value of the electrical pass execution flag is set to "1," the regenerative electric power that is supplied from the first drive motor Mr to the first power line 21 and the power that is discharged from the first battery B1 to the first power line 21 are supplied to the second power line 22 through the voltage converter 4. In addition, the regenerative electric power that is supplied from the second drive motor Mf to the second power line 22 and the power that is supplied from the voltage converter 4 to the second power line 22 are consumed in charging of the second battery B2 and driving of the vehicle accessory H.

Figure 8A:
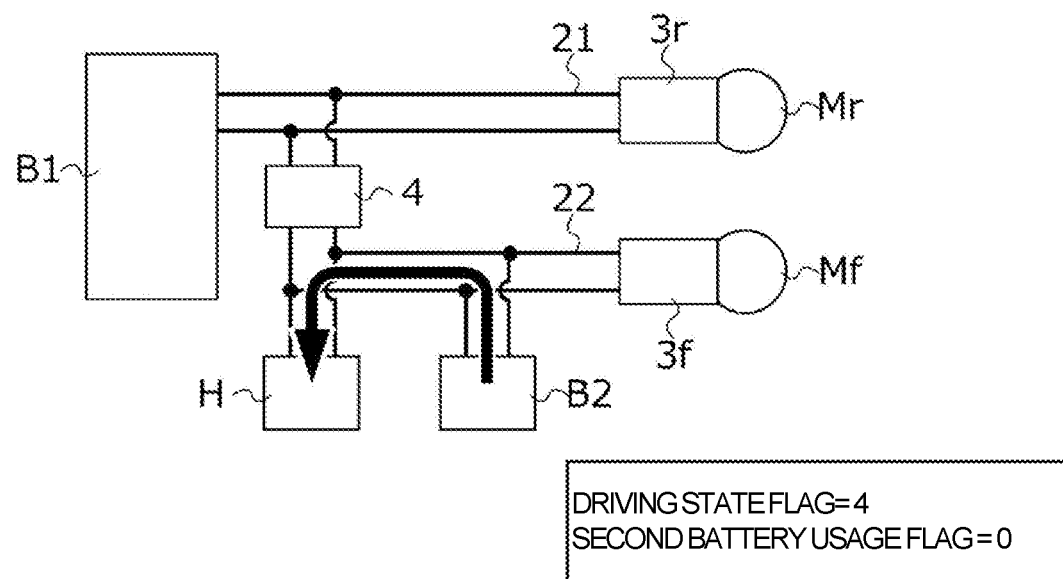
FIG. 8A is a diagram schematically illustrating a flow of power realized in the power supply system when the driving state is an idle state.
Figure 8B:
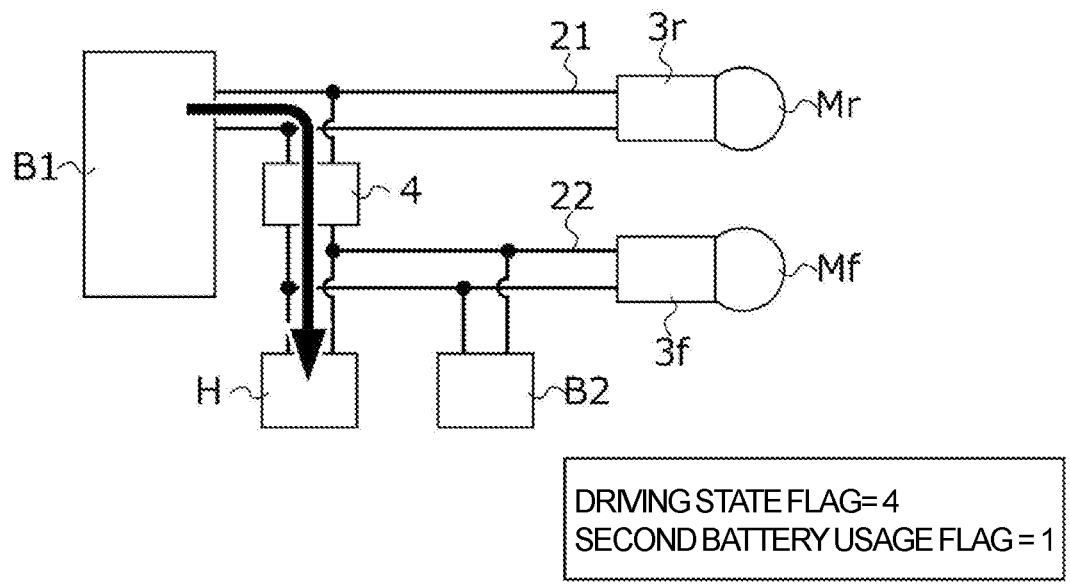
FIG. 8B is a diagram schematically illustrating a flow of power realized in the power supply system when the driving state is an idle state.

FIGS. 8A and 8B are diagrams schematically illustrating flows of power realized in the power supply system 1 when the driving state is an idle state. More specifically, FIG. 8A shows a flow of power realized in a case where the value of the driving state flag is "4" and the value of the second battery usage flag is "0," and FIG. 8B shows a flow of power realized in a case where the value of the driving state flag is "4" and the value of the second battery usage flag is "1."

As shown in FIGS. 8A and 8B, in a case where the driving state is an idle state, the power supply system 1 stops the supply of power to the drive motors Mr and Mf, and supplies power to only the vehicle accessory H.

Consequently, in a case where the driving state is an idle state, basically, discharging from the second battery B2 to the second power line 22 is permitted, and power required in the vehicle accessory H is covered by the second battery B2. Thereby, in the idle state, since the voltage converter 4 is deactivated as shown in FIG. 8A and a flow of power between the first power line 21 and the second power line 22 can be interrupted, a loss in the voltage converter 4 can be reduced to 0.

In addition, in a case where the driving state is an idle state, a decrease in the second SOC of the second battery B2 gives rise to a concern of necessary power not being able to be discharged from the second battery B2 during the next acceleration. Consequently, in a case where the driving state is an idle state, discharging from the second battery B2 to the second power line 22 is prohibited in accordance with the second SOC of the second battery B2. As shown in FIG. 8B, in a case where the second battery B2 is prohibited from being discharged while the driving state is an idle state, power that is discharged from the first battery B1 is supplied to the vehicle accessory H. In this case, since the power that is discharged from the first battery B1 passes through the voltage converter 4, a loss occurs in the voltage converter 4 as compared with the case of FIG. 8A, but the consumption of the second SOC of the second battery B2 can be suppressed.

Figure 9A:
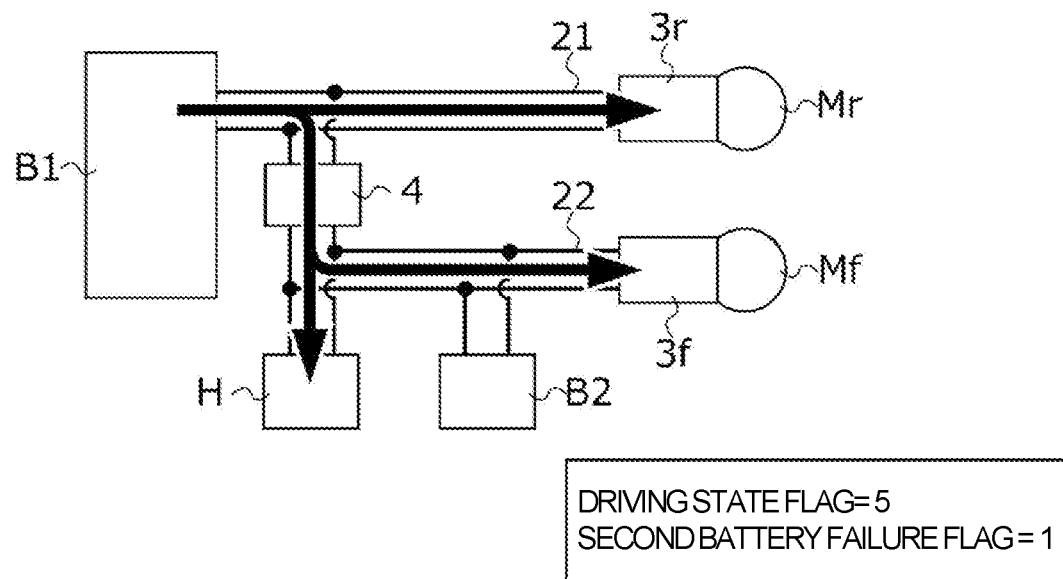
FIG. 9A is a diagram schematically illustrating a flow of power realized in the power supply system when the driving state is a failure traveling state.
Figure 9B:
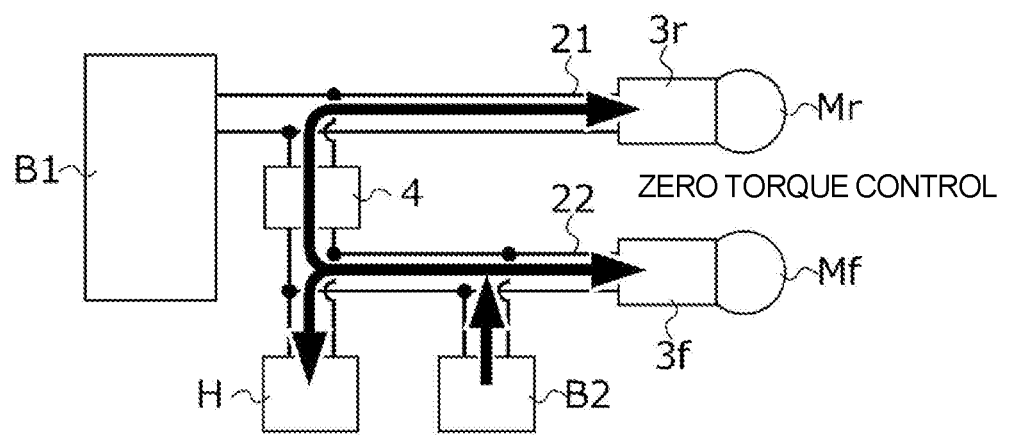
FIG. 9B is a diagram schematically illustrating a flow of power realized in the power supply system when the driving state is a failure traveling state.

FIGS. 9A and 9B are diagrams schematically illustrating flows of power realized in the power supply system 1 when the driving state is a failure traveling state. More specifically, FIG. 9A shows a flow of power realized in a case where the value of the driving state flag is "5" and the value of the second battery failure flag is "1," and FIG. 9B shows a flow of power realized in a case where the value of the driving state flag is "5" and the value of the first battery failure flag is "1."

As shown in FIG. 9A, in a case where the second battery B2 is out of order, all power required in the first drive motor Mr, the second drive motor Mf, and the vehicle accessory H is covered by the first battery B1.

In addition, as shown in FIG. 9B, in a case where the first battery B1 is out of order, all power required in the first drive motor Mr, the second drive motor Mf, and the vehicle accessory H is covered by the second battery B2. However, as described above, the capacity of the second battery B2 is smaller than that of the first battery B1. Consequently, in the power supply system 1, in order to make a cruising distance based on only the second battery B2 as long as possible, traveling is performed using the second wheel Wf as a driving wheel and using the first wheel Wr as a driven wheel in a case where the first battery B1 is out of order. That is, zero torque control is performed on the first drive motor Mr using power that is discharged from the second battery B2, and power required for the first drive motor Mr is made as little as possible. Thereby, it is possible to increase a cruising distance after the failure of the first battery B1.

Referring back to FIG. 3, the inverter control unit 72 includes a driving force distribution calculation unit 721, a first gate drive circuit 722, and a second gate drive circuit 723, and controls the first inverter 3r and the second inverter 3f by using these components.

The driving force distribution calculation unit 721 calculates a first required motor torque for first drive motor Mr and a second required motor torque for the second drive motor Mf so that the flows of power shown in FIG. 4A to FIG. 9B are realized on the basis of required power calculated by the required power calculation unit 70, a regeneration flag updated by the regeneration determination unit 75, battery composition limit power (described later) calculated in the voltage converter control unit 73, various types of flags updated by the driving state determination unit 71, and the like. Similarly to the above-described vehicle required power, the first required motor torque and the second required motor torque are set to be positive during power operations of the drive motors Mr and Mf, and are set to be negative during regenerative operations of the drive motors Mr and Mf. Meanwhile, a specific arithmetic procedure in this driving force distribution calculation unit 721 will be described later with reference to FIG. 24.

The first gate drive circuit 722 performs switching control on the first inverter 3r in accordance with the first required motor torque calculated in the driving force distribution calculation unit 721. Thereby, a drive torque (in a case where the first required motor torque is positive) or a regenerative braking torque (in a case where the first required motor torque is negative) having a magnitude according to the first required motor torque is imparted from the first drive motor Mr to the first wheel Wr.

The second gate drive circuit 723 performs switching control on the second inverter 3f in accordance with the second required motor torque calculated in the driving force distribution calculation unit 721. Thereby, a drive torque (in a case where the second required motor torque is positive) or regenerative braking torque (in a case where the second required motor torque is negative) having a magnitude according to the second required motor torque is imparted from the second drive motor Mf to the second wheel Wf.

The first mechanical braking control unit 74r calculates a first target braking torque equivalent to a target for a braking torque that is imparted to the first wheel Wr during deceleration of the vehicle V, calculates a first target mechanical braking torque by subtracting the first required motor torque calculated by the driving force distribution calculation unit 721 from this first target braking torque, and inputs the calculated torques to the first mechanical braking device Br. Here, the first target braking torque is calculated on the basis of the vehicle required power calculated in the required power calculation unit 70. Thereby, in a case where a regenerative braking torque that is imparted from the first drive motor Mr to the first wheel Wr is insufficient during deceleration of the vehicle V, a mechanical braking torque is imparted from the first mechanical braking device Br to the first wheel Wr so as to compensate for this insufficiency.

The second mechanical braking control unit 74f calculates a second target braking torque equivalent to a target for a braking torque that is imparted to the second wheel Wf during deceleration of the vehicle V, calculates a second target mechanical braking torque by subtracting the second required motor torque calculated by the driving force distribution calculation unit 721 from this second target braking torque, and inputs the calculated torques to the second mechanical braking device Bf. Here, the second target braking torque is calculated on the basis of the vehicle required power calculated in the required power calculation unit 70. Thereby, in a case where a regenerative braking torque that is imparted from the second drive motor Mf to the second wheel Wf is insufficient during deceleration of the vehicle V, a mechanical braking torque is imparted from the second mechanical braking device Bf to the second wheel Wf so as to compensate for this insufficiency.

The voltage converter control unit 73 includes a composition limit power calculation unit 731, an energy distribution calculation unit 732, and a gate drive circuit 733, and controls the voltage converter 4 by using these components.

The energy distribution calculation unit 732 calculate required passage power for power that passes through the voltage converter 4 so that the flows of power shown in FIGS. 4A to 9B are realized on the basis of required power calculated in the required power calculation unit 70, a regeneration flag updated in the regeneration determination unit 75, various types of flags updated in the driving state determination unit 71, and the like. This required passage power is set to be positive, for example, with respect to the first power line 21 side to the second power line 22 side. Meanwhile, a specific arithmetic procedure in this energy distribution calculation unit 732 will be described later with reference to FIG. 25.

The gate drive circuit 733 converts the required passage power calculated by the energy distribution calculation unit 732 into a target for a current flowing through the voltage converter 4 from the first power line 21 side to the second power line 22 side, and performs switching control on the voltage converter 4 so that this target is realized.

Next, a specific arithmetic procedure in the driving state determination unit 71 will be described with reference to FIGS. 10 to 23.

Figure 10:
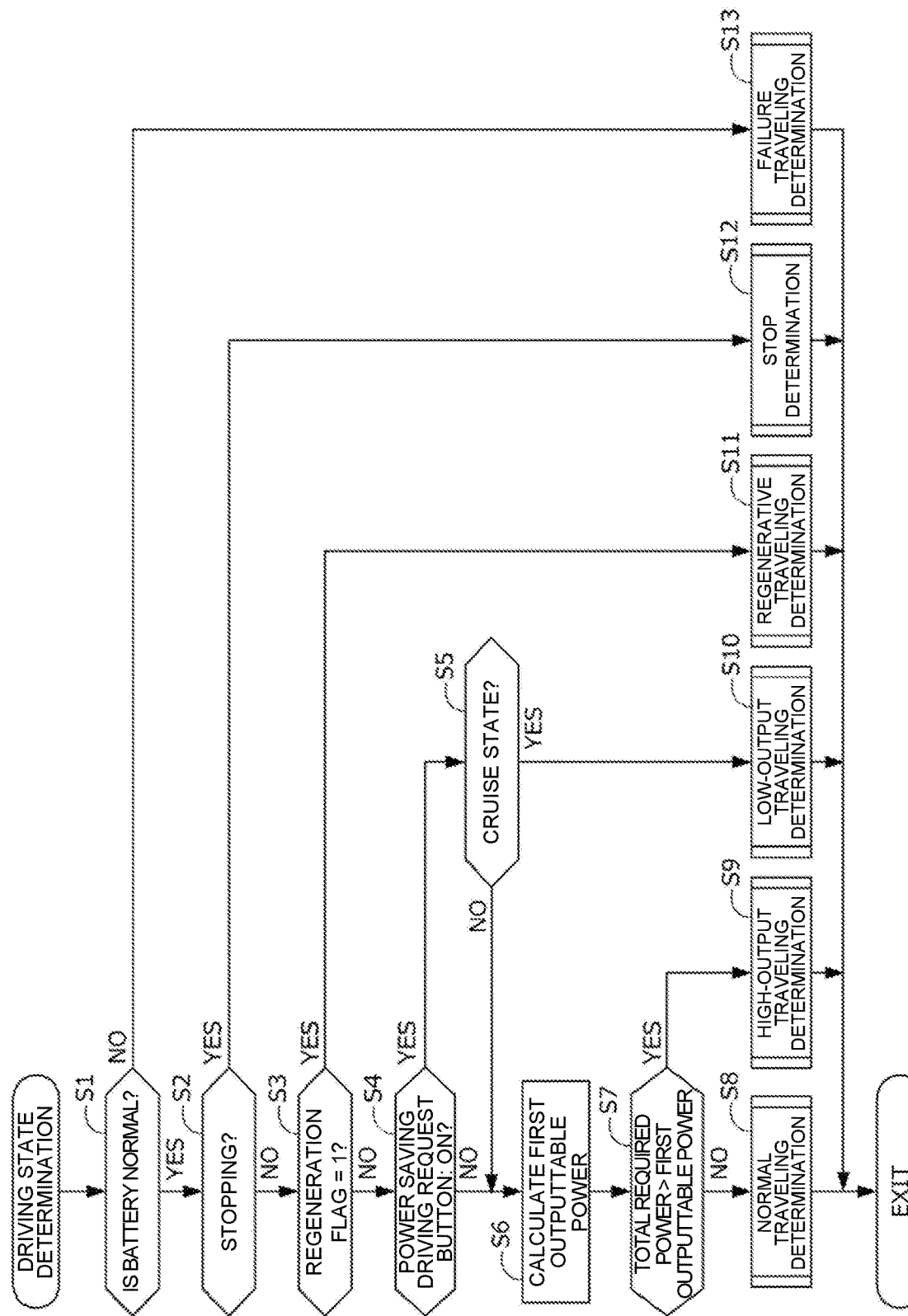
FIG. 10 is a main flow chart of a driving state determination process in a driving state determination unit.

FIG. 10 is a main flow chart of a driving state determination process in the driving state determination unit 71. The driving state determination process of FIG. 10 is repeatedly executed in a predetermined control period in the driving state determination unit 71 until a start button (not shown) for starting up the vehicle V is turned on by a driver and then this start button is turned off.

In S1, the driving state determination unit 71 determines whether the batteries B1 and B2 are normal on the basis of signals transmitted from the battery sensor units 81 and 82. The driving state determination unit 71 proceeds to S2 in a case where the determination result of S1 is YES, proceeds to S13 in a case of the determination result is NO, and executes a failure traveling determination process to be described later with reference to FIG. 21.

In S2, the driving state determination unit 71 determines whether the vehicle V is stopping on the basis of a signal transmitted from a vehicle speed sensor (not shown) that detects a vehicle speed that is a speed of the vehicle V. The driving state determination unit 71 proceeds to S3 in a case where the determination result of S2 is NO, proceeds to S12 in a case where the determination result is YES, and executes an idle determination process to be described later with reference to FIG. 19.

In S3, the driving state determination unit 71 determines whether the value of the regeneration flag is "1." The driving state determination unit 71 proceeds to S4 in a case where the determination result of S3 is NO, proceeds to S11 in a case where the determination result is YES, and executes a regenerative traveling determination process to be described later with reference to FIGS. 17A and 17B.

In S4, the driving state determination unit 71 determines whether the power saving driving request button BM1 is pressed. The driving state determination unit 71 proceeds to S5 in a case where the determination result of S4 is YES, and proceeds to S6 in a case where the determination result is NO. In S5, the driving state determination unit 71 determines whether the vehicle V is in a cruise state. More specifically, the driving state determination unit 71 determines whether the vehicle V is in a cruise state by determining whether the required driving force is equal to or less than a predetermined driving force using a signal transmitted from an accelerator pedal position sensor, a signal transmitted from a front-rear acceleration sensor (not shown) that detects front-rear acceleration of the vehicle V, required motor torques for the drive motors Mr and Mf, and the like. The driving state determination unit 71 proceeds to S6 in a case where the determination result of S5 is NO, proceeds to S10 in a case where the determination result is YES, and executes a low-output traveling determination process to be described later with reference to FIG. 15.

In S6, the driving state determination unit 71 calculates first outputable power which is an upper limit of power capable of being output from the first battery B1, and proceeds to S7. The driving state determination unit 71 calculates the first outputable power on the basis of, for example, a signal transmitted from the first battery sensor unit 81.

In S7, the driving state determination unit 71 determines whether the total required power is larger than the first outputable power, that is, all power required in the first power line 21 and the second power line 22 can be covered by the first battery B1. The driving state determination unit 71 proceeds to S8 in a case where the determination result of S7 is NO, and executes a normal traveling determination process to be described later with reference to FIG. 11.

In addition, the driving state determination unit 71 proceeds to S9 in a case where the determination result of S7 is YES, and executes a high-output traveling determination process to be described later with reference to FIG. 13.

Figure 11:
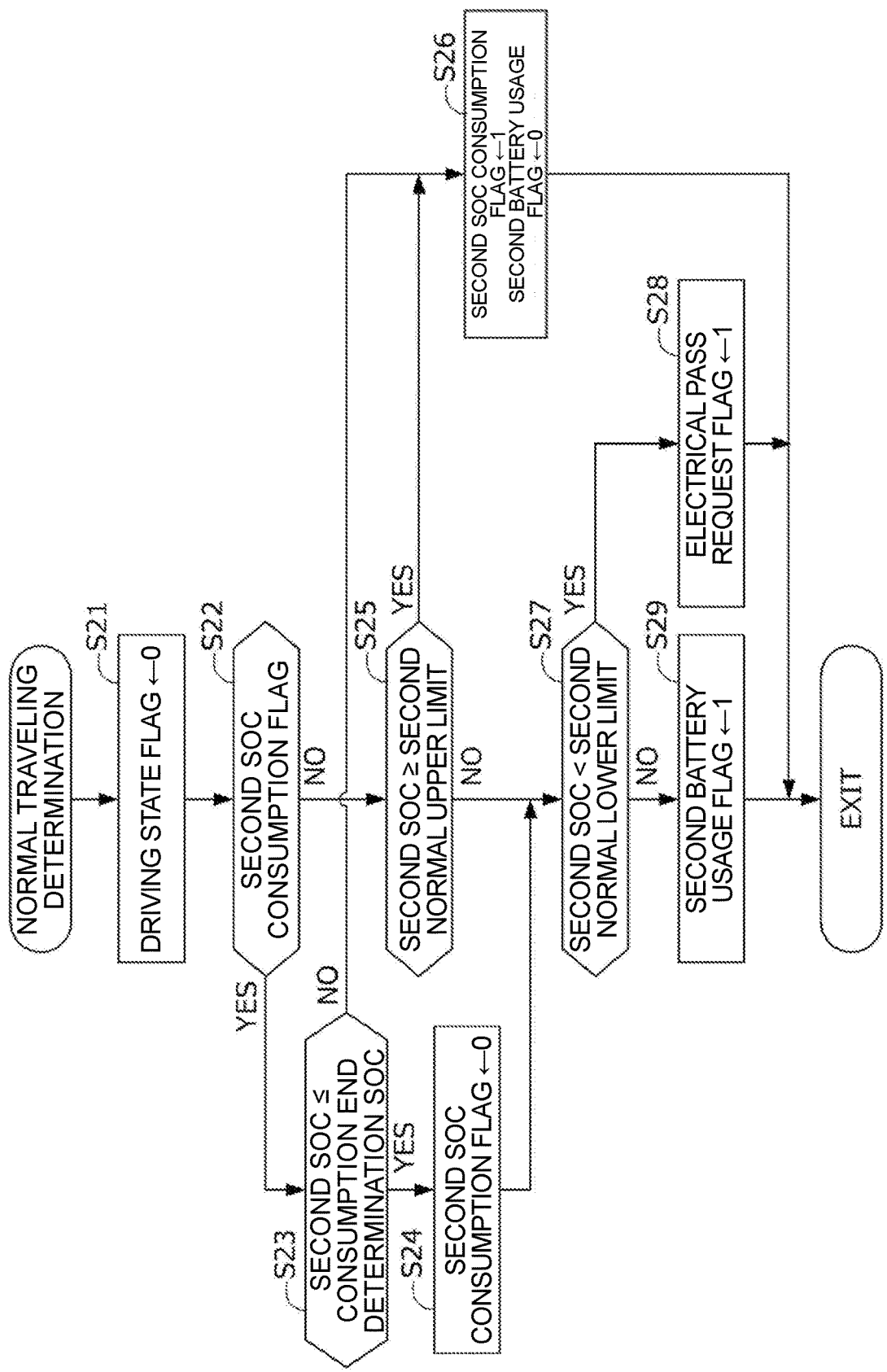
FIG. 11 is a flow chart illustrating a specific procedure of a normal traveling determination process.

FIG. 11 is a flow chart illustrating a specific procedure of a normal traveling determination process.

Figure 12:
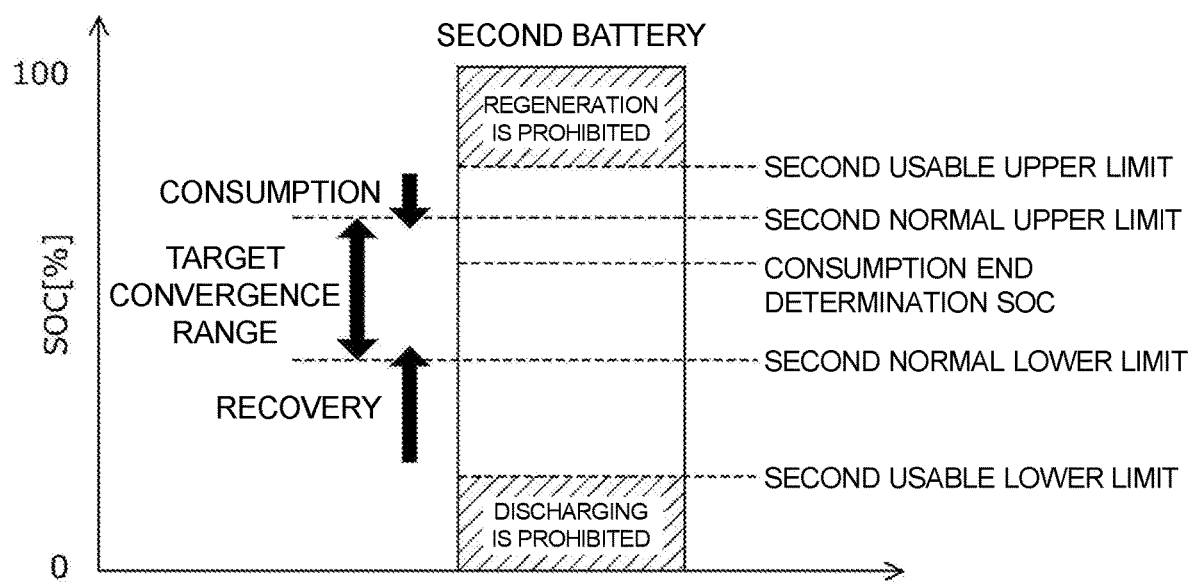
FIG. 12 is a diagram schematically illustrating a range of a second SOC of the second battery which is realized when the driving state is a normal traveling state.

FIG. 12 is a diagram schematically illustrating a range of the second SOC of the second battery B2 which is realized when the driving state is a normal traveling state.

First, in S21, the driving state determination unit 71 sets the value of the driving state flag to "0" so as to clarify that the current driving state of the vehicle V is a normal traveling state, and proceeds to S22.

In S22, the driving state determination unit 71 determines whether the value of the second SOC consumption flag is "1." The driving state determination unit 71 proceeds to S23 in a case where the determination result of S22 is YES, and proceeds to S25 in a case where the determination result is NO. This second SOC consumption flag is set to "1" in S26 to be described later, and then is reset to "0" in accordance with whether the process of S24 to be described later is executed or a change in the value of the driving state flag from "0" to another value.

In S25, the driving state determination unit 71 determines whether the current second SOC of the second battery B2 is equal to or greater than a second normal upper limit determined in advance. This second normal upper limit is a threshold for the second SOC, and is set to be slightly lower than the second usable upper limit at which the supply of regenerative electric power to the second battery B2 is entirely prohibited as shown in FIG. 12. The driving state determination unit 71 proceeds to S26 in a case where the determination result of S25 is YES, and proceeds to S27 in a case where the determination result is NO.

In S26, in accordance with the determination of the second SOC to be equal to or greater than the second normal upper limit, in other words, in accordance with the determination of the second SOC to increase to the vicinity of the second usable upper limit, the driving state determination unit 71 sets the value of the second SOC consumption flag to "1" and sets the value of the second battery usage flag to "0" so as to secure room for receiving regenerative electric power in the second battery B2, and terminates the normal traveling determination process of FIG. 11.

In S23, the driving state determination unit 71 determines whether the second SOC is equal to or less than a consumption end determination SOC determined in advance. This consumption end determination SOC is a threshold for the second SOC, and is set to be slightly lower than the second normal upper limit as shown in FIG. 12. In a case where the determination result of S23 is NO, the driving state determination unit 71 proceeds to S26 so as to continuously promote the consumption of the second SOC. In addition, in a case where the determination result of S23 is YES, the driving state determination unit 71 determines that room for the second battery B2 to receive regenerative electric power is secured, proceeds to S24, resets the value of the second SOC consumption flag to "0," and then proceeds to S27.

In S27, the driving state determination unit 71 determines whether the second SOC is lower than a second normal lower limit determined in advance. This second normal lower limit is a threshold for the second SOC, and is set between the consumption end determination SOC and the second usable lower limit as shown in FIG. 12. The driving state determination unit 71 proceeds to S28 in a case where the determination result of S27 is YES, and proceeds to S29 in a case where the determination result is NO.

In S28, in accordance with the determination of the second SOC to be lower than the second normal lower limit, in other words, in accordance with the determination of the second SOC to decrease to the vicinity of the second usable lower limit, the driving state determination unit 71 sets the value of the electrical pass request flag to "1" so as to promote the recovery of the second SOC of the second battery B2, and then terminates the normal traveling determination process of FIG. 11.

This electrical pass request flag is a flag that clarifies a state in which the execution of electrical pass control described above is required, and can take on a value of any of "0" and "1." A value of "0" for the electrical pass request flag indicates a state in which the execution of electrical pass control is not required, and a value of "1" for the electrical pass request flag indicates a state in which the execution of electrical pass control is required. Therefore, in accordance with the value of the electrical pass request flag being set to "1" in S28, as will be described later with reference to FIG. 22, an electrical pass determination process of determining whether or not to execute the electrical pass control is executed.

In addition, in S29, in accordance with the determination of the second SOC to be equal to or greater than the second normal lower limit, the driving state determination unit 71 sets the value of the second battery usage flag to "1" so as to prohibit the second battery B2 from being discharged, and then terminates the normal traveling determination process of FIG. 11.

A flow of power realized in the normal traveling determination process of FIG. 11 as described above will be described with reference to FIGS. 4A to 4C.

First, as described with reference to FIG. 10, in a case where the total required power is equal to or less than the first outputable power that is power capable of being output from the first battery B1 (see S7 of FIG. 10), that is, in a case where power that is required in the entirety of the combination of the first power line 21 and the second power line 22 can be covered by power that is discharged from the first battery B1 without using the second battery B2, the driving state becomes a normal traveling state.

In the normal traveling determination process of FIG. 11, in a case where the second SOC is equal to or greater than the second normal lower limit and is lower than the second normal upper limit, the value of the second battery usage flag is set to "1" (see S29). In accordance with the value of the second battery usage flag being set in this manner, the inverter control unit 72 and the voltage converter control unit 73 operate the inverters 3r and 3f and the voltage converter 4 so as to realize the flow of power as shown in FIG. 4A. That is, the inverter control unit 72 and the voltage converter control unit 73 prohibit discharging from the second battery B2 to the second power line 22, and cover all power required in the drive motors Mr and Mf and the vehicle accessory H by the first battery B1. In a case where the driving state is a normal traveling state as described above, the total required power is equal to or less than the first outputtable power of the first battery B1, and thus all required power can be covered by the first battery B1 as shown in FIG. 4A.

In addition, in the normal traveling determination process of FIG. 11, in a case where the second SOC is equal to or greater than the second normal upper limit, the value of the second battery usage flag is set to "0," and the value of the second SOC consumption flag is set to "1." In accordance with the values of various types of flags being set in this manner, the inverter control unit 72 and the voltage converter control unit 73 operate the inverters 3r and 3f and the voltage converter 4 so as to realize the flow of power as shown in FIG. 4C. That is, the inverter control unit 72 and the voltage converter control unit 73 discharge power from the second battery B2 to the second power line 22 so as to promote the consumption of the second SOC of the second battery B2. In this case, the inverter control unit 72 and the voltage converter control unit 73 operate the inverters 3r and 3f and the voltage converter 4 so as to calculate second required power that is power required in the second power line 22 by adding up power that is required in the second drive motor Mf and power that is required in the vehicle accessory H, and to discharge a shortage of power from the first battery B1 through the voltage converter 4 to the second power line 22, wherein the shortage of power is obtained by excluding power discharged by the second battery B2 from this second required power. Therefore, while the value of the second SOC consumption flag is set to "1," discharging of the second battery B2 is promoted even in a normal traveling state in which the second battery B2 is not necessarily required to be used as described above, and the second SOC is consumed.

In addition, in the normal traveling determination process of FIG. 11, the value of the second SOC consumption flag is reset to "0" in accordance with this value being set to be equal to or less than the consumption end determination SOC lower than the second normal upper limit. As will be described later with reference to FIGS. 17A to 18, in a case where the second SOC is equal to or greater than the second normal upper limit, charging of the second battery B2 using regenerative electric power is further limited than in a case where the second SOC is lower than the second normal upper limit. That is, the second normal upper limit is set as a threshold of charging of the second battery B2 using regenerative electric power. Consequently, in the normal traveling determination process of FIG. 11, the value of the second SOC consumption flag is continued to be set to "1" until the second SOC is set to be equal to or less than the consumption end determination SOC lower than the second normal upper limit, and the consumption of the second SOC is promoted. Thereby, in a case where the driving state transitions from the normal traveling state to the regenerative traveling state, regenerative electric power generated in the second drive motor Mf can be charged in the second battery B2 without being subject to the limitation of the second normal upper limit.

In addition, in the normal traveling determination process of FIG. 11, in a case where the second SOC is lower than the second normal lower limit, the value of the electrical pass request flag is set to "1." In a case where the value of the electrical pass request flag is set to "1," an electrical pass determination process (see FIG. 22 to be described later) is executed, and the value of the electrical pass execution flag is set to "1" in accordance with this determination result. In a case where the value of the electrical pass execution flag is set to "1" when the driving state is a normal traveling state, the inverter control unit 72 and the voltage converter control unit 73 operate the inverters 3r and 3f and the voltage converter 4 so as to realize the flow of power as shown in FIG. 4B. That is, the inverter control unit 72 and the voltage converter control unit 73 operate the inverters 3r and 3f and the voltage converter 4 so that all power required in the first drive motor Mr, the second drive motor Mf, the vehicle accessory H, and the second battery B2 is covered by power that is discharged from the first battery B1. Thereby, the second SOC of the second battery B2 is recovered.

From the above, in a case where the driving state is a normal driving state, the second SOC of the second battery B2 is generally maintained within a target convergence range in which the second normal upper limit is set as an upper limit and the second normal lower limit is set as a lower limit as shown in FIG. 12.

Figure 13:
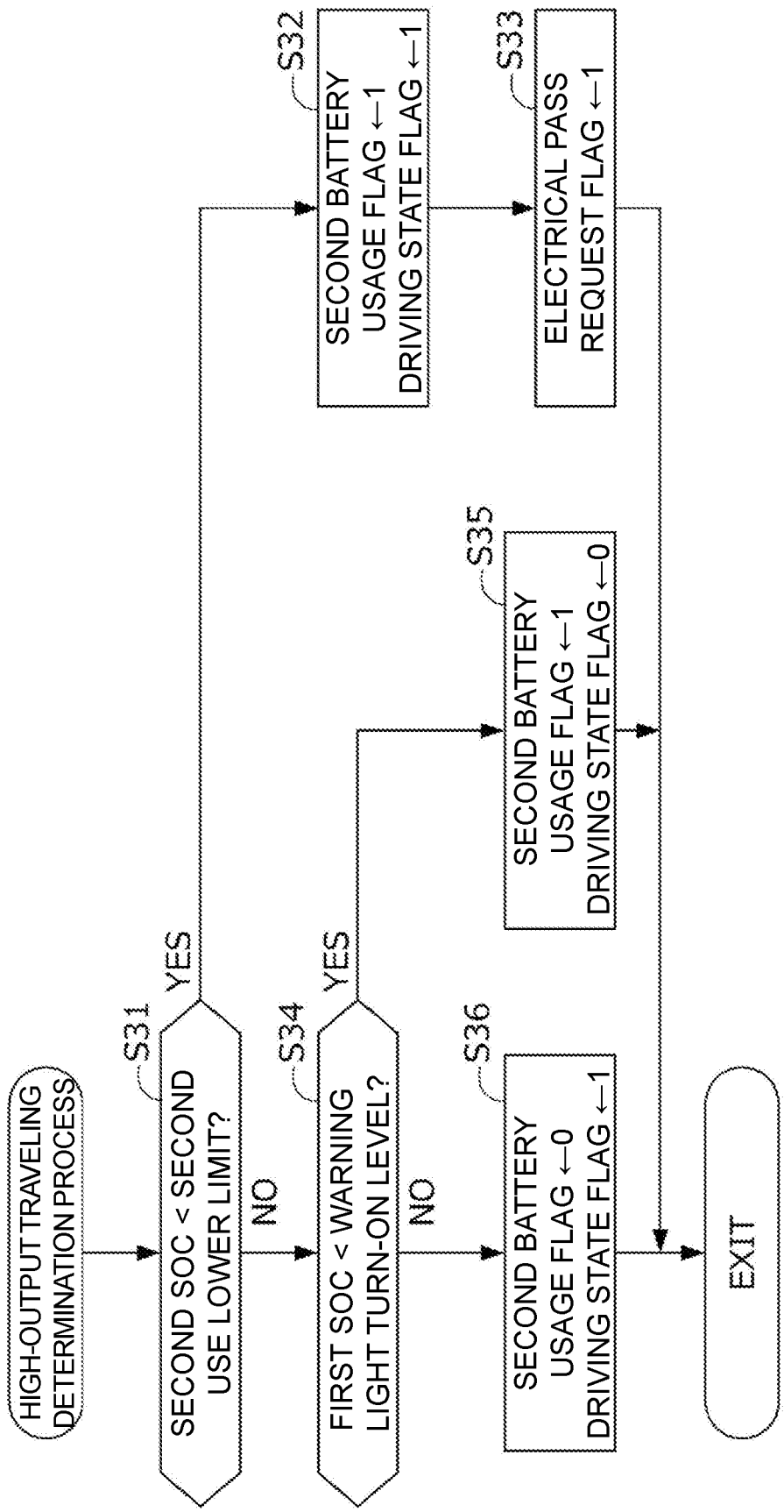
FIG. 13 is a flow chart illustrating a specific procedure of a high-output traveling determination process.

FIG. 13 is a flow chart illustrating a specific procedure of a high-output traveling determination process.

Figure 14:
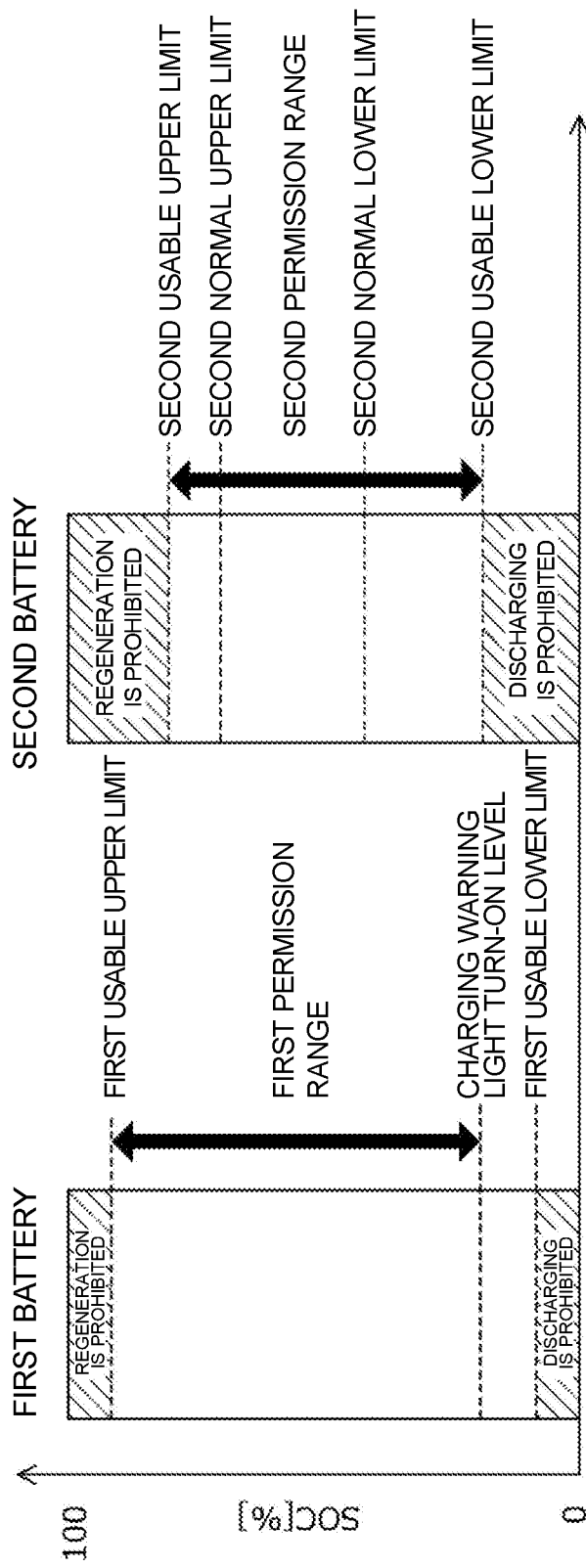
FIG. 14 is a diagram schematically illustrating ranges of a second SOC of the first battery and a second SOC of the second battery which are realized when the driving state is a high-output traveling state.

FIG. 14 is a diagram schematically illustrating ranges of the second SOC of the first battery B1 and the second SOC of the second battery B2 which are realized when the driving state is a high-output traveling state.

First, in S31, the driving state determination unit 71 determines whether the current second SOC of the second battery B2 is lower than the second usable lower limit. The driving state determination unit 71 proceeds to S32 in a case where the determination result of S31 is YES, and proceeds to S34 in a case where the determination result is NO.

In S32, the driving state determination unit 71 sets the value of the second battery usage flag to "1" so as to prohibit second battery B2 from being discharged in accordance with the determination of the second SOC to be lower than the second usable lower limit, further sets the value of the driving state flag to "0" so as to clarify that the current driving state of the vehicle V is a normal driving state, and proceeds to S33. The high-output traveling determination process of FIG. 13 is executed in a case where the total required power is larger than the first outputtable power of the first battery B1 as described with reference to FIG. 10. However, since power is not able to be discharged from the second battery B2 in a case where the second SOC is lower than the second usable lower limit, a shortage of power is not able to be compensated for by the second battery B2, wherein the shortage of power is obtained by excluding the first outputtable power from the total required power. In other words, the driving state is not able to transition to a high-output driving state. Therefore, in S32, the driving state determination unit 71 sets the value of the driving state flag to "0" so as to set the driving state to a normal traveling state.

In S33, in accordance with the determination of the second SOC to be lower than the second usable lower limit, the driving state determination unit 71 sets the value of the electrical pass request flag to "1" so as to promote the recovery of the second SOC of the second battery B2, and then terminates the high-output traveling determination process of FIG. 13. Thereby, an electrical pass determination process (see FIG. 22 to be described later) of determining whether or not to execute the electrical pass control is executed.

In S34, the driving state determination unit 71 determines whether the current first SOC of the first battery B1 is lower than a charging warning light turn-on level determined in advance. This charging warning light turn-on level is a threshold for the first SOC, and is set to be slightly higher than the first usable lower limit as shown in FIG. 14. Meanwhile, in a case where the first SOC becomes lower than this charging warning light turn-on level, a charging warning light provided at a position that can be visually recognized by a driver through a process (not shown) is configured to blink. Thereby, a driver can recognize that the first SOC of the first battery B1 is a small state, and that the power supply system 1 is in a state in which the first battery B1 and the second battery B2 are required to be charged. The driving state determination unit 71 proceeds to S35 in a case where the determination result of S34 is YES, and proceeds to S36 in a case where the determination result is NO.

In S35, the driving state determination unit 71 sets the value of the second battery usage flag to "1" so as to prohibit the second battery B2 from being discharge in order to make a cruising distance as long as possible. In addition, the driving state determination unit 71 sets the value of the driving state flag to "0" so as to set the driving state to a normal traveling state for the same reason as that in S32, and then terminates the high-output traveling determination process of FIG. 13.

In S36, the driving state determination unit 71 sets the value of the second battery usage flag to "0" and sets the value of the driving state flag to "1" so as to permit discharging of the second battery B2 in accordance with the determination of the second SOC to be equal to or greater than the second use lower limit and the determination of the first SOC to be equal to or greater than the charging warning light turn-on level, and terminates the high-output traveling determination process of FIG. 13.

A flow of power realized in the high-output traveling determination process of FIG. 13 as described above will be described with reference to FIG. 5.

First, the high-output traveling determination process of FIG. 13 is executed in a case where the total required power is larger than the first outputtable power that is power capable of being output from the first battery B1 (see S7 of FIG. 10), that is, in a case where the total required power is not able to be realized unless both the first battery B1 and the second battery B2 are used.

In the high-output traveling determination process of FIG. 13, in a case where the total required power is larger than the first outputtable power of the first battery B1 as described above (see S7 of FIG. 10), the second SOC is equal to or greater than the second usable lower limit (see S31 of FIG. 13), and the first SOC is equal to or greater than the charging warning light turn-on level (see S34 of FIG. 13), the value of the second battery usage flag is set to "0" and the value of the driving state flag is "1." In accordance with the values of the driving state flag and the second battery usage flag being set in this manner, the inverter control unit 72 and the voltage converter control unit 73 operate the inverters 3r and 3f and the voltage converter 4 so as to realize the flow of power as shown in FIG. 5. That is, in a case where the total required power is larger than the first outputtable power of the first battery B1, the inverter control unit 72 and the voltage converter control unit 73 operate the inverters 3r and 3f and the voltage converter 4 so that a shortage of power is discharged from the second battery B2 to the second power line 22, wherein the shortage of power is obtained by excluding an amount that is output by the first battery B1 from the total required power. More specifically, the inverter control unit 72 and the voltage converter control unit 73 drives the first drive motor Mr using power that is discharged from the first battery B1 to the first power line 21, and drives the second drive motor Mf and the vehicle accessory H so that power in this first power line 21 is supplied to the second power line 22 side through the voltage converter 4. In addition, in this case, the inverter control unit 72 and the voltage converter control unit 73 operate the inverters 3r and 3f and the voltage converter 4 so that a shortage is discharged from the second battery B2, wherein the shortage is obtained by excluding an amount supplied from the first power line 21 side through the voltage converter 4 from power required in the second power line 22 (that is, power required in the second drive motor Mf and the vehicle accessory H). In other words, in a case where the driving state is a high-output traveling state, all power that is required in the first power line 21 and a portion of power that is required in the second power line 22 are covered in the first battery B1, and the remaining of power that is required in the second power line 22 is covered in the second battery B2. Thereby, since power that passes through the voltage converter 4 can be reduced while required power is supplied from the first battery B1 and the second battery B2, it is possible to reduce a loss in this voltage converter 4.

In addition, in the high-output traveling determination process of FIG. 13, in a case where the first SOC is lower than the charging warning light turn-on level (see S34 of FIG. 13), the value of the second battery usage flag is set to "1" and the value of the driving state flag is set to "0." That is, the second battery B2 is prohibited from being discharged, and the driving state is set as a normal traveling state. In accordance with the values of the driving state flag and the second battery usage flag being set in this manner, the inverter control unit 72 and the voltage converter control unit 73 operate the inverters 3r and 3f and the voltage converter 4 so as to realize the flow of power as shown in FIG. 4A. That is, the inverter control unit 72 and the voltage converter control unit 73 sets the driving state to a normal traveling state and prohibits the second battery B2 from being discharged so that a cruising distance becomes as long as possible.

As described above, in the high-output traveling determination process of FIG. 13, as shown in FIG. 14, in a case where the total required power is larger than the first outputtable upper limit of the first battery B1, the first SOC of the first battery B1 is within a first permission range in which the charging warning light turn-on level is set as a lower limit and the first usable upper limit is set as an upper limit, and the second SOC of the second battery B2 is within a second permission range in which the second usable lower limit is set as a lower limit and the first usable upper limit is set as an upper limit, the driving state is set as a high-output traveling state.

Figure 15:
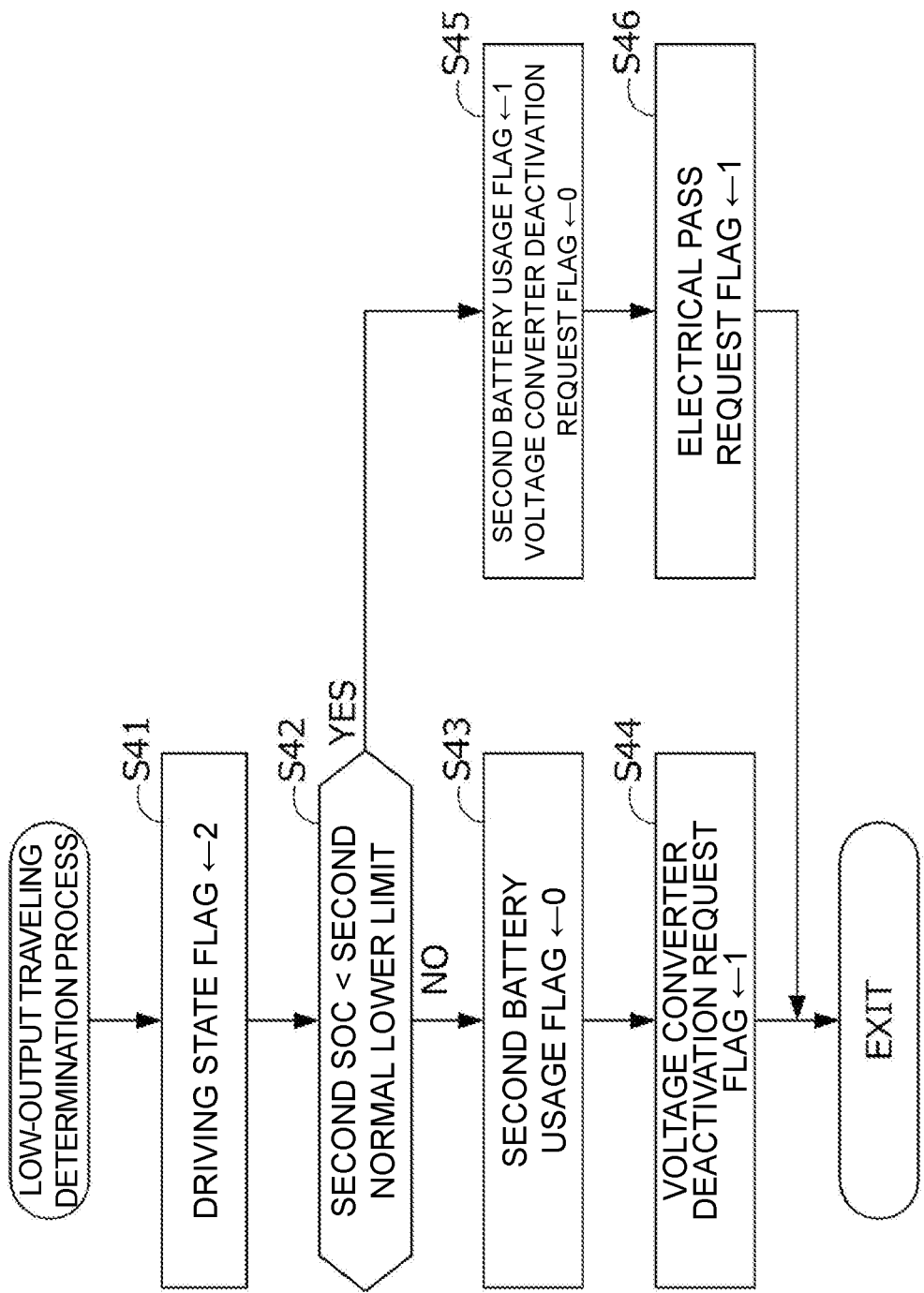
FIG. 15 is a flow chart illustrating a specific procedure of a low-output traveling determination process.

FIG. 15 is a flow chart illustrating a specific procedure of a low-output traveling determination process.

Figure 16:
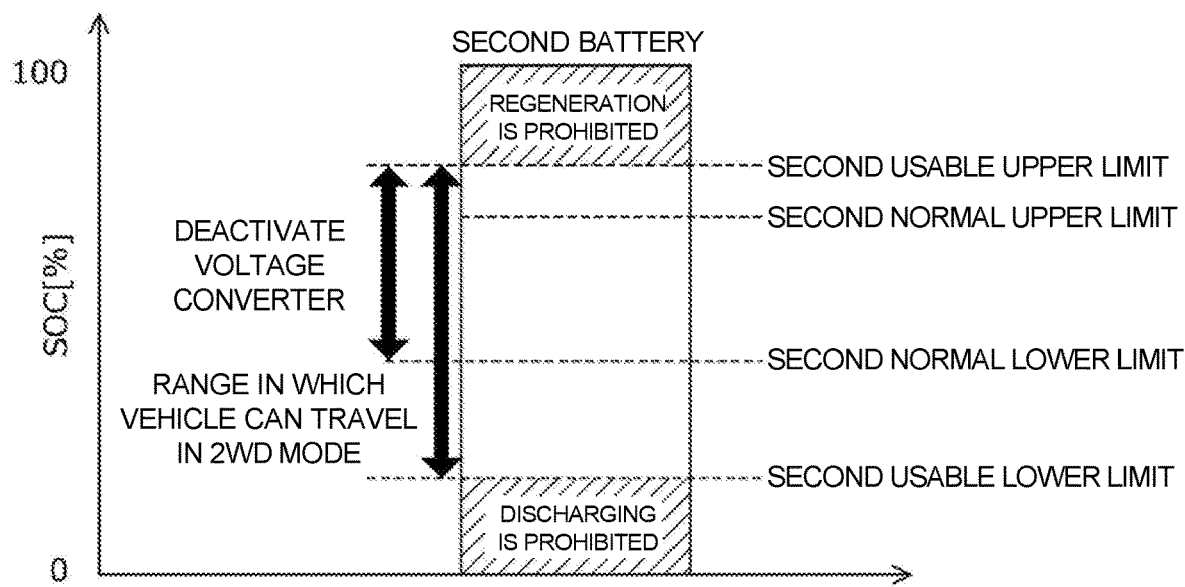
FIG. 16 is a diagram schematically illustrating a range of a second SOC of the second battery which is realized when the driving state is a low-output traveling state.

FIG. 16 is a diagram schematically illustrating a range of the second SOC of the second battery B2 which is realized when the driving state is a low-output traveling state.

First, in S41, the driving state determination unit 71 sets the value of the driving state flag to "2" so as to clarify that the current driving state of the vehicle V is a low-output traveling state, and proceeds to S42.

In S42, the driving state determination unit 71 determines whether the second SOC of the second battery B2 is lower than the second normal lower limit. The driving state determination unit 71 proceeds to S43 in a case where the determination result of S42 is NO, and proceeds to S45 in a case where the determination result is YES.

In S43, the driving state determination unit 71 sets the value of the second battery usage flag to "0" so as to permit discharging of the second battery B2, and proceeds to S44. In S44, the driving state determination unit 71 sets the value of the voltage converter deactivation request flag to "1" so as to reduce a loss in the voltage converter 4, and terminates the low-output traveling determination process of FIG. 15. Meanwhile, this value of the voltage converter deactivation request flag is reset from "1" to "0" in a case where a process of S45 to be described later is executed or the value of the driving state flag is changes from "2" to another value.

In S45, the driving state determination unit 71 sets the value of the second battery usage flag to "1" so as to prohibit the second battery B2 from being discharged in accordance with the determination of the second SOC to be lower than the second normal lower limit, further sets the value of the voltage converter deactivation request flag to "0," and proceeds to S46. In S46, the driving state determination unit 71 sets the value of the electrical pass request flag to "1" so as to promote the recovery of the second SOC, and then terminates the low-output traveling process of FIG. 15.

A flow of power realized in the low-output traveling determination process of FIG. 15 as described above will be described with reference to FIGS. 6A and 6B.

First, as described with reference to FIG. 10, in a case where the power saving driving request button BM1 is pressed and the vehicle is in a cruise state (see S4 and S5 of FIG. 10), the driving state is set as a low-output traveling state. In addition, as described with reference to FIGS. 6A and 6B, in a case where the driving state is a low-output traveling state, the drive mode of the vehicle V is set as a 2WD mode.

In the low-output traveling determination process of FIG. 15, in a case where the driving state is a low-output traveling state and the second SOC is equal to or greater than the second normal lower limit, the value of the second battery usage flag is set to "0" (see S43), and the value of the voltage converter deactivation request flag is set to "1" (see S44). In accordance with the values of the second battery usage flag and the voltage converter deactivation request flag being set in this manner, the inverter control unit 72 and the voltage converter control unit 73 operate the inverters 3r and 3f and the voltage converter 4 so as to realize the flow of power as shown in FIG. 6A. That is, the inverter control unit 72 and the voltage converter control unit 73 stops a flow of power between the first power line 21 and the second power line 22 by deactivating the voltage converter 4, and drives the first drive motor Mr using power that is discharged from the first battery B1 to the first power line 21. In addition, the inverter control unit 72 and the voltage converter control unit 73 drives the vehicle accessory H using power that is discharged from the second battery B2 to the second power line 22, and performs zero torque control for operating the second inverter 3f so that a drive torque imparted from the second drive motor Mf to the second wheel Wf is set to 0 by using power in this second power line 22. In this manner, in a case where the driving state is a low-output traveling state and the second SOC of the second battery B2 is equal to or greater than the second normal lower limit, a loss in the voltage converter 4 can be set to 0 by deactivating the voltage converter 4, driving the vehicle accessory H using power that is discharged from the second battery B2, and performing zero torque control on the second drive motor Mf.

In addition, in the low-output traveling determination process of FIG. 15, in a case where the driving state is a low-output traveling state and the second SOC is lower than the second normal lower limit, the value of the second battery usage flag is set to "1," the value of the voltage converter deactivation request flag is set to "0" (see S45), and the value of the electrical pass request flag is set to "1" (see S46). In accordance with the values of the second battery usage flag, the voltage converter deactivation request flag, and the electrical pass request flag being set in this manner, the inverter control unit 72 and the voltage converter control unit 73 operate the inverters 3r and 3f and the voltage converter 4 so as to realize the flow of power as shown in FIG. 6B. That is, the inverter control unit 72 and the voltage converter control unit 73 discharge power from the first battery B1 to the first power line 21, drive the first drive motor Mr using power in this first power line 21, and supply a portion of the power in this first power line 21 to the second power line 22 through the voltage converter 4. In addition, the inverter control unit 72 and the voltage converter control unit 73 drive the vehicle accessory H using power in this second power line 22, perform zero torque control on the second drive motor Mf, and further charge the second battery B2.

From the above, in a case where the driving state is a low-output traveling state, as shown in FIG. 16, it is possible to perform traveling in a 2WD drive mode having small power consumption in a case where the second SOC is within a range in which the second usable lower limit is set as a lower limit and the second usable upper limit is set as an upper limit. In addition, particularly in a case where the second SOC is within a range in which the second normal lower limit is set as a lower limit and the second usable upper limit is set as an upper limit, the voltage converter 4 is deactivated as described above, and thus traveling having particularly high power efficiency is possible.

Figure 17A:
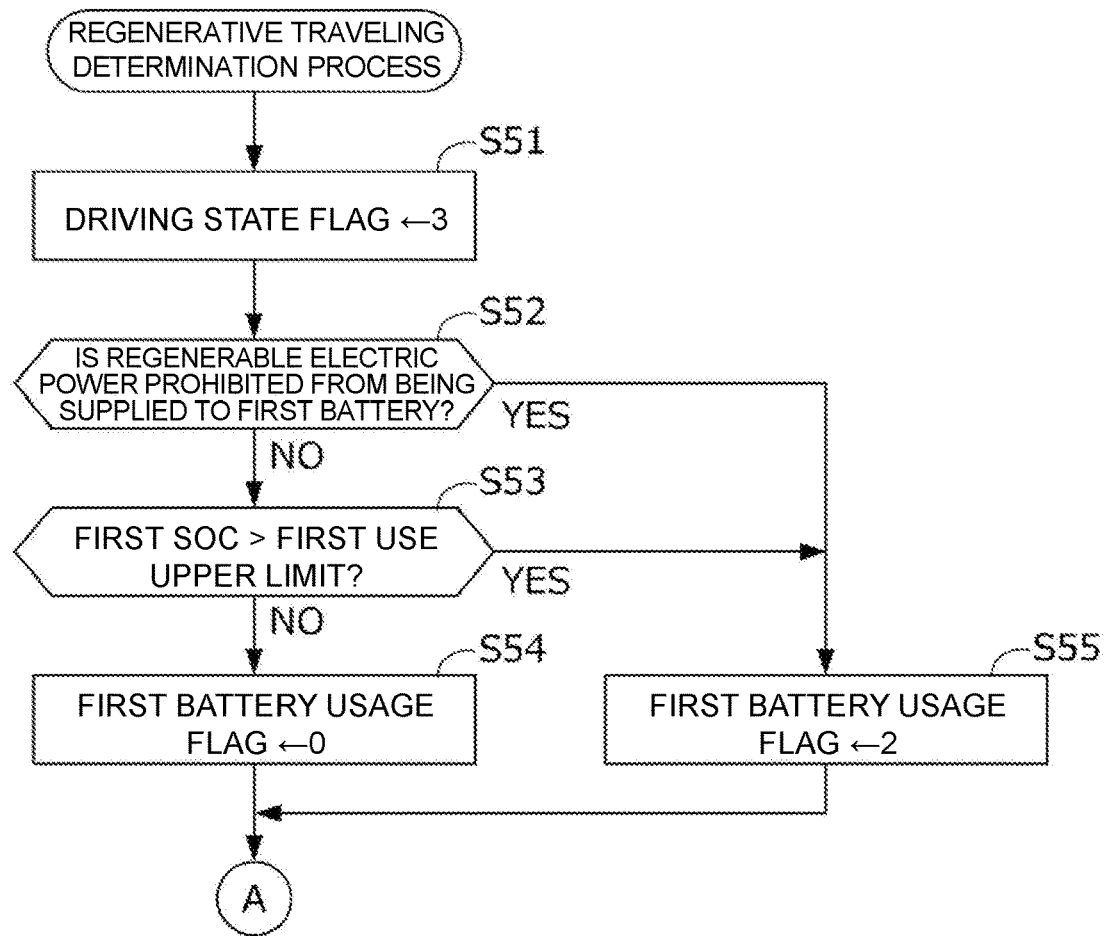
FIG. 17A is a flow chart illustrating of a specific procedure of a regenerative traveling determination process.
Figure 17B:
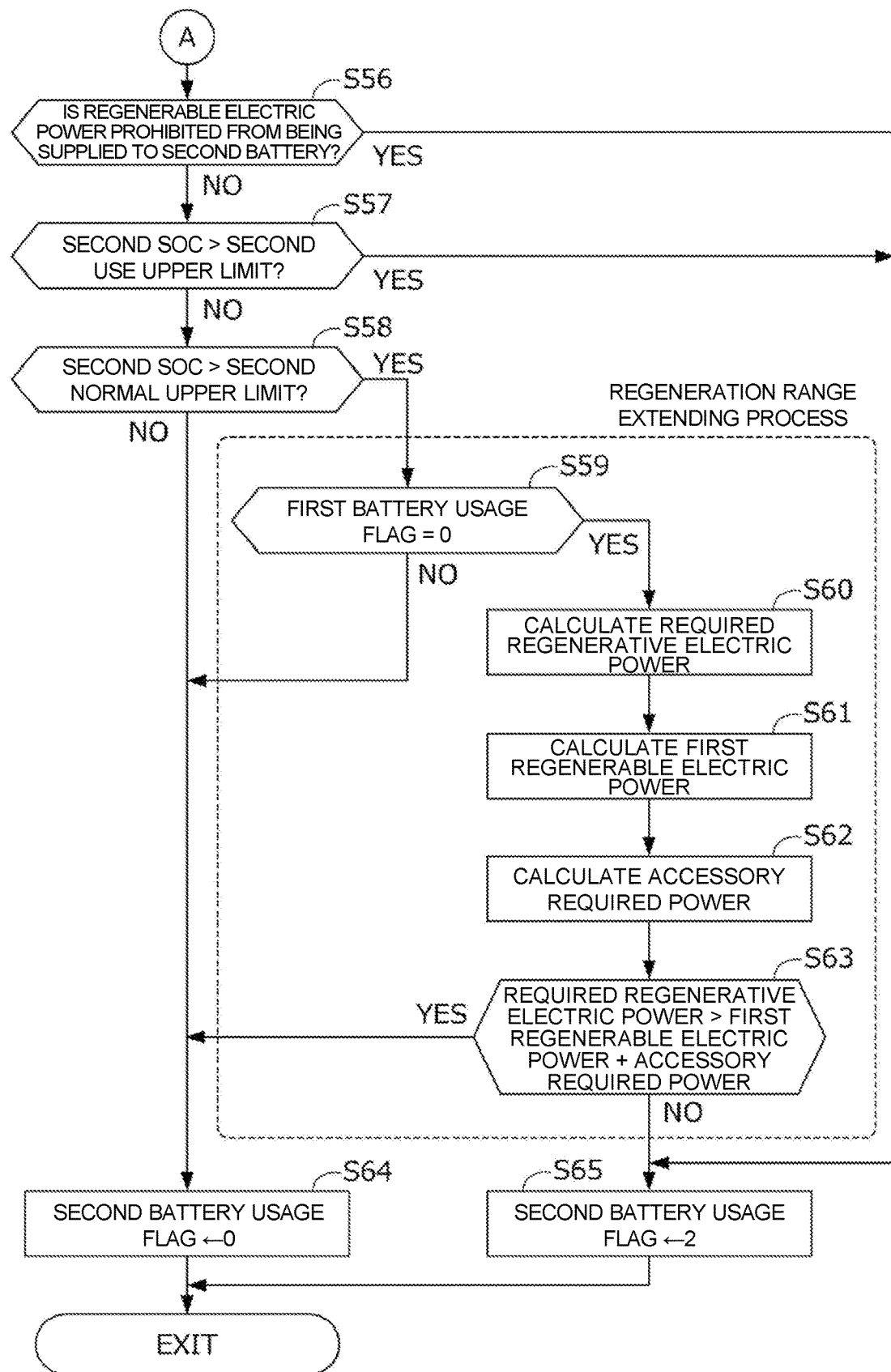
FIG. 17B is a flow chart illustrating of a specific procedure of the regenerative traveling determination process.

FIGS. 17A and 17B are flows chart illustrating a specific procedure of a regenerative traveling determination process.

Figure 18:
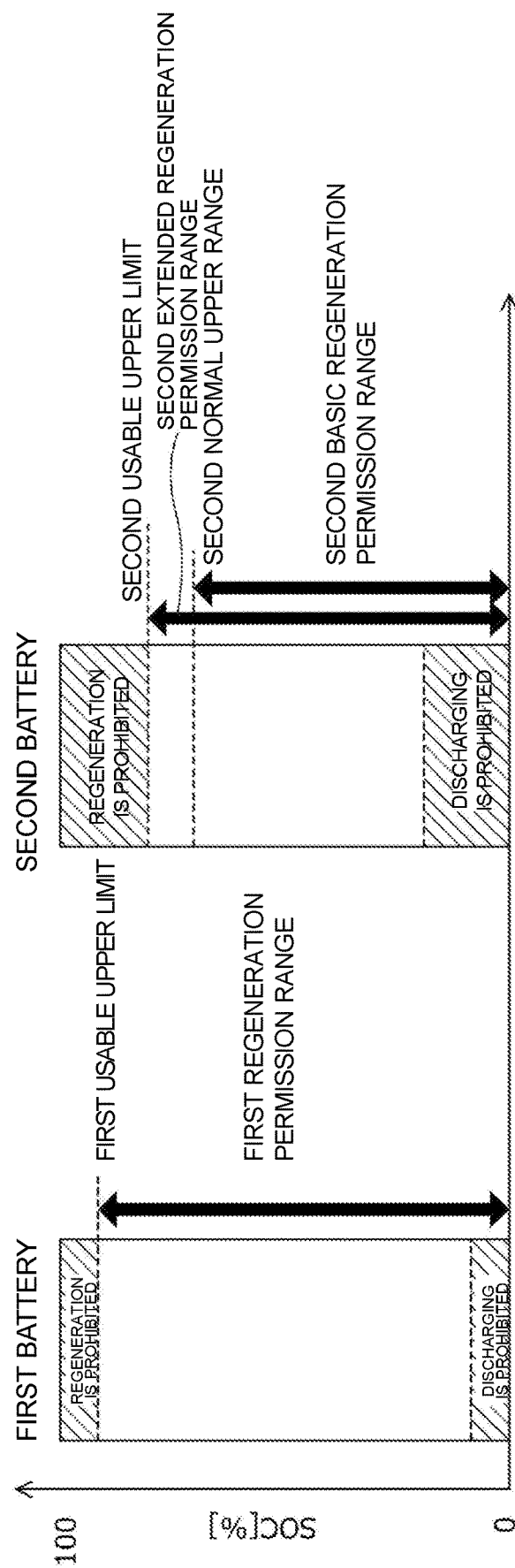
FIG. 18 is a diagram schematically illustrating a range of a second SOC of the second battery which is realized when the driving state is a regenerative traveling state.

FIG. 18 is a diagram schematically illustrating a range of the second SOC of the second battery B2 which is realized when the driving state is a regenerative traveling state.

First, in S51, the driving state determination unit 71 sets the value of the driving state flag to "3" so as to clarify that the current driving state of the vehicle V is a regenerative traveling state, and proceeds to S52.

In S52, the driving state determination unit 71 determines whether the supply of regenerative electric power to the first battery B1 is prohibited, that is, whether first regenerable electric power that is an upper limit of regenerative electric power capable of being supplied to the first battery B1 is 0. In a case where a regenerative operation is performed over a long period of time, for example, during traveling along a downhill road, there may be a concern of electrodeposition occurring in a battery. For this reason, as will be described later in detail with respect to the composition limit power calculation unit 731, as the execution time of a regenerative operation becomes longer, this first regenerable electric power is brought closer to 0 so as to limit the supply of regenerative electric power to the first battery B1. Consequently, the driving state determination unit 71 determines whether the supply of regenerative electric power to the first battery B1 is prohibited on the basis of a signal transmitted from the first battery sensor unit 81, the duration time of a regenerative operation, or the like. The driving state determination unit 71 proceeds to S53 in a case where the determination result of S52 is NO, and proceeds to S55 in a case where the determination result is YES.

In S53, the driving state determination unit 71 determines whether the first SOC of the first battery B1 is higher than the first usable upper limit. The driving state determination unit 71 proceeds to S54 in a case where the determination result of S53 is NO, and proceeds to S55 in a case where the determination result is YES.

In S54, the driving state determination unit 71 sets the value of the first battery usage flag to "0" so as to permit the supply of regenerative electric power to the first battery B1, and proceeds to S56. In addition, in S55, the driving state determination unit 71 sets the value of the first battery usage flag to "2" so as to prohibit the supply of regenerative electric power to the first battery B1, and proceeds to S56. As described above, according to the regenerative traveling determination process of FIGS. 17A and 17B, in a case where the first SOC of the first battery B1 is within a first regeneration permission range in which 0 is set as a lower limit and the first usable upper limit is set as an upper limit (see FIG. 18), the supply of regenerative electric power to the first battery B1 is permitted except when the determination result of S52 is YES. That is, in a case where the first SOC is out of the first regeneration permission range, the supply of regenerative electric power to the first battery B1 is prohibited.

In S56, the driving state determination unit 71 determines whether the supply of regenerative electric power to the second battery B2 is prohibited. The driving state determination unit 71 determines whether the second battery B2 is in a state in which regenerative electric power is prohibited from being supplied on the basis of, for example, a signal transmitted from the second battery sensor unit 82, the duration time of a regenerative operation, or the like in the same procedure as S52. The driving state determination unit 71 proceeds to S57 in a case where the determination result of S56 is NO, and proceeds to S65 in a case where the determination result is YES.

In S57, the driving state determination unit 71 determines whether the second SOC of the second battery B2 is higher than the second usable upper limit. The driving state determination unit 71 proceeds to S58 in a case where the determination result of S57 is NO, and proceeds to S65 in a case where the determination result is YES.

In S58, the driving state determination unit 71 determines whether the second SOC of the second battery B2 is higher than the second normal upper limit. The driving state determination unit 71 proceeds to S64 in a case where the determination result of S58 is NO.

In S64, the driving state determination unit 71 sets the value of the second battery usage flag to "0" so as to permit the supply of regenerative electric power to the second battery B2, and terminates the regenerative traveling determination process of FIGS. 17A and 17B. In S65, the driving state determination unit 71 sets the value of the second battery usage flag to "2" so as to prohibit the supply of regenerative electric power to the second battery B2, and terminates the regenerative traveling determination process of FIGS. 17A and 17B.

As described above, according to the regenerative traveling determination process of FIGS. 17A and 17B, in a case where the second SOC of the second battery B2 is within a second basic regeneration permission range in which 0 is set as a lower limit and the second normal upper limit is set as an upper limit (see FIG. 18), the supply of regenerative electric power to the second battery B2 is permitted except when the determination result of S56 is YES. In addition, in a case where the second SOC is higher than the second usable upper limit, the supply of regenerative electric power to the second battery B2 is prohibited.

The driving state determination unit 71 executes a regeneration range extending process constituted by processes of S59 to S63 in a case where the determination result of S58 is YES, that is, in a case where the second SOC is higher than the second normal upper limit and is equal to or less than the second usable upper limit. This regeneration range extending process is a process of changing the upper limit of a regeneration permission range in which the supply of regenerative electric power to the second battery B2 is permitted in accordance with the state of the first battery B1.

In S59, the driving state determination unit 71 determines whether the value of the first battery usage flag that is one of parameters for characterizing the state of the first battery B1 is "0." In a case where the determination result of S59 is NO, that is, in a case where the supply of regenerative electric power to the first battery B1 is prohibited, the driving state determination unit 71 proceeds to S64 so as to be capable of recovering as much regenerative electric power as possible, and sets the value of the second battery usage flag to "0." That is, in a case where the supply of regenerative electric power to the first battery B1 is prohibited, the driving state determination unit 71 permits the supply of regenerative electric power to the second battery B2 even in a case where the second SOC is higher than the second normal upper limit. That is, this is equivalent to the extension of the regeneration permission range, in which the supply of regenerative electric power to the second battery B2 is permitted, from the second basic regeneration permission range to a second extended regeneration permission range in which 0 is set as a lower limit and the second usable upper limit is set as an upper limit (see FIG. 18).

The driving state determination unit 71 proceeds to S60 in a case where the determination result of S59 is YES, that is, in a case where the supply of regenerative electric power to the first battery B1 is permitted. In S60, the driving state determination unit 71 calculates required regenerative electric power that is a sum of the upper limits of regenerative electric power capable of being generated in the first drive motor Mr and the second drive motor Mf, and proceeds to S61. In S61, the driving state determination unit 71 calculates the first regenerable electric power that is an upper limit of regenerative electric power supplied to the first battery B1, and proceeds to S62. This first regenerable electric power can be calculated by the driving state determination unit 71 using, for example, a signal transmitted from the first battery sensor unit 81. In S62, the driving state determination unit 71 calculates the accessory required power that is power required in the vehicle accessory H, and proceeds to S63. In S63, the driving state determination unit 71 determines whether the required regenerative electric power is larger than the sum of the first regenerable electric power and the accessory required power.

In a case where the determination result of S63 is YES, that is, in a case where all the required regenerative electric power is not able to be recovered by the first battery B1 and the vehicle accessory H alone, the driving state determination unit 71 proceeds to S64 so as to be capable of recovering as much regenerative electric power as possible, and sets the value of the second battery usage flag to "0." That is, in a case where all the required regenerative electric power is not able to be recovered by the first battery B1 alone, the driving state determination unit 71 permits the supply of regenerative electric power to the second battery B2 even in a case where the second SOC is higher than the second normal upper limit. That is, this is equivalent to the extension of the regeneration permission range of the second battery B2 from the second basic regeneration permission range to the second extended regeneration permission range (see FIG. 18).

In addition, in a case where the determination result of S63 is NO, that is, in a case where all the required regenerative electric power is able to be recovered by the first battery B1 and the vehicle accessory H alone, the driving state determination unit 71 determines that it is not necessary to extend the upper limit of a regenerable range of the second battery B2, proceeds to S65, and sets the value of the second battery usage flag to "2."

As described above, in the regeneration range extending process constituted by S59 to S63, the driving state determination unit 71 switches the upper limit of the regeneration permission range in which the supply of regenerative electric power to the second battery B2 is permitted between the second normal upper limit and the second usable upper limit.

A flow of power realized in the regenerative traveling determination process of FIGS. 17A and 17B as described above will be described with reference to FIGS. 7A to 7D.

First, as described with reference to FIG. 10, in a case where the value of the regeneration flag is "1," the driving state is set as a regenerative traveling state. In addition, as described with reference to FIGS. 7A to 7D, in a case where the driving state is a regenerative traveling state, the drive mode of the vehicle V is set as an AWD mode. Therefore, in the case of the regenerative traveling state, regenerative electric power can be generated in both the first drive motor Mr and the second drive motor Mf.

According to the regenerative traveling determination process of FIGS. 17A and 17B, four states may occur in accordance with a combination of the values of the first battery usage flag and the second battery usage flag. The inverter control unit 72 and the voltage converter control unit 73 realize the flow of power shown in FIG. 7A in a case where both the values of the first battery usage flag and the second battery usage flag are "0," realize the flow of power shown in FIG. 7B in a case where the value of the first battery usage flag is "0" and the value of the second battery usage flag is "2," realize the flow of power shown in FIG. 7C in a case where the value of the first battery usage flag is "2" and the value of the second battery usage flag is "0," and realize the flow of power shown in FIG. 7D in a case where both the values of the first battery usage flag and the second battery usage flag are "2."

First, a case where the first SOC is within the first regeneration permission range and the second SOC is within the second basic regeneration permission range will be described. In this case, according to the regenerative traveling determination process of FIGS. 17A and 17B, both the values of the first battery usage flag and the second battery usage flag can be set to "0." In accordance with the values of the first battery usage flag and the second battery usage flag being set in this manner, the inverter control unit 72 and the voltage converter control unit 73 operate the inverters 3r and 3f and the voltage converter 4 so as to realize the flow of power as shown in FIG. 7A. That is, the inverter control unit 72 and the voltage converter control unit 73 operate the inverters 3r and 3f and the voltage converter 4 so that regenerative electric power supplied from the first inverter 3r and the second inverter 3f to the first power line 21 and the second power line 22 is supplied to the first battery B1, the second battery B2, and the vehicle accessory H. Here, the inverter control unit 72 and the voltage converter control unit 73 preferentially charge the second battery B2 rather than the first battery B1 in a case where the second SOC is lower than the second normal lower limit, that is, in a case where there is room for the remaining amount of the second battery B2. More specifically, the inverter control unit 72 and the voltage converter control unit 73 charge second battery B2 and drive the vehicle accessory H using second regenerative electric power that is supplied from the second inverter 3f to the second power line 22. In addition, in a case where the second regenerative electric power is larger than the sum of second regenerable electric power that is an upper limit of regenerative electric power supplied to the second battery B2 and required power in the vehicle accessory H, the inverter control unit 72 and the voltage converter control unit 73 supply second surplus regenerative electric power to the first power line 21 through the voltage converter 4, wherein the second surplus regenerative electric power is obtained by excluding this sum from the second regenerative electric power. In addition, the inverter control unit 72 and the voltage converter control unit 73 supply power, in which regenerative electric power supplied from the first inverter 3r to the first power line 21 and power supplied to the first power line 21 through the voltage converter 4 are combined with each other, to the first battery B1, and charge the first battery B1. Thereby, since the second battery B2 is charged with upper-limit power, the second SOC of the second battery B2 can be quickly recovered up to the second normal upper limit. In addition, since power that passes through the voltage converter 4 can be reduced by preferentially charging the second battery B2 in this manner, it is possible to reduce a loss in the voltage converter 4.

Next, a case where the first SOC is within the first regeneration permission range and the second SOC is between the second normal upper limit and the second usable upper limit will be described. In this case, since the second SOC is close to the second usable upper limit, it can be said that regenerative electric power is not required to be positively supplied to the second battery B2. However, according to the regeneration range extending process (S59 to S63) of the regenerative traveling determination process of FIGS. 17A and 17B, in a case where the required regenerative electric power is not able to be recovered by the first battery B1 alone, the regeneration permission range of the second battery B2 is extended to the second extended regeneration permission range in order to reduce losses in the mechanical braking devices Br and Bf, and both the values of the first battery usage flag and the second battery usage flag can be set to "0." In accordance with the values of the first battery usage flag and the second battery usage flag being set in this manner, the inverter control unit 72 and the voltage converter control unit 73 operate the inverters 3r and 3f and the voltage converter 4 so as to realize the flow of power as shown in FIG. 7A similarly to the above example. However, in this case, since the second SOC is close to the second usable upper limit, the first battery B1 is preferentially charged rather than the second battery B2. More specifically, the inverter control unit 72 and the voltage converter control unit 73 supply a portion of the second regenerative electric power, supplied from the second inverter 3f to the second power line 22, to the first power line 21 through the voltage converter 4, supply power, in which power supplied from the voltage converter 4 to the first power line 21 and power supplied from the first inverter 3r to the first power line 21 are combined with each other, to the first battery B1, and charge the first battery B1. In this time, the inverter control unit 72 and the voltage converter control unit 73 adjust passage power of the voltage converter 4 so that the first battery B1 is charged with its upper-limit power (that is, the first regenerable electric power). In addition, the inverter control unit 72 and the voltage converter control unit 73 charge the second battery B2 with the second surplus regenerative electric power, and drive the vehicle accessory H, wherein the second surplus regenerative electric power is obtained by excluding power supplied to the first power line 21 through the voltage converter 4 from the second regenerative electric power supplied from the second inverter 3f to the second power line 22. Thereby, it is possible to recover as much regenerative electric power as possible in the batteries B1 and B2 while the second battery B2 is prevented from being overcharged, and to reduce losses in the mechanical braking devices Br and Bf.

Next, a case where the first SOC is within the first regeneration permission range and the second SOC is higher than the second usable upper limit will be described. In this case, according to the regenerative traveling determination process of FIGS. 17A and 17B, the value of the first battery usage flag can be set to "0," and the value of the second battery usage flag can be set to "2." In accordance with the values of the first battery usage flag and the second battery usage flag being set in this manner, the inverter control unit 72 and the voltage converter control unit 73 operate the inverters 3r and 3f and the voltage converter 4 so as to realize the flow of power as shown in FIG. 7B. That is, the inverter control unit 72 and the voltage converter control unit 73 prohibit the second battery B2 from being charged, and supply the second surplus regenerative electric power to the first power line 21 through the voltage converter 4, wherein the second surplus regenerative electric power is obtained by excluding an amount that is consumed in the vehicle accessory H from the second regenerative electric power supplied from the second inverter 3f to the second power line 22. Thereby, the first battery B1 is supplied with power in which the first regenerative electric power supplied from the first inverter 3r to the first power line 21 and the second surplus regenerative electric power supplied from the voltage converter 4 to the first power line 21 is combined with each other, and the first battery B1 is charged. Thereby, it is possible to prevent the second battery B2 from being overcharged.

Meanwhile, according to the regenerative traveling determination process of FIGS. 17A and 17B, the flow of power as shown in FIG. 7B can be realized even in a case where the first SOC is within the first regeneration permission range and the second SOC is between the second usable upper limit and the second normal upper limit. That is, in the regeneration range extending process (S59 to S63), in a case where it is determined that the required regenerative electric power can be recovered by the first battery B1 alone, in other words, even in a case where it is determined that the regeneration permission range of the second battery B2 is not required to be extended to the second extended regeneration permission range in the regeneration range extending process, the value of the first battery usage flag is set to "0," the value of the second battery usage flag is set to "2," and the supply of regenerative electric power to the second battery B2 is prohibited. Thereby, it is possible to prevent the second battery B2 from being overcharged.

Next, a case where the first SOC is out of the first regeneration permission range and the second SOC is lower than the second normal upper limit will be described. In this case, according to the regenerative traveling determination process of FIGS. 17A and 17B, the value of the first battery usage flag can be set to "2," and the value of the second battery usage flag can be set to "0." In accordance with the values of the first battery usage flag and the second battery usage flag being set in this manner, the inverter control unit 72 and the voltage converter control unit 73 operate the inverters 3r and 3f and the voltage converter 4 so as to realize the flow of power as shown in FIG. 7C. That is, the inverter control unit 72 and the voltage converter control unit 73 prohibit the supply of regenerative electric power to the first battery B1, and supply all the first regenerative electric power, supplied from the first inverter 3r to the first power line 21, to the second power line 22 through the voltage converter 4. Thereby, the second battery B2 and the vehicle accessory H are supplied with power in which the second regenerative electric power supplied from the second inverter 3f to the second power line 22 and power supplied from the voltage converter 4 to the second power line 22 are combined with each other, whereby the second battery B2 is charged and the vehicle accessory H is driven. Thereby, since as much regenerative electric power as possible can be recovered in the second battery B2 and the vehicle accessory H while the first battery B1 is prevented from being overcharged, it is possible to reduce losses in the mechanical braking devices Br and Bf to that extent.

Meanwhile, according to the regenerative traveling determination process of FIGS. 17A and 17B, the flow of power as shown in FIG. 7C can be realized even in a case where the first SOC is out of the first regeneration permission range and the second SOC is between the second usable upper limit and the second normal upper limit. In this case, it can be said that the second SOC is close to the second usable upper limit, and that regenerative electric power is not required to be positively supplied to the second battery B2. However, according to the regeneration range extending process (S59 to S63), since the regeneration permission range of the second battery B2 is extended to the second extended regeneration permission range in a case where the first battery B1 is prohibited from being regenerated, the value of the first battery usage flag is set to "2," the value of the second battery usage flag is set to "0," and thus the flow of power as shown in FIG. 7C can be realized. Thereby, it is possible to recover as much regenerative electric power as possible in the second battery B2 and the vehicle accessory H while the first battery B1 and the second battery B2 are prevented from being overcharged, and to reduce losses in the mechanical braking devices Br and Bf.

Next, a case where the first SOC is out of the first regeneration permission range and the second SOC is also out of the second extended regeneration permission range will be described. In this case, according to the regenerative traveling determination process of FIGS. 17A and 17B, both the values of the first battery usage flag and the second battery usage flag are set to "2." In accordance with the values of the first battery usage flag and the second battery usage flag being set in this manner, the inverter control unit 72 and the voltage converter control unit 73 operate the inverters 3r and 3f and the voltage converter 4 so as to realize the flow of power as shown in FIG. 7D. That is, the inverter control unit 72 and the voltage converter control unit 73 operate the inverters 3r and 3f so that both the first regenerative electric power supplied from the first inverter 3r to the first power line 21 and the second regenerative electric power supplied from the second inverter 3f to the second power line 22 are set to 0. Thereby, although losses in the mechanical braking devices Br and Bf increase, regenerative electric power is not supplied to the first battery B1 and the second battery B2, and thus these batteries are reliably prevented from being overcharged.

Figure 19:
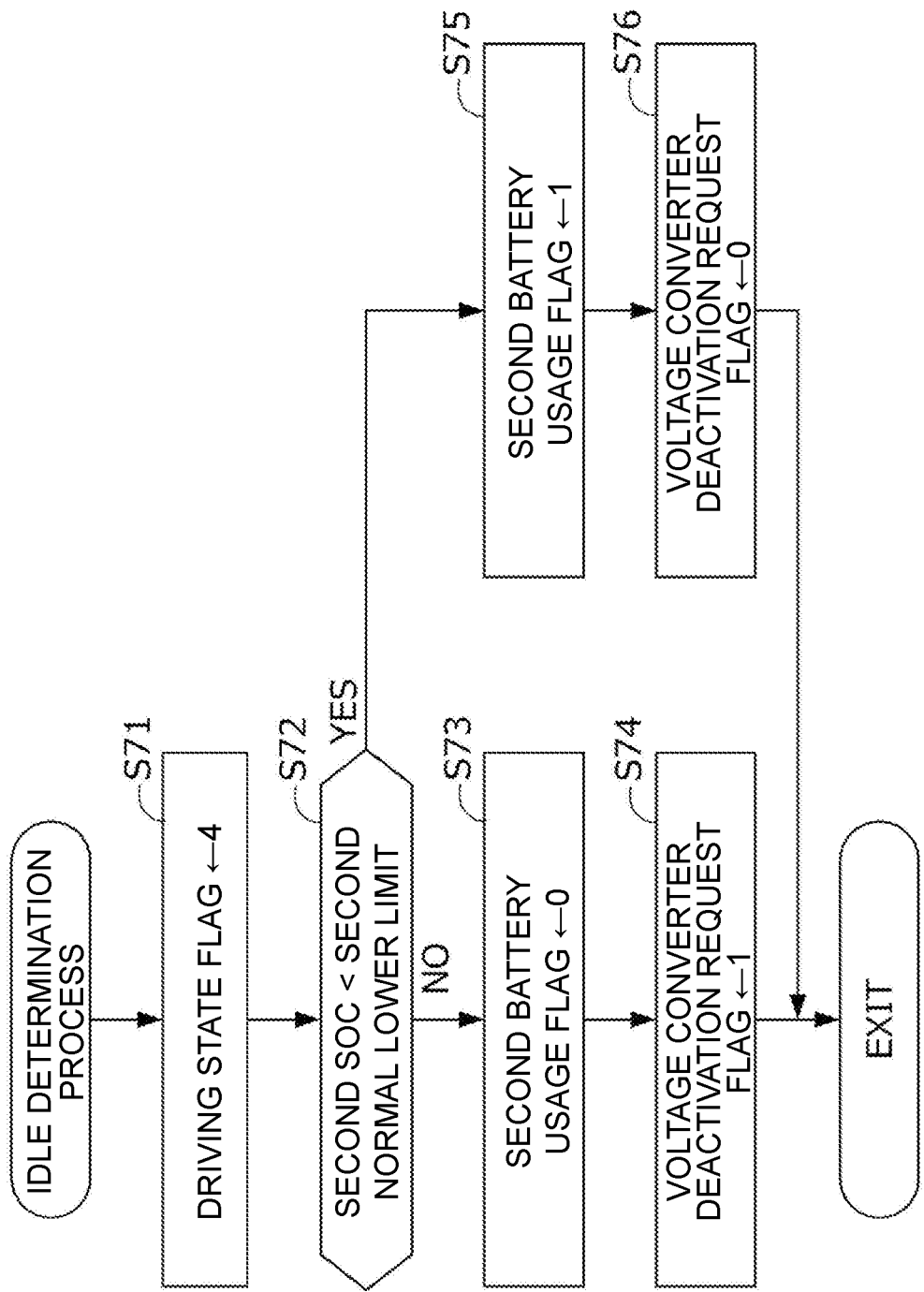
FIG. 19 is a flow chart illustrating a specific procedure of an idle determination process.

FIG. 19 is a flow chart illustrating a specific procedure of an idle determination process.

Figure 20:
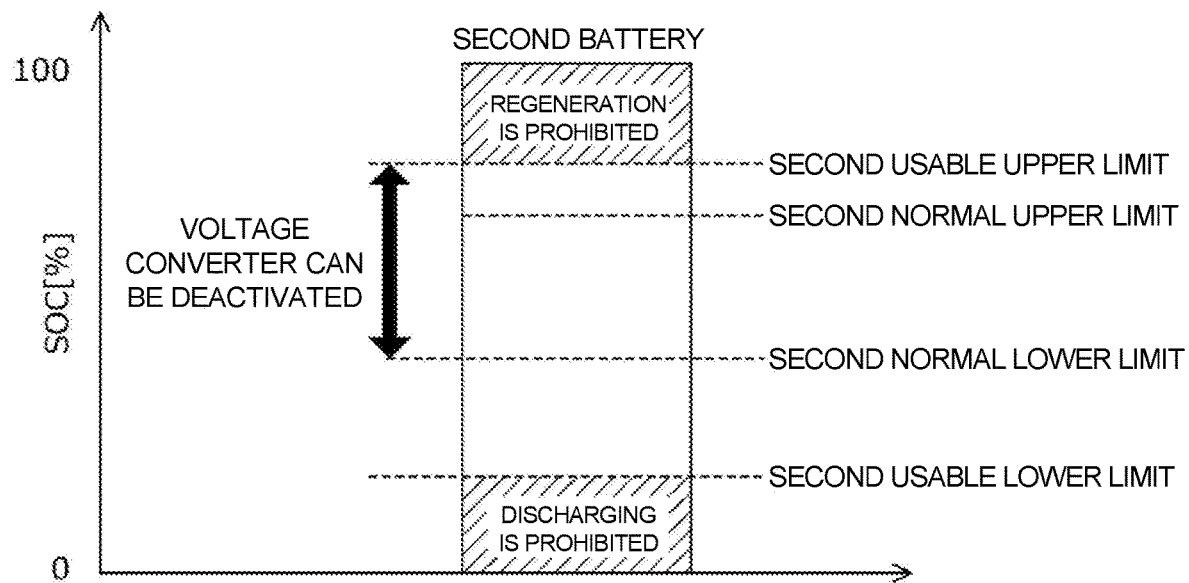
FIG. 20 is a diagram schematically illustrating a range of a second SOC of the second battery which is realized when the driving state is an idle state.

FIG. 20 is a diagram schematically illustrating a range of the second SOC of the second battery B2 which is realized when the driving state is an idle state.

First, in S71, the driving state determination unit 71 sets the value of the driving state flag to "4" so as to clarify that the current driving state of the vehicle V is an idle state, and proceeds to S72.

In S72, the driving state determination unit 71 determines whether the second SOC of the second battery B2 is lower than the second normal lower limit. The driving state determination unit 71 proceeds to S73 in a case where the determination result of S72 is NO, and proceeds to S75 in a case where the determination result is YES.

In S73, the driving state determination unit 71 sets the value of the second battery usage flag to "0" so as to permit discharging of the second battery B2, and proceeds to S74. In S74, the driving state determination unit 71 sets the value of the voltage converter deactivation request flag to "1" so as to reduce a loss in the voltage converter 4, and terminates the idle determination process of FIG. 19. Meanwhile, this value of the voltage converter deactivation request flag is reset from "1" to "0" in a case where a process of S76 to be described later is executed or the value of the driving state flag is changed from "4" to another value.

In S75, the driving state determination unit 71 sets the value of the second battery usage flag to "1" so as to prohibit the second battery B2 from being discharged, and proceeds to S76. In S76, the driving state determination unit 71 sets the value of the voltage converter deactivation request flag to "0" so as to drive the vehicle accessory H with power that is supplied from the first battery B1, and terminates the idle determination process of FIG. 19.

A flow of power realized in the idle determination process of FIG. 19 as described above will be described with reference to FIGS. 8A and 8B.

According to the idle determination process of FIG. 19, in a case where the second SOC of the second battery B2 is equal to or greater than the second normal lower limit, the value of the driving state flag is set to "4," and the value of the second battery usage flag is set to "0." In accordance with the values of these flags being set as described above, the inverter control unit 72 and the voltage converter control unit 73 operate the voltage converter 4 so as to realize the flow of power as shown in FIG. 8A. That is, the voltage converter 4 is deactivated, a flow of power between the first power line 21 and the second power line 22 is interrupted, and the vehicle accessory H is driven with power that is discharged from the second battery B2. Thereby, it is possible to drive the vehicle accessory H while a loss in the voltage converter 4 is set to 0.

In addition, according to the idle determination process of FIG. 19, in a case where the second SOC of the second battery B2 is lower than the second normal lower limit, the value of the driving state flag is set to "4," and the value of the second battery usage flag is set to "1." In accordance with the values of these flags being set as described above, the inverter control unit 72 and the voltage converter control unit 73 operate the voltage converter 4 so as to realize the flow of power as shown in FIG. 8B. That is, the second battery B2 is prohibited from being discharged, power that is supplied from the first battery B1 to the first power line 21 is supplied to the second power line 22 through the voltage converter 4, and the vehicle accessory H is driven with power in this second power line 22. Thereby, it is possible to drive the vehicle accessory H even in a case where the second SOC of the second battery B2 is in a low state.

From the above, in a case where the driving state is an idle state and the second SOC is within a range in which the second normal lower limit is set as a lower limit and the second usable upper limit is set to an upper limit, it is possible to drive the vehicle accessory H while the voltage converter 4 is deactivated.

Figure 21:
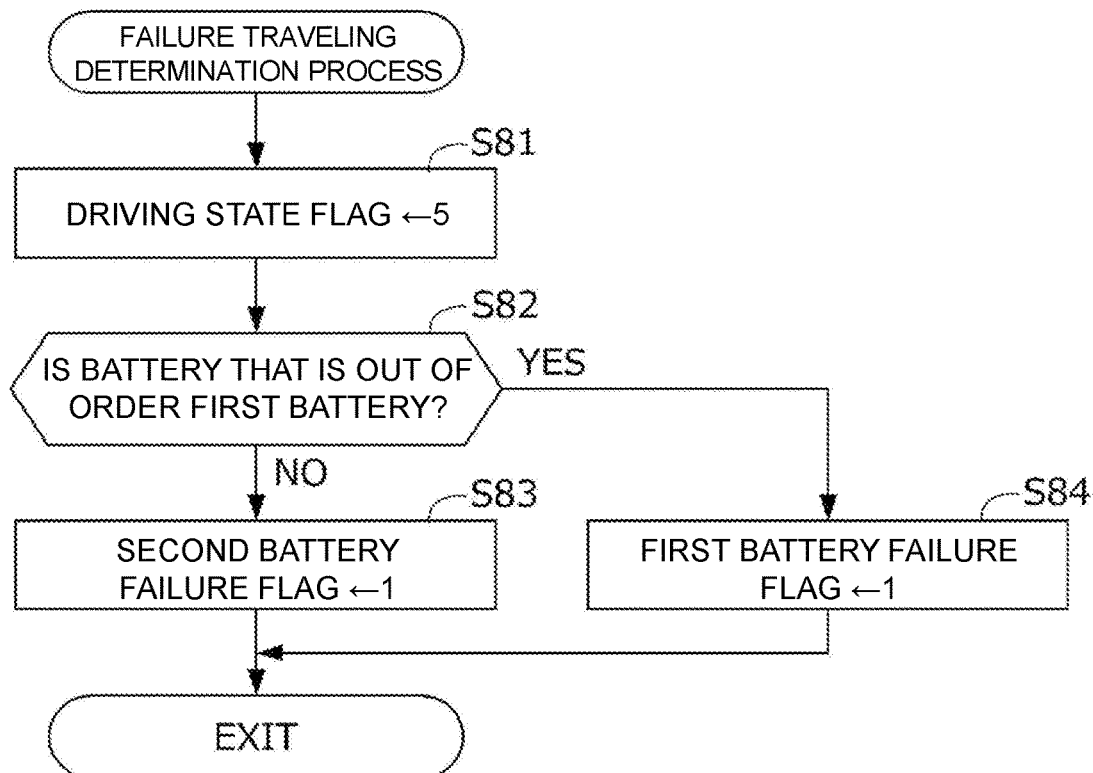
FIG. 21 is a flow chart illustrating a specific procedure of a failure traveling determination process.

FIG. 21 is a flow chart illustrating a specific procedure of a failure traveling determination process.

First, in S81, the driving state determination unit 71 sets the value of the driving state flag to "5" so as to clarify that the current driving state of the vehicle V is a failure traveling state, and proceeds to S82.

In S82, the driving state determination unit 71 determines whether a battery that is out of order is the first battery B1. In a case where the determination result of S82 is NO, that is, in a case where the second battery B2 is out of order, the driving state determination unit 71 proceeds to S83, sets the value of the second battery failure flag to "1," and terminates the failure traveling determination process of FIG. 21.

In addition, in a case where the determination result of S82 is YES, that is, in a case where the first battery B1 is out of order, the driving state determination unit 71 proceeds to S84, sets the value of the first battery failure flag to "1," and terminates the failure traveling determination process of FIG. 21.

A flow of power realized in the failure traveling determination process of FIG. 21 as described above will be described with reference to FIGS. 9A and 9B.

According to the failure traveling determination process of FIG. 21, in a case where the second battery B2 is out of order, the value of the driving state flag is set to "5," and the value of the second battery failure flag is set to "1." In accordance with the values of these flags being set as described above, the inverter control unit 72 and the voltage converter control unit 73 operate the voltage converter 4 so as to realize the flow of power as shown in FIG. 9A. That is, the inverter control unit 72 and the voltage converter control unit 73 operate the inverters 3r and 3f and the voltage converter 4 so that all power required in the first drive motor Mr, the second drive motor Mf, and the vehicle accessory H is supplied from the first battery B1. Thereby, it is possible to continue traveling of the vehicle V even in a case where the second battery B2 is out of order.

In addition, according to the failure traveling determination process of FIG. 21, in a case where the first battery B1 is out of order, the value of the driving state flag is set to "5," and the value of the first battery failure flag is set to "1." In accordance with the values of these flags being set as described above, the inverter control unit 72 and the voltage converter control unit 73 operate the voltage converter 4 so as to realize the flow of power as shown in FIG. 9B. That is, the inverter control unit 72 and the voltage converter control unit 73 drive the second drive motor Mf and the vehicle accessory H with power that is discharged from the second battery B2. In addition, the inverter control unit 72 and the voltage converter control unit 73 supply a portion of power, discharged from the second battery B2 to the second power line 22, to the first power line 21 through the voltage converter 4, and perform zero torque control for operating the first inverter 3r so that a drive torque imparted from the first drive motor Mr to the first wheel Wr using power in this first power line 21 is set to 0. Thereby, it is possible to continue traveling of the vehicle V even in a case where the first battery B1 is out of order.

Figure 22:
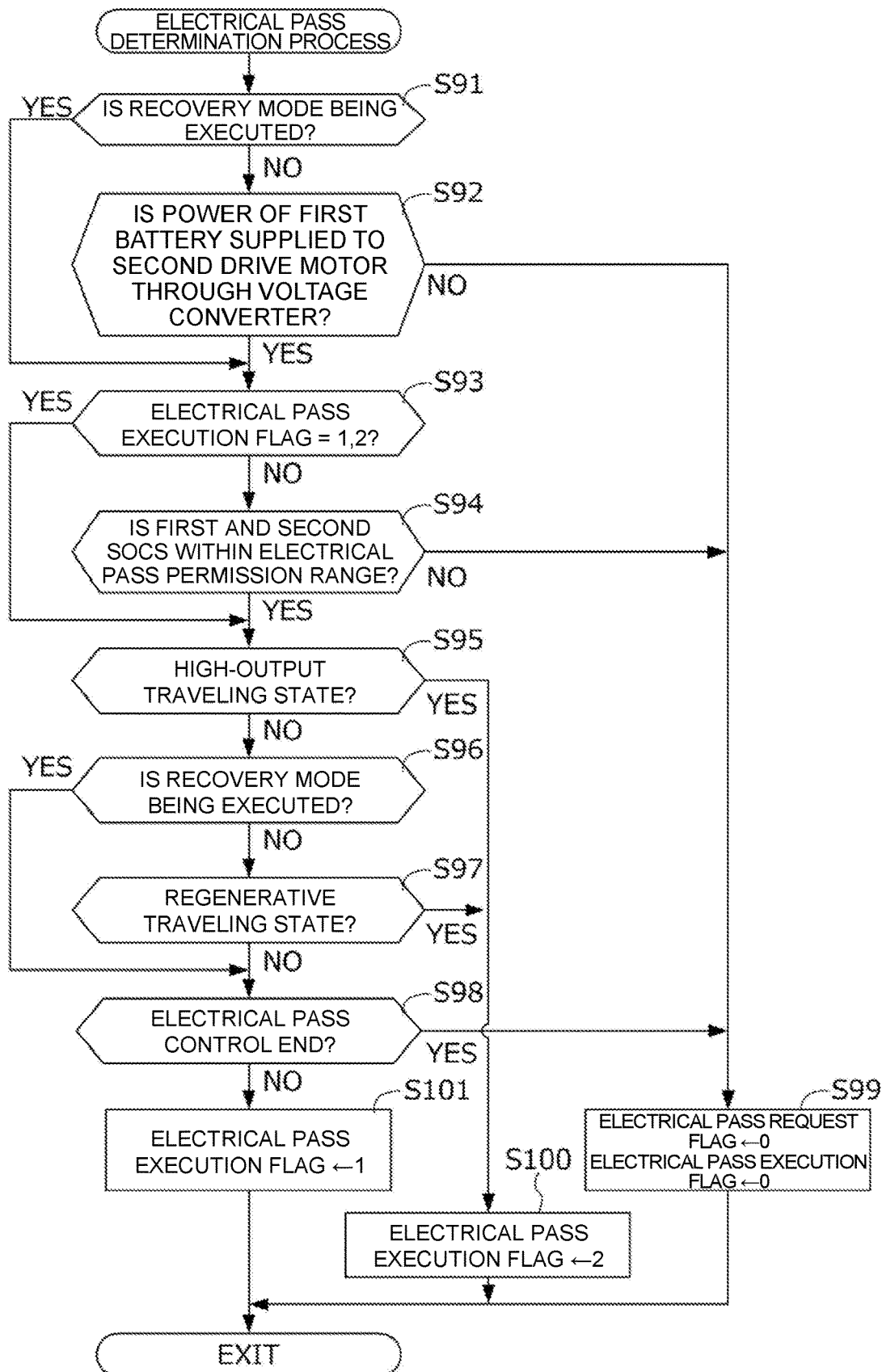
FIG. 22 is a flow chart illustrating a specific procedure of an electrical pass determination process.

FIG. 22 is a flow chart illustrating a specific procedure of an electrical pass determination process. This electrical pass determination process is a process of permitting or prohibiting the execution of electrical pass control for charging the second battery B2 using power discharged from the first battery B1. This electrical pass determination process is repeatedly executed in a predetermined control period in the driving state determination unit 71 until the value of the electrical pass request flag is set to "1" and then the value of the electrical pass request flag is set to "0" in a process of S99 to be described later.

Figure 23:
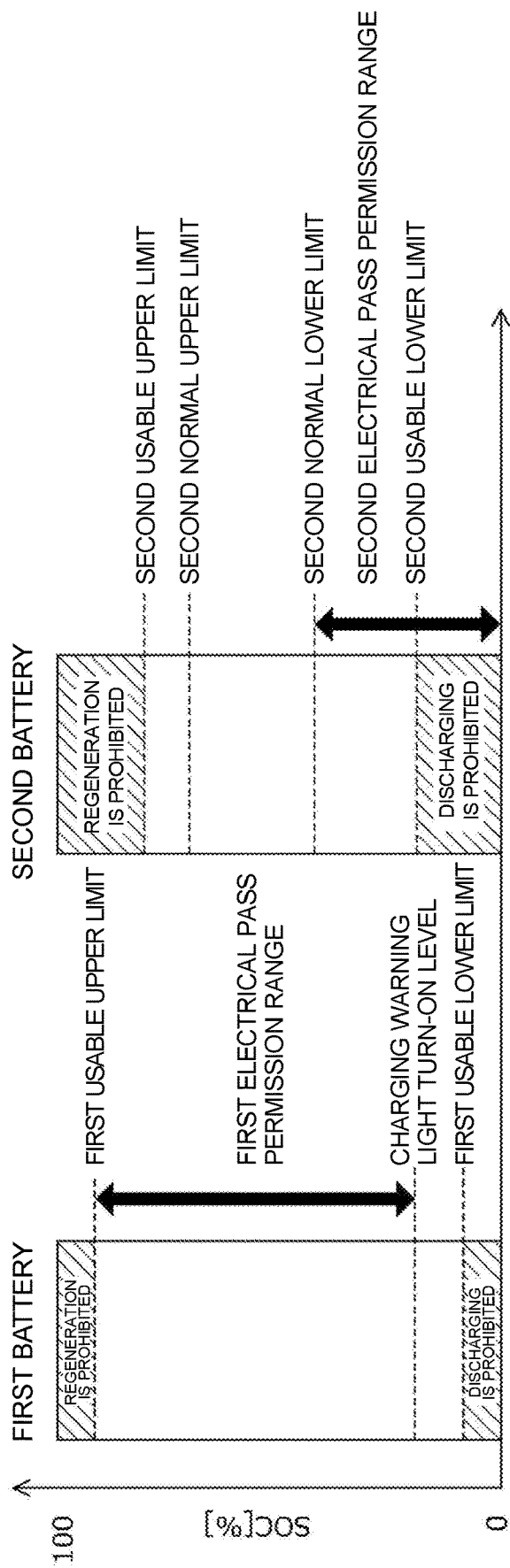
FIG. 23 is a diagram illustrating ranges of a first SOC and a second SOC in which the execution of electrical pass control is permitted in the electrical pass determination process.

FIG. 23 is a diagram illustrating ranges of the first SOC and the second SOC in which the execution of electrical pass control is permitted in the electrical pass determination process.

First, in S91, the driving state determination unit 71 determines whether a recovery mode is being executed. More specifically, the driving state determination unit 71 determines whether the recovery mode is being executed depending on, for example, whether the sports traveling request button BM2 is pressed.

The driving state determination unit 71 proceeds to S92 in a case where the determination result of S91 is NO. In S92, the driving state determination unit 71 determines whether power discharged from the first battery B1 is supplied to the second drive motor Mf through the voltage converter 4.

The driving state determination unit 71 proceeds to S93 in a case where the determination result of S92 is YES. In addition, the driving state determination unit 71 proceeds to S99 in a case where the determination result of S92 is NO, that is, in a case where power discharged from the first battery B1 is not supplied to the second drive motor Mf through the voltage converter 4. In S99, the driving state determination unit 71 determines not to be an appropriate time to execute electrical pass control, resets both the values of the electrical pass execution flag and the electrical pass request flag to "0," and terminates the electrical pass determination process of FIG. 22.

Here, in the determination process in S92, a case where the execution of electrical pass control is not permitted, that is, a case where power discharged from the first battery B1 is not supplied to the second drive motor Mf through the voltage converter 4 specifically refers to, for example, a state in which the voltage converter 4 is deactivated. Therefore, in a case where the driving state is a driving state in which the voltage converter 4 is deactivated, more specifically, in a case where it is a low-output traveling state (see FIG. 6A) in which the drive mode is set as a 2WD drive mode or an idle state (see FIG. 8A), the execution of electrical pass control is not permitted.

In a case where the determination result of S91 is YES, the driving state determination unit 71 proceeds to S93 without going through the determination of S92. That is, in a case where the recovery mode for quickly recovering the second SOC is being executed, the driving state determination unit 71 permits the execution of electrical pass control even in a case where a drive torque greater than 0 is not imparted from the second drive motor Mf to the second wheel Wf. Thereby, in a case where the recovery mode is being executed, there are increasing chances for the execution of electrical pass control to be permitted, whereby it is possible to quickly recover the second SOC.

In S93, the driving state determination unit 71 determines whether the value of the electrical pass execution flag is "1" or "2." The driving state determination unit 71 proceeds to S94 in a case where the determination result of S93 is NO, that is, in a case where the electrical pass control is not being executed or interrupted. The driving state determination unit 71 proceeds to S95 in a case where the determination result of S93 is YES.

In S94, the driving state determination unit 71 acquires the first SOC of the first battery B1 and the second SOC of the second battery B2, and determines whether the first SOC and the second SOC are within predetermined electrical pass permission ranges, respectively. The driving state determination unit 71 proceeds to S95 in a case where the determination result of S94 is YES, and proceeds to S99 in a case where the determination result is NO.

Electrical pass permission ranges for the first and second SOCs will be described with reference to FIG. 23.

First, in a case where electrical pass control is executed, power is discharged from the first battery B1, and thus the first SOC decreases. In addition, in a case where the electrical pass control is executed, power flows through the voltage converter 4, and thus a loss occurs. Consequently, in a case where the first SOC is lower than the charging warning light turn-on level, the driving state determination unit 71 prohibits the electrical pass control from being executed so as to secure a cruising distance of the vehicle V. Therefore, a first electrical pass permission range for the first SOC is a range equal to or greater than the charging warning light turn-on level. In addition, since a loss occurs in a case where the electrical pass control is executed as described above, the electrical pass control may not be frequently executed in terms of energy efficiency. Consequently, in a case where the second SOC is equal to or greater than the second normal lower limit, the driving state determination unit 71 prohibits the electrical pass control from being executed. Therefore, a second electrical pass permission range for the second SOC is a range less than the second normal lower limit. In a case where at least any of the first SOC and the second SOC is out of its electrical pass permission range in S94, the driving state determination unit 71 proceeds to S99, and prohibits the electrical pass control from being executed. In addition, in a case where both the first SOC and the second SOC is within its electrical pass permission range, the driving state determination unit 71 proceeds to S95.

In S95, the driving state determination unit 71 determines whether the driving state is a high-output traveling state, in other words, whether the total required power is larger than the first outputtable power of the first battery B1. In a case where the driving state is a high-output traveling state as described above, the total required power exceeds the first outputtable power of the first battery B1, and thus it is necessary to discharge power from the second battery B2 in order to meet this requirement. For this reason, it is not possible to execute the electrical pass control. Consequently, in a case where the determination result of S95 is YES, the driving state determination unit 71 proceeds to S100. In S100, the driving state determination unit 71 sets the value of the electrical pass execution flag to "2" so as to interrupt (that is, temporarily prohibit) the execution of the electrical pass control, and terminates the electrical pass determination process of FIG. 22.

In a case where the determination result of S95 is NO, the driving state determination unit 71 proceeds to S96. In S96, the driving state determination unit 71 determines whether the recovery mode is being executed in the same procedure as S91 described above. In a case where the determination result of S96 is NO, the driving state determination unit 71 proceeds to S97.

In S97, the driving state determination unit 71 determines whether the driving state is a regenerative traveling state. In a case where the driving state is a regenerative traveling state as described above, the inverters 3r and 3f and the voltage converter 4 are operated so that as much regenerative electric power as possible is recovered by the first and second batteries B1 and B2. Therefore, in a case where the electrical pass control is intended to be executed when the driving state is a regenerative traveling state, regenerative electric power is not able to be efficiently recovered, and thus there may be a concern of losses in the mechanical braking devices Br and Bf increasing. Consequently, the driving state determination unit 71 proceeds to S100 in a case where the determination result of S97 is YES, sets the value of the electrical pass execution flag to "2" so as to interrupt (that is, temporarily prohibit) the execution of the electrical pass control, and terminates the electrical pass determination process of FIG. 22.

In addition, in a case where the determination result of S96 is YES, the driving state determination unit 71 proceeds to S98 without executing the process of S97. That is, in a case where the recovery mode is being executed, the driving state determination unit 71 permits the execution of the electrical pass control even when the driving state is a regenerative traveling state so as to meet this requirement. Thereby, in a case where the recovery mode is being executed, there are increasing chances for the execution of electrical pass control to be permitted, whereby it is possible to quickly recover the second SOC.

In S98, the driving state determination unit 71 determines whether a time to terminate the execution of the electrical pass control has arrived. More specifically, the driving state determination unit 71 determines that a time to terminate the execution of the electrical pass control has arrived, for example, in a case where the second SOC is equal to or greater than the second normal upper limit. In a case where the determination result of S98 is YES, the driving state determination unit 71 proceeds to S99, resets both the values of the electrical pass execution flag and the electrical pass request flag to "0," and terminates the electrical pass determination process of FIG. 22.

In addition, in a case where the determination result of S98 is NO, the driving state determination unit 71 proceeds to S101. In S101, the driving state determination unit 71 sets the value of the electrical pass execution flag to "1" so as to execute the electrical pass control, and terminates the electrical pass determination process of FIG. 22.

Referring back to FIG. 3, the composition limit power calculation unit 731 calculates battery composition limit power of a virtual battery obtained by combining the first battery B1 with the second battery B2 by using signals transmitted from the battery sensor units 81 and 82, the values of the first and second battery usage flags or the values of the first and second battery failure flags updated in the driving state determination unit 71, or the like. This battery composition limit power is constituted by outputtable power and regenerable electric power.

The outputtable power is an upper limit of power capable of being output from a virtual battery obtained by combining the first battery B1 with the second battery B2, and is positive. In addition, the regenerable electric power is an upper limit of power capable of being supplied to the virtual battery obtained by combining the first battery B1 with the second battery B2, and is negative.

The composition limit power calculation unit 731 calculates power capable of being output through the following procedure. First, the composition limit power calculation unit 731 uses signals transmitted from the first battery sensor unit 81 and the second battery sensor unit 82 to calculate the first outputtable power that is power capable of being output by the first battery B1 and the second outputtable power that is power capable of being output by the second battery B2 by searching, for example, a map that is not shown. In addition, the composition limit power calculation unit 731 refers to the first battery usage flag, the first battery failure flag, the second battery usage flag, and the second battery failure flag to specify a battery out of the first battery B1 and the second battery B2 which is in a state where discharging is prohibited or discharging is not possible.

In addition, in a case where power is required in the vehicle accessory H, power capable of being output by the first battery B1 and the second battery B2 is limited to required power of this vehicle accessory H. Thus, the composition limit power calculation unit 731 acquires the required power of the vehicle accessory H. The composition limit power calculation unit 731 sets power, obtained by subtracting the required power of the vehicle accessory H from the sum of the first outputtable power and the second outputtable power, as outputtable power in a case where both the first battery B1 and the second battery B2 are not in a state in which discharging is prohibited or discharging is not possible, sets power, obtained by subtracting the required power of the vehicle accessory H from the second outputtable power, as outputtable power in a case where only the first battery B1 is in a state in which discharging is prohibited or discharging is not possible, sets power, obtained by subtracting the required power of the vehicle accessory H from the first outputtable power, as outputtable power in a case where only the second battery B2 is in a state in which discharging is prohibited or discharging is not possible, and sets outputtable power to 0 in a case where both the first battery B1 and the second battery B2 are in a state in which discharging is prohibited or discharging is not possible.

In addition, the composition limit power calculation unit 731 calculates regenerable electric power in the following procedure. First, the composition limit power calculation unit 731 uses the signals transmitted from the first battery sensor unit 81 and the second battery sensor unit 82 to calculate a basic value for the first regenerable electric power that is power capable of being supplied to the first battery B1 and a basic value for the second regenerable electric power that is power capable of being supplied to the second battery B2 by searching, for example, a map that is not shown. In addition, in a case where a regenerative operation is performed over a long period of time, for example, during traveling along a downhill road, and regenerative electric power is continuously supplied to the batteries B1 and B2, there may be a concern of electrodeposition occurring in these batteries B1 and B2. Consequently, the composition limit power calculation unit 731 calculates a correction value on the basis of the execution time of the regenerative operation so that the first and second regenerable electric powers are brought closer to 0 as the execution time of the regenerative operation becomes longer. In addition, the composition limit power calculation unit 731 calculates the first regenerable electric power and the second regenerable electric power by adding up the basic value calculated on the basis of the map as described above and the correction value calculated on the basis of the execution time of the regenerative operation. In addition, the composition limit power calculation unit 731 refers to the first battery usage flag, the first battery failure flag, the second battery usage flag, and the second battery failure flag to specify a battery out of the first battery B1 and the second battery B2 which is in a state where regeneration is prohibited or regeneration is not possible.

In addition, in a case where power is required in the vehicle accessory H, regenerative electric power can be consumed by the vehicle accessory H, and thus it is possible to load the required power of this vehicle accessory H on the regenerable electric power. The composition limit power calculation unit 731 sets the sum of the first regenerable electric power, the second regenerable electric power and the required power of the vehicle accessory H as regenerable electric power in a case where both the first battery B1 and the second battery B2 are not in a state in which regeneration is prohibited or regeneration is not possible, sets the sum of the second regenerable electric power and the required power of the vehicle accessory H as regenerable electric power in a case where only the first battery B1 is in a state in which regeneration is prohibited or regeneration is not possible, sets the sum of the first regenerable electric power and the required power of the vehicle accessory H as regenerable electric power in a case where only the second battery B2 is in a state in which regeneration is prohibited or regeneration is not possible, and sets regenerable electric power to 0 in which both the first battery B1 and the second battery B2 are in a state in which regeneration is prohibited or regeneration is not possible.

Next, a specific arithmetic procedure in the driving force distribution calculation unit 721 will be described with reference to FIG. 24.

Figure 24:
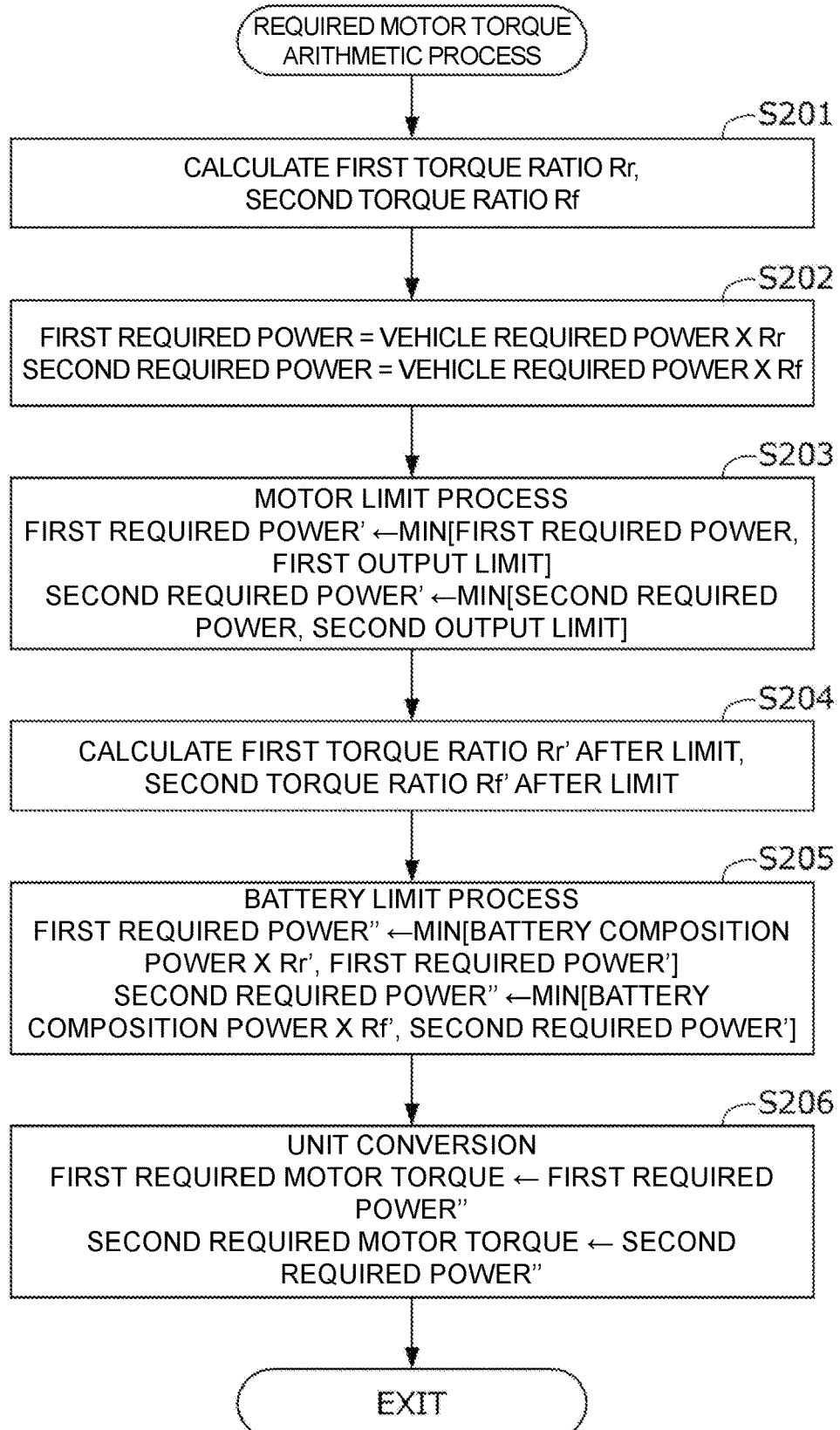
FIG. 24 is a flow chart illustrating a specific procedure of a required motor torque arithmetic process of calculating a first required motor torque and a second required motor torque in a driving force distribution calculation unit.

FIG. 24 is a flow chart illustrating a specific procedure of a required motor torque arithmetic process of calculating a first required motor torque and a second required motor torque in the driving force distribution calculation unit 721. In the driving force distribution calculation unit 721, the first required motor torque and the second required motor torque are calculated by repeatedly executing the process shown in FIG. 24 for each predetermined control period.

First, in S201, the driving force distribution calculation unit 721 refers to the values of the regeneration flag and the driving state flag to calculate a first torque ratio Rr indicating a ratio of the torque of the first drive motor Mr to the total torque and a second torque ratio Rf indicating a ratio of the torque of the second drive motor Mf to the total torque, and proceeds to S202.

In a case where the value of the regeneration flag is "0" and the value of the driving state flag is not "2" (that is, in the case of not being a low-output traveling state in which the drive mode is set as a 2WD mode), the driving force distribution calculation unit 721 calculates the first torque ratio Rr and the second torque ratio Rf so that a ratio between the torque of the first drive motor Mr and the torque of the second drive motor Mf is configured such that, for example, the torque of the first drive motor Mr becomes larger than the torque of the second drive motor Mf, more specifically, is set to, for example, 75:25. That is, in this case, the first torque ratio Rr is set to 0.75, and the second torque ratio Rf is set to 0.25.

In a case where the value of the regeneration flag is "0" and the value of the driving state flag is "2," the driving force distribution calculation unit 721 calculates the first torque ratio Rr and the second torque ratio Rf so that the ratio between the torque of the first drive motor Mr and the torque of the second drive motor Mf is set to 100:0. That is, in this case, the first torque ratio Rr is set to 1.00, and the second torque ratio Rf is set to 0.00. Thereby, in a low-output traveling state in which the drive mode is set as a 2WD mode, the second required motor torque is set to 0, and the zero torque control of the second drive motor Mf is executed (see FIGS. 6A and 6B).

In addition, in a case where the value of the regeneration flag is "0," the value of the driving state flag is "5," and the value of the first battery failure flag is "1," the driving force distribution calculation unit 721 calculates the first torque ratio Rr and the second torque ratio Rf so that the ratio between the torque of the first drive motor Mr and the torque of the second drive motor Mf is set to 0:100. That is, in this case, the first torque ratio Rr is set to 0.00, and the second torque ratio Rf is set to 1.00. Thereby, in a case where the first battery B1 is out of order, the first required motor torque is set to 0, and the zero torque control of the first drive motor Mr is executed (see FIG. 9B).

In a case where the value of the regeneration flag is "1," the driving force distribution calculation unit 721 calculates the first torque ratio Rr and the second torque ratio Rf so that the ratio between the torque of the first drive motor Mr and the torque of the second drive motor Mf is configured such that, for example, the torque of the first drive motor Mr becomes smaller than the torque of the second drive motor Mf, more specifically, is set to, for example 30:70. That is, in this case, the first torque ratio Rr is set to 0.30, and the second torque ratio Rf is set to 0.70. In the driving force distribution calculation unit 721, the second torque ratio Rf is made larger than the first torque ratio Rr in this manner, and thus the second regenerative electric power that is supplied from the second inverter 3f to the second power line 22 during regenerative deceleration can be made larger than the first regenerative electric power that is supplied from the first inverter 3r to the first power line 21.

Next, in S202, the driving force distribution calculation unit 721 calculates the first required power and the second required power by multiplying vehicle required power calculated by the required power calculation unit 70 by the first torque ratio Rr or the second torque ratio Rf. That is, the required power calculation unit 70 sets a value obtained by multiplying the vehicle required power by the first torque ratio Rr as the first required power, and sets a value obtained by multiplying the vehicle required power by the second torque ratio Rf as the second required power. However, in a case where the zero torque control is executed as described above, power required for performing the zero torque control is added to required power for a target drive motor.

Next, in S203, the driving force distribution calculation unit 721 performs a motor limit process on the first required power and the second required power calculated in S202. This motor limit process is a process of limiting the vehicle required power in accordance with the states of the drive motors Mr and Mf. More specifically, the driving force distribution calculation unit 721 calculates a first torque limit and a second torque limit that are upper limits of torques capable of being output by the respective drive motors Mr and Mf in accordance with a known algorithm, and calculates a first output limit and a second output limit by converting these torque limits into electric power. As shown in the following Expression (1), the driving force distribution calculation unit 721 sets the smaller of the first required power and the first output limit as first required power after motor limit. As shown in the following Expression (2), the driving force distribution calculation unit 721 sets the smaller of the second required power and the second output limit as second required power after motor limit. Meanwhile, hereinafter, the first required power after motor limit is denoted by "first required power'," and the second required power after motor limit is denoted by "second required power'."

$$\text{First required power'}=\text{MIN}[\text{first required power, first output limit}] \quad (1)$$

$$\text{Second required power'}=\text{MIN}[\text{second required power, second output limit}] \quad (2)$$

Next, in S204, the driving force distribution calculation unit 721 uses first required power' and the second required power' calculated in S203 to calculate a first torque ratio Rr' after limit and a second torque ratio Rf after limit. More specifically, the driving force distribution calculation unit 721 sets a value obtained by dividing the first required power' by the sum of the first required power' and the second required power' as the first torque ratio Rr' after limit, and sets a value obtained by dividing the second required power' by the above sum as the second torque ratio Rf after limit.

Next, in S205, the driving force distribution calculation unit 721 performs a battery limit process on the first required power' and the second required power' calculated in S203. This battery limit process is a process of limiting the vehicle required power in accordance with the states of the first battery B1 and the second battery B2. More specifically, the driving force distribution calculation unit 721 acquires battery composition limit power (that is, a combination of outputtable power and regenerable electric power) calculated by the composition limit power calculation unit 731. In addition, as shown in the following Expression (3), the driving force distribution calculation unit 721 sets the smaller of a value obtained by multiplying the battery composition limit power by the first torque ratio Rr' after limit and the first required power' as first required power after battery limit. In addition, as shown in the following Expression (4), the driving force distribution calculation unit 721 sets the smaller of a value obtained by multiplying the battery composition limit power by the second torque ratio Rf after limit and the second required power' as second required power after battery limit. Meanwhile, in arithmetic operations of the following Expression (3) and (4), the driving force distribution calculation unit 721 uses positive outputtable power as the battery composition limit power in a case where the first required power after motor limit and the second required power after motor limit are positive, and uses negative regenerable electric power as the battery composition limit power in a case where the first required power after motor limit and the second required power after motor limit are negative. In addition, hereinafter, the first required power after battery limit is denoted by "first required power''," and the second required power after battery limit is denoted by "second required power''."

$$\text{First required power''}=\text{MIN}[\text{battery composition limit power}\times Rr', \text{first required power'}] \quad (3)$$

$$\text{Second required power''}=\text{MIN}[\text{battery composition limit power}\times Rf', \text{second required power'}] \quad (4)$$

Next, in S206, the driving force distribution calculation unit 721 converts the units of the first required power'' and the second required power'' calculated in S205 by using the number of motor rotations, to thereby calculate the first required motor torque and the second required motor torque.

Next, a specific arithmetic procedure of the energy distribution calculation unit 732 will be described with reference to FIG. 25.

Figure 25:
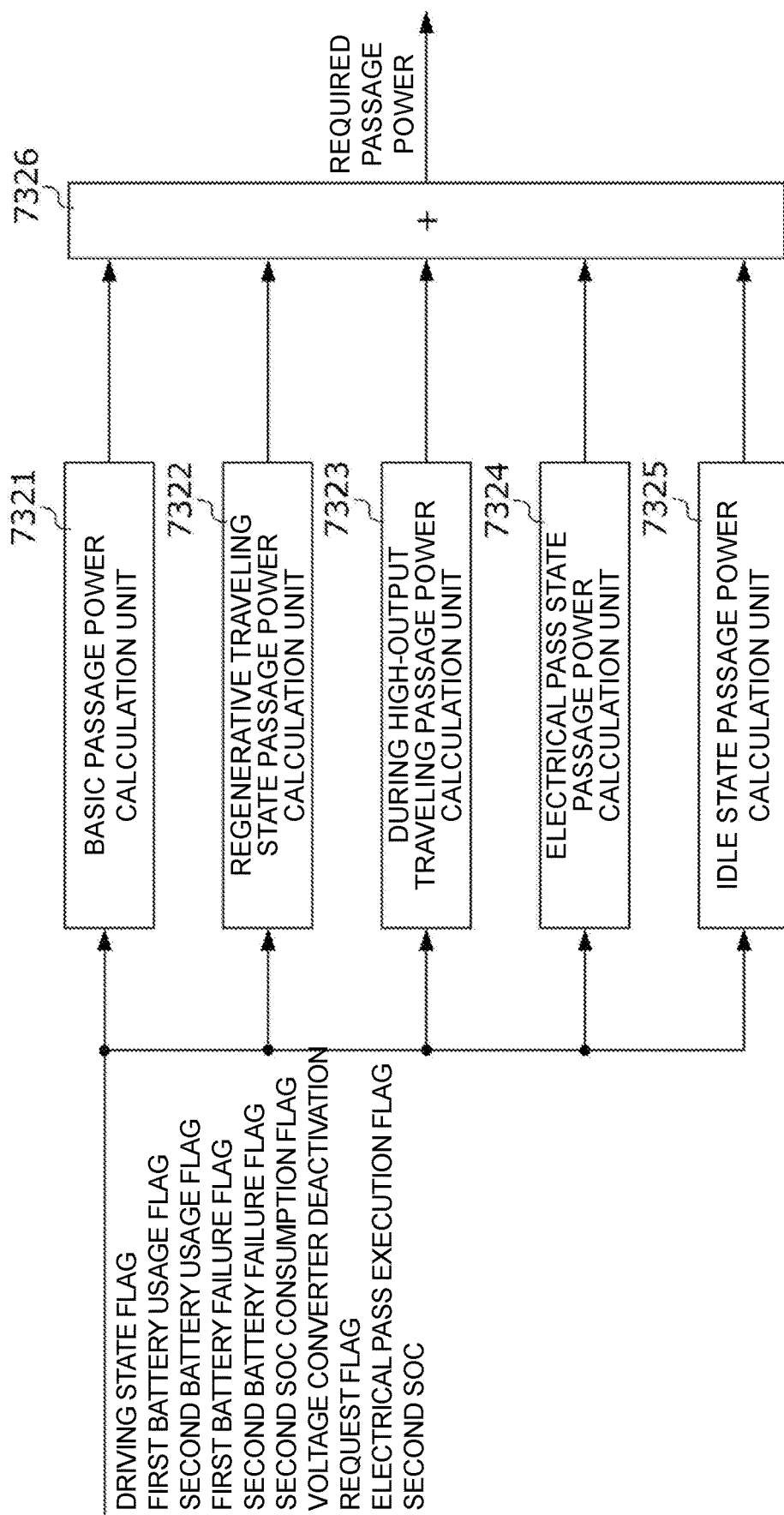
FIG. 25 is a functional block diagram illustrating a procedure of calculating required passage power in an energy distribution calculation unit.

FIG. 25 is a functional block diagram illustrating a procedure of calculating required passage power in the energy distribution calculation unit 732.

The energy distribution calculation unit 732 includes a basic passage power calculation unit 7321 that calculates basic passage power, a regenerative traveling state passage power calculation unit 7322 that calculates regeneration state passage power, a high-output traveling state passage power calculation unit 7323 that calculate high-output traveling state passage power, an electrical pass state passage power calculation unit 7324 that calculates electrical pass state passage power, an idle state passage power calculation unit 7325 that calculates idle state passage power, and a required passage power calculation unit 7326 that calculates required passage power by adding up the basic passage power, the regeneration state passage power, the high-output traveling state passage power, and the idle state passage power.

The basic passage power calculation unit 7321 calculates the basic passage power equivalent to a basic value for the required passage power. In a case where the value of the driving state flag is any of "0," "2" and "5," the basic passage power calculation unit 7321 calculates the basic passage power in accordance with the following procedure. In addition, in case where the value of the driving state flag is neither of "0," "2" and "5," the basic passage power calculation unit 7321 sets the basic passage power to 0.

In a case where the value of the driving state flag is "0" or "5" and the value of the second battery usage flag is "1" or the value of the second battery failure flag is "1," the basic passage power calculation unit 7321 sets a value obtained by adding up the second required power'' calculated in the driving force distribution calculation unit 721 and required power in the vehicle accessory H as the basic passage power. Thereby, for example, a flow of power shown in FIG. 4A or 9A is realized.

[Driving state flag=0, second use battery flag=1]
[Driving state flag=5, second battery failure flag=1]

Basic passage power=second required power''+accessory required power

Figure 26:
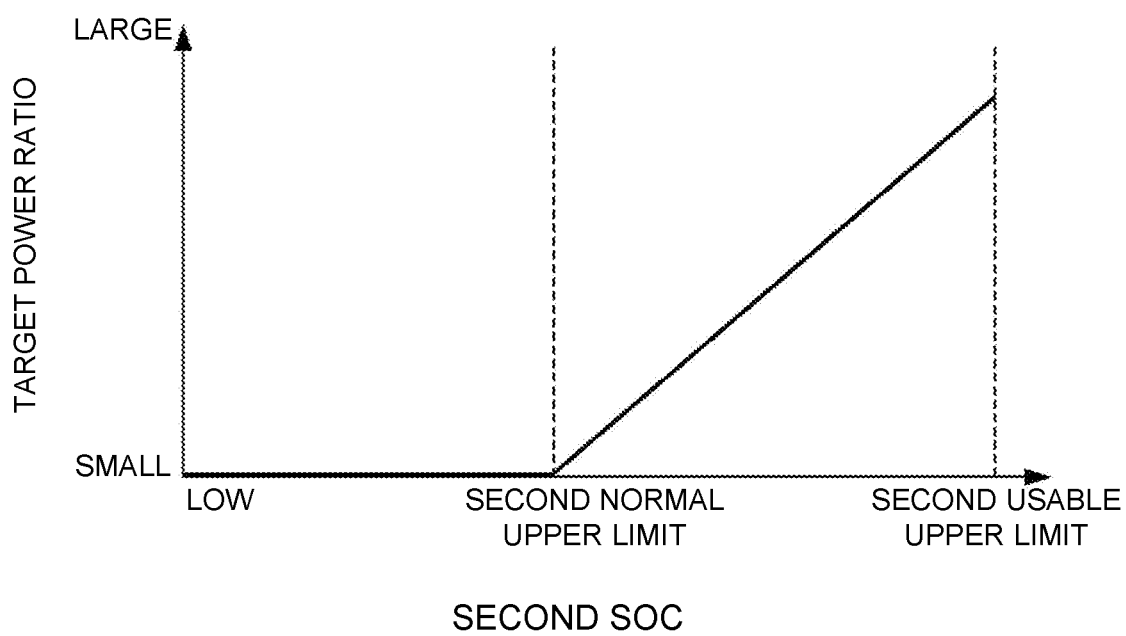
FIG. 26 is an example of a map for calculating a target power ratio on the basis of a second SOC.

In a case where the value of the driving state flag is "0," the value of the second battery usage flag is "0," and the value of the second SOC consumption flag is "1," that is, in a case where the driving state is a normal traveling state and the consumption of the second SOC of the second battery B2 is required, the basic passage power calculation unit 7321 calculates the basic passage power in accordance with the following procedure so that the flow of power shown in FIG. 4C is realized. In this case, the basic passage power calculation unit 7321 calculates a target power ratio r that is a ratio of power discharged from the second battery B2 to power discharged from the first battery B1 and the second battery B2 on the basis of the second SOC of the second battery B2. The basic passage power calculation unit 7321 calculates the target power ratio r by searching a map as shown in FIG. 26 on the basis of the second SOC. According to an example of the map shown in FIG. 26, as the second SOC becomes larger, the target power ratio r also becomes higher. That is, as the second SOC becomes larger, the burden of the second battery B2 becomes larger. The basic passage power calculation unit 7321 uses the target power ratio r calculated in this manner to calculate the basic passage power using the following expression. Thereby, the flow of power shown in FIG. 4C is realized.

[Driving state flag=0, second battery usage flag=0, second SOC consumption flag=1]

Basic passage power=$(1-r)\times$(second required power''+accessory required power)$-r$ first required power''

In a case where the value of the driving state flag is "2" and the value of the voltage converter deactivation request flag is "0," the basic passage power calculation unit 7321 sets a value obtained by combining the second required power" required for performing the zero torque control on the second drive motor Mf with the required power of the vehicle accessory H as the basic passage power so that the flow of power shown in FIG. 6B is realized. Thereby, in a case where the value of the electrical pass execution flag is "1," and electrical pass state passage power to be described later is applied, the flow of power shown in FIG. 6B is realized.

[Driving state flag=2, voltage converter deactivation request flag=0]

Basic passage power=second required power"+accessory required power

In a case where the value of the driving state flag is "5" and the value of the first battery failure flag is "1," the basic passage power calculation unit 7321 sets a value obtained by multiplying the first required power" required for performing the zero torque control on the first drive motor Mr by "−1" as the basic passage power so that the flow of power shown in FIG. 9B is realized. Thereby, the flow of power shown in FIG. 9B is realized.

[Driving state flag=5, first battery failure flag=1]

Basic passage power=−first required power"

In a case where the value of the driving state flag is "3," the regenerative traveling state passage power calculation unit 7322 calculates the regenerative traveling state passage power in accordance with the following procedure. In a case where the value of the driving state flag is not "3," the regenerative traveling state passage power calculation unit 7322 sets the regenerative traveling state passage power to 0. Meanwhile, in a case where the value of the driving state flag is "3," both the first required power" and the second required power" are set to be negative.

In a case where both the values of the first battery usage flag and the second battery usage flag are "0" and the second SOC is within the second basic regeneration permission range, the regenerative traveling state passage power calculation unit 7322 sets a value, obtained by subtracting the second regenerable electric power that is negative from the sum of the second required power" that is negative and the accessory required power that is positive, as the regenerative traveling state passage power so that the second battery B2 is preferentially charged. This is equivalent to the supply of an amount, that is not able to be consumed in driving of the vehicle accessory H and charging of the second battery B2 in regenerative electric power supplied from the second drive motor Mf to the second power line 22, to the first battery B1. Thereby, it is possible to preferentially charge the second battery B2 rather than the first battery B1 while realizing the flow of power shown in FIG. 7A.

[Driving state flag=3, first and second battery usage flags=0, the second SOC is within the second basic regeneration permission range]

Regenerative traveling state passage power=second required power"+accessory required power− second regenerable electric power In a case where both the values of the first battery usage flag and the second battery usage flag are "0" and the second SOC is out of the second basic regeneration permission range, the regenerative traveling state passage power calculation unit 7322 sets a value, obtained by subtracting the first required power" that is negative from the first regenerable electric power that is negative, as the regenerative traveling state passage power so that the first battery B1 is preferentially charged. This is equivalent to the supply of this shortage from the second power line 22 to the first battery B1 in a case where there is remaining power even when all regenerative electric power supplied from the first drive motor Mr to the first power line 21 is supplied to the first battery B1. Thereby, it is possible to preferentially charge the first battery B1 rather than the second battery B2 while realizing the flow of power shown in FIG. 7A.

[Driving state flag=3, first and second battery usage flags=0, the second SOC is out of the second basic regeneration permission range]

Regenerative traveling state passage power=first regenerable electric power−first required power"

In a case where the value of the first battery usage flag is "0" and the value of the second battery usage flag is "2," the regenerative traveling state passage power calculation unit 7322 sets the sum of the second required power" that is negative and the accessory required power that is positive as the regenerative traveling state passage power. This is equivalent to the supply of an amount, that is not able to be consumed in driving of the vehicle accessory H in regenerative electric power supplied from the second drive motor Mf to the second power line 22, to the first battery B1. Thereby, it is possible to realize the flow of power shown in FIG. 7B.

[Driving state flag=3, first battery usage flag=0, second battery usage flag=2]

Regenerative traveling state passage power=second required power"+accessory required power In a case where the value of the first battery usage flag is "2" and the value of the second battery usage flag is "0," the regenerative traveling state passage power calculation unit 7322 sets a value obtained by multiplying the first required power" that is negative by "−1" as the regenerative traveling state passage power. This is equivalent to the supply of all regenerative electric power supplied from the first drive motor Mr to the first power line 21 to the second power line 22, and the use of the supplied electric power in driving of the vehicle accessory H and charging of the second battery B2. Thereby, it is possible to realize the flow of power shown in FIG. 7C.

[Driving state flag=3, first battery usage flag=2, second battery usage flag=0]

Regenerative traveling state passage power=−first required power"

In a case where both the values of the first battery usage flag and the second battery usage flag are "2," the regenerative traveling state passage power calculation unit 7322 sets the regenerative traveling state passage power to 0. Thereby, it is possible to realize the flow of power shown in FIG. 7D.

[Driving state flag=3, first battery usage flag=2, second battery usage flag=2]

Regenerative traveling state passage power=0

In a case where the value of the driving state flag is "1" and the value of the second battery usage flag is "0," the high-output traveling state passage power calculation unit 7323 calculates the high-output traveling state passage power in accordance with the following procedure. In addition, in a case where the value of the driving state flag is not "1," the high-output traveling state passage power calculation unit 7323 sets the high-output traveling state passage power to 0. As described above, in a case where the total required power exceeds the first outputtable power that is an upper limit of power capable of being output by the first battery B1, the driving state is set as a high-output traveling state. In this high-output traveling state, the second battery B2 is discharged so as to compensate for a shortage caused by the first battery B1. Consequently, the high-output traveling state passage power calculation unit 7323 sets a value obtained by subtracting the first required power" from the first outputtable power as the high-output traveling state passage power. Thereby, the flow of power shown in FIG. 5 is realized.

[Driving state flag=1, second battery usage flag=0]

High-output traveling state passage power=first outputtable power-first required power"

Only in a case where the value of the electrical pass execution flag is "1," the electrical pass state passage power calculation unit 7324 calculates the positive electrical pass state passage power in accordance with the following procedure. In addition, in a case where the value of the electrical pass execution flag is not "1," the electrical pass state passage power calculation unit 7324 sets the electrical pass state passage power to 0. Thereby, in a case where the value of the electrical pass execution flag is set to "1," for example, when the driving state is a normal traveling state, the flow of power shown in FIG. 4B is realized, and the electrical pass state passage power is supplied to the second battery B2. In addition, in a case where the value of the electrical pass execution flag is set to "1" when the driving state is a low-output traveling state, the flow of power shown in FIG. 6B is realized, and the electrical pass state passage power is supplied to the second battery B2. In addition, in a case where the value of the electrical pass execution flag is set to "1" when the driving state is a regenerative traveling state, the flow of power shown in FIG. 7E is realized, and the electrical pass state passage power is supplied to the second battery B2.

The magnitude of this electrical pass state passage power may be a fixed value determined in advance, or may be a variable value. In addition, in the case of a variable value, the magnitude of the electrical pass state passage power may be changed, for example, in accordance with the presence or absence of the execution of a recovery mode. That is, in a case where the recovery mode is being executed, the electrical pass state passage power may be made larger than in a case where the recovery mode is not being executed. Thereby, in a case where the recovery mode is being executed, power with which the second power storage device is charged by executing the electrical pass control can be made larger than in a case where the recovery mode is not being executed, whereby it is possible to quickly recover the second SOC. In addition, in the case of a variable value, the magnitude of the electrical pass state passage power may be changed, for example, in accordance with the second SOC.

In a case where the value of the driving state flag is "4," the idle state passage power calculation unit 7325 calculates the idle state passage power in accordance with the following procedure. In addition, in a case where the value of the driving state flag is not "4," the idle state passage power calculation unit 7325 sets the idle state passage power to 0.

In a case where the value of the driving state flag is "4" and the value of the second battery usage flag is "0," the idle state passage power calculation unit 7325 sets the idle state passage power to 0. Thereby, the flow of power shown in FIG. 8A is realized.

[Driving state flag=4, second battery usage flag=0]

Idle state passage power=0

In a case where the value of the driving state flag is "4" and the value of the second battery usage flag is "1," the idle state passage power calculation unit 7325 sets the required power in the vehicle accessory H as the idle state passage power. Thereby, the flow of power shown in FIG. 8B is realized.

[Driving state flag=4, second battery usage flag=1]

Idle state passage power=accessory required power

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle power supply system comprising:
   a first motor generator connected to a first wheel of a vehicle;
   a second motor generator connected to a second wheel;
   a first power line to which a first power converter that transfers power to and from the first motor generator and a first power storage device are connected;
   a second power line to which a second power converter that transfers power to and from the second motor generator and a second power storage device are connected;
   a voltage converter that converts a voltage between the first power line and the second power line; and
   a charging and discharging control device that controls charging and discharging of the first and second power storage devices by operating the first and second power converters and the voltage converter,
   wherein the charging and discharging control device further comprises a limit power calculation unit that acquires a regenerable electric power that is an upper limit power for regenerative electric power supplied to the second power storage device during regenerative deceleration in which the regenerative electric power is generated by the first and second motor generators, and
   the charging and discharging control device charges the second power storage device with the regenerative electric power during the regenerative deceleration, and supplies a surplus regenerative electric power of the regenerative electric power to the voltage converter when the regenerative electric power is larger than the regenerable electric power, wherein the surplus regenerative electric power is obtained by excluding the regenerable electric power from the regenerative electric power.

2. The vehicle power supply system according to claim 1, wherein a vehicle accessory that is an electrical load is connected to the second power line, and
   the charging and discharging control device charges the second power storage device and drives the vehicle accessory with the regenerative electric power, and sets the surplus regenerative electric power by excluding the regenerable electric power and power required in the vehicle accessory from the regenerative electric power.

3. The vehicle power supply system according to claim 1, wherein the first power storage device is lower in output weight density and is higher in energy weight density than the second power storage device.

4. The vehicle power supply system according to claim 1, wherein the first wheel is a rear wheel and the second wheel is a front wheel, and
during the regenerative deceleration, the charging and discharging control device operates the first and second power converters so that the regenerative electric power becomes larger than a further regenerative electric power that is power supplied from the first power converter to the first power line during the regenerative deceleration.

5. The vehicle power supply system according to claim 1, further comprising:
a second power storage parameter acquisition unit that acquires a value of a second power storage parameter increasing in accordance with an amount of power storage of the second power storage device; and
a second regeneration permission upper limit setting unit that sets a second regeneration permission upper limit that is a threshold for the second power storage parameter,
wherein, when the value of the second power storage parameter is larger than the second regeneration permission upper limit during the regenerative deceleration, the charging and discharging control device prohibits the second power storage device from being charged, and supplies at least a portion of the regenerative electric power to the first power storage device through the voltage converter and the first power line.

6. The vehicle power supply system according to claim 1, further comprising:
a second power storage parameter acquisition unit that acquires a value of a second power storage parameter increasing in accordance with an amount of power storage of the second power storage device; and
a second regeneration permission upper limit setting unit that sets a second regeneration permission upper limit that is a threshold for the second power storage parameter,
wherein the charging and discharging control device prohibits the second power storage device from being charged when the value of the second power storage parameter is larger than the second regeneration permission upper limit during the regenerative deceleration, and
the second regeneration permission upper limit setting unit changes the second regeneration permission upper limit on the basis of a state of the first power storage device.

7. The vehicle power supply system according to claim 5, wherein the second regeneration permission upper limit setting unit changes the second regeneration permission upper limit on the basis of a state of the first power storage device.

8. The vehicle power supply system according to claim 7, further comprising:
a first power storage parameter acquisition unit that acquires a value of a first power storage parameter increasing in accordance with an amount of power storage of the first power storage device; and
a first regeneration permission upper limit setting unit that sets a first regeneration permission upper limit that is a threshold for the first power storage parameter,
wherein, when the value of the first power storage parameter is larger than the first regeneration permission upper limit, the second regeneration permission upper limit setting unit makes the second regeneration permission upper limit larger than when the value of the first power storage parameter is equal to or less than the first regeneration permission upper limit, and
the charging and discharging control device prohibits the first power storage device from being charged when the value of the first power storage parameter is larger than the first regeneration permission upper limit during the regenerative deceleration.

9. The vehicle power supply system according to claim 6, wherein the second regeneration permission upper limit setting unit sets the second regeneration permission upper limit as a value of any of a predetermined first threshold and a second threshold larger than the first threshold, and
the second regeneration permission upper limit setting unit sets the second regeneration permission upper limit as the first threshold when the value of the second power storage parameter is equal to or less than the first threshold during the regenerative deceleration, and sets the second regeneration permission upper limit as a value of any of the first threshold and the second threshold on the basis of the state of the first power storage device when the value of the second power storage parameter is larger than the first threshold and equal to or less than the second threshold.

10. The vehicle power supply system according to claim 9, wherein the limit power calculation unit acquires another regenerable electric power that is an upper limit power for regenerative electric power supplied to the first power storage device during the regenerative deceleration,
wherein the second regeneration permission upper limit setting unit sets the second regeneration permission upper limit as the second threshold when the value of the second power storage parameter is larger than the first threshold and equal to or less than the second threshold during the regenerative deceleration, and required regenerative electric power is larger than the further regenerable electric power.

11. The vehicle power supply system according to claim 2,
wherein the first power storage device is lower in output weight density and is higher in energy weight density than the second power storage device.

12. The vehicle power supply system according to claim 2,
wherein the first wheel is a rear wheel and the second wheel is a front wheel, and
during the regenerative deceleration, the charging and discharging control device operates the first and second power converters so that the regenerative electric power becomes larger than a further regenerative electric power that is power supplied from the first power converter to the first power line during the regenerative deceleration.

13. The vehicle power supply system according to claim 3,
wherein the first wheel is a rear wheel and the second wheel is a front wheel, and
during the regenerative deceleration, the charging and discharging control device operates the first and second power converters so that the regenerative electric power becomes larger than a further regenerative electric power that is power supplied from the first power converter to the first power line during the regenerative deceleration.

14. The vehicle power supply system according to claim 2, further comprising:
- a second power storage parameter acquisition unit that acquires a value of a second power storage parameter increasing in accordance with an amount of power storage of the second power storage device; and
- a second regeneration permission upper limit setting unit that sets a second regeneration permission upper limit that is a threshold for the second power storage parameter,
- wherein, when the value of the second power storage parameter is larger than the second regeneration permission upper limit during the regenerative deceleration, the charging and discharging control device prohibits the second power storage device from being charged, and supplies at least a portion of the regenerative electric power to the first power storage device through the voltage converter and the first power line.

15. The vehicle power supply system according to claim 3, further comprising:
- a second power storage parameter acquisition unit that acquires a value of a second power storage parameter increasing in accordance with an amount of power storage of the second power storage device; and
- a second regeneration permission upper limit setting unit that sets a second regeneration permission upper limit that is a threshold for the second power storage parameter,
- wherein, when the value of the second power storage parameter is larger than the second regeneration permission upper limit during the regenerative deceleration, the charging and discharging control device prohibits the second power storage device from being charged, and supplies at least a portion of the regenerative electric power to the first power storage device through the voltage converter and the first power line.

16. The vehicle power supply system according to claim 4, further comprising:
- a second power storage parameter acquisition unit that acquires a value of a second power storage parameter increasing in accordance with an amount of power storage of the second power storage device; and
- a second regeneration permission upper limit setting unit that sets a second regeneration permission upper limit that is a threshold for the second power storage parameter,
- wherein, when the value of the second power storage parameter is larger than the second regeneration permission upper limit during the regenerative deceleration, the charging and discharging control device prohibits the second power storage device from being charged, and supplies at least a portion of the regenerative electric power to the first power storage device through the voltage converter and the first power line.

17. The vehicle power supply system according to claim 2, further comprising:
- a second power storage parameter acquisition unit that acquires a value of a second power storage parameter increasing in accordance with an amount of power storage of the second power storage device; and
- a second regeneration permission upper limit setting unit that sets a second regeneration permission upper limit that is a threshold for the second power storage parameter,
- wherein the charging and discharging control device prohibits the second power storage device from being charged when the value of the second power storage parameter is larger than the second regeneration permission upper limit during the regenerative deceleration, and
- the second regeneration permission upper limit setting unit changes the second regeneration permission upper limit on the basis of a state of the first power storage device.

18. The vehicle power supply system according to claim 3, further comprising:
- a second power storage parameter acquisition unit that acquires a value of a second power storage parameter increasing in accordance with an amount of power storage of the second power storage device; and
- a second regeneration permission upper limit setting unit that sets a second regeneration permission upper limit that is a threshold for the second power storage parameter,
- wherein the charging and discharging control device prohibits the second power storage device from being charged when the value of the second power storage parameter is larger than the second regeneration permission upper limit during the regenerative deceleration, and
- the second regeneration permission upper limit setting unit changes the second regeneration permission upper limit on the basis of a state of the first power storage device.

19. The vehicle power supply system according to claim 4, further comprising:
- a second power storage parameter acquisition unit that acquires a value of a second power storage parameter increasing in accordance with an amount of power storage of the second power storage device; and
- a second regeneration permission upper limit setting unit that sets a second regeneration permission upper limit that is a threshold for the second power storage parameter,
- wherein the charging and discharging control device prohibits the second power storage device from being charged when the value of the second power storage parameter is larger than the second regeneration permission upper limit during the regenerative deceleration, and
- the second regeneration permission upper limit setting unit changes the second regeneration permission upper limit on the basis of a state of the first power storage device.

20. The vehicle power supply system according to claim 7,
- wherein the second regeneration permission upper limit setting unit sets the second regeneration permission upper limit as a value of any of a predetermined first threshold and a second threshold larger than the first threshold, and
- the second regeneration permission upper limit setting unit sets the second regeneration permission upper limit as the first threshold when the value of the second power storage parameter is equal to or less than the first threshold during the regenerative deceleration, and sets the second regeneration permission upper limit as a value of any of the first threshold and the second threshold on the basis of the state of the first power storage device when the value of the second power storage parameter is larger than the first threshold and equal to or less than the second threshold.

* * * * *